(12) United States Patent
Sonoda et al.

(10) Patent No.: US 10,944,846 B2
(45) Date of Patent: Mar. 9, 2021

(54) DISTRIBUTION SCHEDULE CREATION METHOD AND DISTRIBUTION SCHEDULE CREATION APPARATUS

(71) Applicant: FUJITSU LIMITED, Kawasaki (JP)

(72) Inventors: Masataka Sonoda, Kawasaki (JP); Noriyuki Fukuyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 410 days.

(21) Appl. No.: 15/494,583

(22) Filed: Apr. 24, 2017

(65) Prior Publication Data

US 2017/0346922 A1    Nov. 30, 2017

(30) Foreign Application Priority Data

May 27, 2016    (JP) .............................. JP2016-105789

(51) Int. Cl.
| | |
|---|---|
| G06F 15/173 | (2006.01) |
| G06F 13/40 | (2006.01) |
| H04L 12/18 | (2006.01) |
| H04W 4/02 | (2018.01) |
| H04W 4/08 | (2009.01) |
| H04L 29/08 | (2006.01) |
| H04L 12/751 | (2013.01) |

(52) U.S. Cl.
CPC ............. *H04L 67/32* (2013.01); *H04L 45/02* (2013.01); *G06F 15/17312* (2013.01); *H04L 12/1877* (2013.01)

(58) Field of Classification Search
None
See application file for complete search history.

(56) References Cited

U.S. PATENT DOCUMENTS 7,333,438 B1 *   2/2008   Rabie ................. H04L 41/0654
                                                        370/216
7,936,770 B1 *   5/2011   Frattura ................ H04L 49/90
                                                        370/412

(Continued)

FOREIGN PATENT DOCUMENTS

JP         2000-022686           1/2000
JP         2000-286845          10/2000

*Primary Examiner* — Nicholas R Taylor
*Assistant Examiner* — Ho T Shiu
(74) *Attorney, Agent, or Firm* — Fujitsu Patent Center

(57) ABSTRACT

A method of causing a computer to execute: classifying, based on topology for indicating connection relationships among a data-provision apparatus, distribution-destination apparatuses corresponding to distribution destinations of distribution targets, and relay apparatuses configured to relay communications between the data-provision apparatus and the distribution-destination apparatuses, the mutual distribution-destination apparatuses; identifying a first distribution-destination apparatus having a highest communication speed of a directly connected link among the distribution-destination apparatuses belonging to the group; and creating a distribution schedule of the data in a manner that the data is transmitted from the data-provision apparatus to the first distribution-destination apparatus in the same group, and next, the data is transmitted from the first distribution-destination apparatus to a second distribution-destination apparatus other than the first distribution-destination apparatus in the group.

7 Claims, 48 Drawing Sheets

(56) References Cited

U.S. PATENT DOCUMENTS

2004/0255323 A1* 12/2004 Varadarajan ............ H04L 45/04
  725/25
2013/0058235 A1* 3/2013 Johnsson ............ H04L 43/0882
  370/252

* cited by examiner

FIG. 6
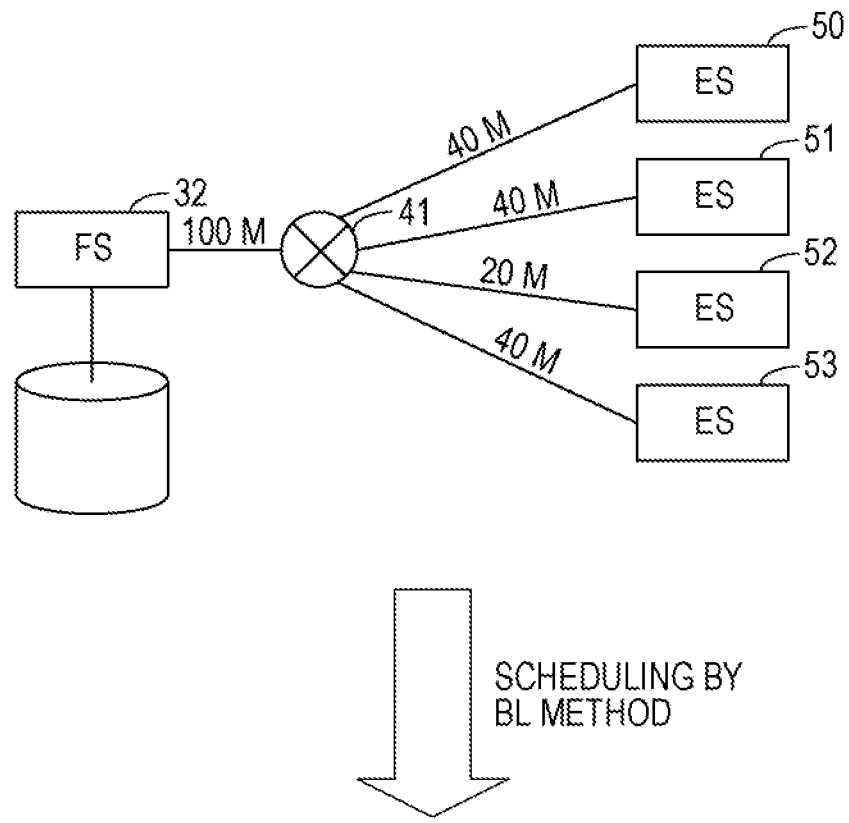
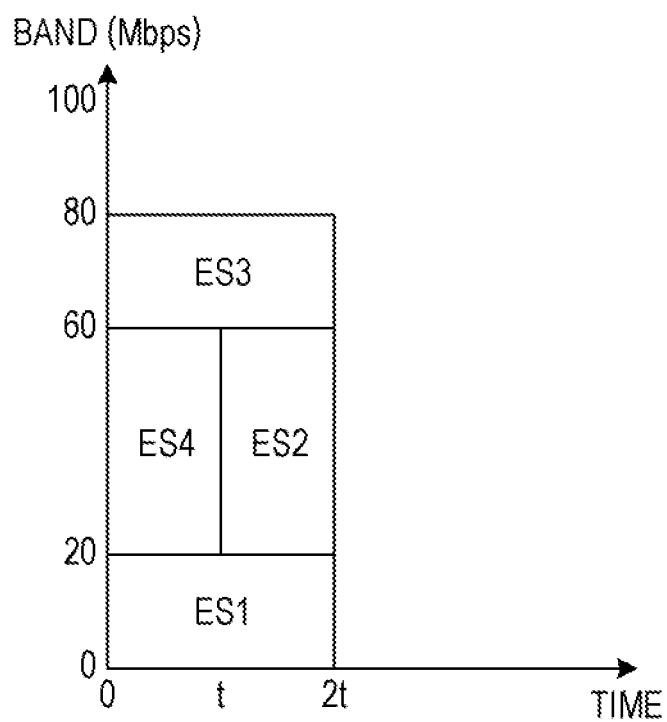

FIG. 18

RANGE INFORMATION STORAGE UNIT 123

| RANGE id | BELONGING ES | BOTTLENECK LINK (BL) | REPRESENTATIVE ES | SUB RANGE |
|---|---|---|---|---|
| all | ES01, ES02, ES03, ES04, ES05, ES06, ES07, ES08, ES09, ES10 | — | FS01 | Grp1, Grp2, Grp3 |
| Grp1 | ES01, ES02, ES03, ES04, ES05 | L1 (25 Mbps) | ES01 | Grp11, Grp12, Grp13 |
| Grp2 | ES06, ES07, ES08 | L10 (20 Mbps) | ES08 | Grp21 |
| ... | ... | ... | ... | ... |

DISTRIBUTION SCHEDULE INFORMATION STORAGE UNIT 134

| id | DISTRIBUTION DATA | DISTRIBUTION SOURCE | DISTRIBUTION DESTINATION | PATH | SUPPOSED TP [Mbps] | DURATION [min] | ESTIMATED START TIME | ESTIMATED END TIME | PRECEDING DATA DISTRIBUTION |
|---|---|---|---|---|---|---|---|---|---|
| d00 | dataA | FS | ES08 | L0, L9, L10, L14 | 20 | 120 | 00:00 | 02:00 | − |
| d01 | dataA | FS | ES01 | L0, L1, L2, L4 | 25 | 96 | 00:00 | 01:36 | − |
| ... | ... | ... | ... | ... | ... | ... | ... | ... | ... |

| RANGE id | BELONGING ES | BOTTLENECK LINK (BL) | REPRESENTATIVE ES | SUB RANGE |
|---|---|---|---|---|
| all | ES01, ES02, ES03, ES04, ES05, ES06, ES07, ES08, ES09, ES10 | — | FS | Grp1, Grp2, Grp3 |
| Grp1 | ES01, ES02, ES03, ES04, ES05 | L1 (25 Mbps) | ES01 | |
| Grp2 | ES06, ES07, ES08 | L10 (20 Mbps) | ES08 | |
| Grp3 | ES09, ES10 | L15 (30 Mbps) | ES10 | |

| RANGE id | BELONGING ES | BOTTLENECK LINK (BL) | REPRESENTATIVE ES | SUB RANGE |
|---|---|---|---|---|
| all | ES01, ES02, ES03, ES04, ES05, ES06, ES07, ES08, ES09, ES10 | — | FS | Grp1, Grp2, Grp3 |
| Grp1 | ES01, ES02, ES03, ES04, ES05 | L1 (25 Mbps) | ES01 | Grp11, Grp12, Grp13 |
| Grp2 | ES06, ES07, ES08 | L10 (20 Mbps) | ES08 | G21 |
| Grp3 | ES09, ES10 | L15 (30 Mbps) | ES10 | G31 |
| Grp11 | ES02 | L5 (80 Mbps) | ES02 | |
| Grp12 | ES03 | L6 (50 Mbps) | ES03 | |
| Grp13 | ES04, ES05 | L3 (30 Mbps) | ES04 | |
| Grp21 | ES06, ES07 | L11 (30 Mbps) | ES06 | |
| Grp31 | ES09 | L16 (50 Mbps) | ES09 | |

| RANGE id | BELONGING ES | BOTTLENECK LINK (BL) | REPRESENTATIVE ES | SUB RANGE |
|---|---|---|---|---|
| all | ES01, ES02, ES03, ES04, ES05, ES06, ES07, ES08, ES09, ES10 | — | FS | Grp1, Grp2, Grp3 |
| Grp1 | ES01, ES02, ES03, ES04, ES05 | L1 (25 Mbps) | ES01 | Grp11, Grp12, Grp13 |
| Grp2 | ES06, ES07, ES08 | L10 (20 Mbps) | ES08 | G21 |
| Grp3 | ES09, ES10 | L15 (30 Mbps) | ES10 | G31 |
| Grp11 | ES02 | L5 (80 Mbps) | ES02 | |
| Grp12 | ES03 | L6 (50 Mbps) | ES03 | |
| Grp13 | ES04, ES05 | L3 (30 Mbps) | ES04 | Grp131 |
| Grp21 | ES06, ES07 | L11 (30 Mbps) | ES06 | Grp211 |
| Grp31 | ES09 | L16 (50 Mbps) | ES09 | |
| Grp131 | ES05 | L8 (50 Mbps) | ES05 | |
| Grp211 | ES07 | L13 (50 Mbps) | ES07 | |

| id | DISTRIBUTION DATA | DISTRIBUTION SOURCE | DISTRIBUTION DESTINATION | PATH | SUPPOSED TP [Mbps] | DURATION [min] | ESTIMATED START TIME | ESTIMATED END TIME | PRECEDING DATA DISTRIBUTION |
|---|---|---|---|---|---|---|---|---|---|
| d00 | dataA | FS | ES08 | L0, L9, L10, L14 | 20 | 120 | 00:00 | 02:00 | - |
| d01 | dataA | FS | ES01 | L0, L1, L2, L4 | 25 | 96 | 00:00 | 01:36 | - |
| d02 | dataA | FS | ES10 | L0, L9, L15, L17 | 30 | 80 | 00:00 | 01:20 | - |

FIG. 35

NW LINK USE INFORMATION

NW LINK (L0) — 133a

| PERIOD START TIME | PERIOD END TIME | USE BAND [Mbps] | REMAINING BAND [Mbps] |
|---|---|---|---|
| 00:00 | 01:20 | 75 | 925 |
| 01:20 | 01:36 | 45 | 955 |
| 01:36 | 02:00 | 20 | 980 |

⋮

NW LINK (L9) — 133b

| PERIOD START TIME | PERIOD END TIME | USE BAND [Mbps] | REMAINING BAND [Mbps] |
|---|---|---|---|
| 00:00 | 01:20 | 50 | 0 |
| 01:20 | 02:00 | 20 | 30 |

⋮

NW LINK (L17) — 133e

| PERIOD START TIME | PERIOD END TIME | USE BAND [Mbps] | REMAINING BAND [Mbps] |
|---|---|---|---|
| 00:00 | 01:20 | 30 | 70 |

FIG. 36

| id | DISTRIBUTION DATA | DISTRIBUTION SOURCE | DISTRIBUTION DESTINATION | PATH | SUPPOSED TP [Mbps] | DURATION [min] | ESTIMATED START TIME | ESTIMATED END TIME | PRECEDING DATA DISTRIBUTION |
|---|---|---|---|---|---|---|---|---|---|
| d00 | dataA | FS | ES08 | L0, L9, L10, L14 | 20 | 120 | 00:00 | 02:00 | — |
| d01 | dataA | FS | ES01 | L0, L1, L2, L4 | 25 | 96 | 00:00 | 01:36 | — |
| d02 | dataA | FS | ES10 | L0, L9, L15, L17 | 30 | 30 | 00:00 | 01:20 | — |
| d03 | dataA | ES01 | ES04 | L4, L2, L3, L7 | 30 | 96 | 01:36 | 02:56 | d01 |
| d04 | dataA | ES01 | ES03 | L4, L6 | 50 | 48 | 01:36 | 02:24 | d01 |
| d05 | dataA | ES01 | ES02 | L4, L5 | 80 | 24 | 02:56 | 03:20 | d01 |
| d06 | dataA | ES08 | ES06 | L14, L11, L12 | 30 | 80 | 02:00 | 03:20 | d00 |
| d07 | dataA | ES10 | ES09 | L17, L16 | 50 | 48 | 01:20 | 02:08 | d02 |

| PERIOD START TIME | PERIOD END TIME | USE BAND [Mbps] | REMAINING BAND [Mbps] | |
|---|---|---|---|---|
| 00:00 | 01:36 | 25 | 75 | } USED BY d01 |
| 01:36 | 02:24 | 80 | 20 | } USED BY d03 AND d04 |
| 02:24 | 02:56 | 30 | 70 | } USED BY d04 |
| 02:56 | 03:20 | 80 | 20 | } USED BY d05 |

| id | DISTRIBUTION DATA | DISTRIBUTION SOURCE | DISTRIBUTION DESTINATION | PATH | SUPPOSED TP [Mbps] | DURATION [min] | ESTIMATED START TIME | ESTIMATED END TIME | PRECEDING DATA DISTRIBUTION |
|---|---|---|---|---|---|---|---|---|---|
| d00 | dataA | FS | ES08 | L0, L9, L10, L14 | 20 | 120 | 00:00 | 02:00 | — |
| d01 | dataA | FS | ES01 | L0, L1, L2, L4 | 25 | 96 | 00:00 | 01:36 | — |
| d02 | dataA | FS | ES10 | L0, L9, L15, L17 | 30 | 30 | 00:00 | 01:20 | — |
| d03 | dataA | ES01 | ES04 | L4, L2, L3, L7 | 30 | 96 | 01:36 | 02:56 | d01 |
| d04 | dataA | ES01 | ES03 | L4, L6 | 50 | 48 | 01:36 | 02:24 | d01 |
| d05 | dataA | ES01 | ES02 | L4, L5 | 80 | 24 | 02:56 | 03:20 | d01 |
| d06 | dataA | ES08 | ES06 | L14, L11, L12 | 30 | 80 | 02:00 | 03:20 | d00 |
| d07 | dataA | ES10 | ES09 | L17, L16 | 50 | 48 | 01:20 | 02:08 | d02 |
| d08 | dataA | ES04 | ES05 | L7, L8 | 50 | 48 | 02:56 | 03:44 | d03 |
| d09 | dataA | ES06 | ES07 | L12, L13 | 50 | 48 | 03:20 | 03:44 | d06 |

FIG. 44

| d10 | dataB | FS | ES08 | L0, L9, L10, L14 | 20 | 100 | — |
|-----|-------|----|----|------|----|----|---|

134a

NW LINK USE INFORMATION

NW LINK (L0) — 133a

| PERIOD START TIME | PERIOD END TIME | USE BAND [Mbps] | REMAINING BAND [Mbps] |
|---|---|---|---|
| 00:00 | 01:20 | 75 | 925 |
| 01:20 | 01:36 | 45 | 955 |
| 01:36 | 02:00 | 20 | 980 |

NW LINK (L9) — 133b

| PERIOD START TIME | PERIOD END TIME | USE BAND [Mbps] | REMAINING BAND [Mbps] |
|---|---|---|---|
| 00:00 | 01:20 | 50 | 0 |
| 01:20 | 02:00 | 20 | 30 |

NW LINK (L10) — 133c

| PERIOD START TIME | PERIOD END TIME | USE BAND [Mbps] | REMAINING BAND [Mbps] |
|---|---|---|---|
| 00:00 | 02:00 | 20 | 0 |

NW LINK (L14) — 133d

| PERIOD START TIME | PERIOD END TIME | USE BAND [Mbps] | REMAINING BAND [Mbps] |
|---|---|---|---|
| 00:00 | 02:00 | 20 | 80 |
| 02:00 | 03:20 | 30 | 70 |

⇒

| d10 | dataB | FS | ES08 | L0, L9, L10, L14 | 20 | 100 | 02:00 | 03:40 | — |
|-----|-------|----|----|------|----|----|----|----|---|

| id | DISTRIBUTION DATA | DISTRIBUTION SOURCE | DISTRIBUTION DESTINATION | PATH | SUPPOSED TP [Mbps] | DURATION [min] | ESTIMATED START TIME | ESTIMATED END TIME | PRECEDING DATA DISTRIBUTION |
|---|---|---|---|---|---|---|---|---|---|
| d00 | dataA | FS | ES08 | L0, L9, L10, L14 | 20 | 120 | 00:00 | 02:00 | — |
| d01 | dataA | FS | ES01 | L0, L1, L2, L4 | 25 | 96 | 00:00 | 01:36 | — |
| d02 | dataA | FS | ES10 | L0, L9, L15, L17 | 30 | 30 | 00:00 | 01:20 | — |
| d03 | dataA | ES01 | ES04 | L4, L2, L3, L7 | 30 | 96 | 01:36 | 02:56 | d01 |
| d04 | dataA | ES01 | ES03 | L4, L6 | 50 | 48 | 01:36 | 02:24 | d01 |
| d05 | dataA | ES01 | ES02 | L4, L5 | 80 | 24 | 02:56 | 03:20 | d01 |
| d06 | dataA | ES08 | ES06 | L14, L11, L12 | 30 | 80 | 02:00 | 03:20 | d00 |
| d07 | dataA | ES10 | ES09 | L17, L16 | 50 | 48 | 01:20 | 02:08 | d02 |
| d08 | dataA | ES04 | ES05 | L7, L8 | 50 | 48 | 02:56 | 03:44 | d03 |
| d09 | dataA | ES06 | ES07 | L12, L13 | 50 | 48 | 03:20 | 03:44 | d06 |
| d10 | dataB | FS | ES08 | L0, L9, L10, L14 | 20 | 100 | 02:00 | 03:40 | — |
| d11 | dataB | ES08 | ES06 | L14, L11, L12 | 30 | 67 | 03:40 | 04:46 | d10 |

FIG. 48

| id | DISTRIBUTION DATA | DISTRIBUTION SOURCE | DISTRIBUTION DESTINATION | PATH | SUPPOSED TP [Mbps] | DURATION [min] | ESTIMATED START TIME | ESTIMATED END TIME | PRECEDING DATA DISTRIBUTION |
|---|---|---|---|---|---|---|---|---|---|
| d00 | dataA | FS | ES08 | L0, L9, L10, L14 | 20 | 120 | 00:00 | 02:00 | — |
| d01 | dataA | FS | ES01 | L0, L1, L2, L4 | 25 | 96 | 00:00 | 01:36 | — |
| d02 | dataA | FS | ES10 | L0, L9, L15, L17 | 30 | 30 | 00:00 | 01:20 | — |
| d03 | dataA | ES01 | ES04 | L4, L2, L3, L7 | 30 | 96 | 01:36 | 02:56 | d01 |
| d04 | dataA | ES01 | ES03 | L4, L6 | 50 | 48 | 01:36 | 02:24 | d01 |
| d05 | dataA | ES01 | ES02 | L4, L5 | | | | | d01 |

| PERIOD START TIME | PERIOD END TIME | USE BAND [Mbps] | REMAINING BAND [Mbps] | |
|---|---|---|---|---|
| 00:00 | 01:36 | 25 | 75 | USED BY d01 |
| 01:36 | 02:24 | 80 | 20 | USED BY d03 AND d04 |
| 02:24 | 02:56 | 30 | 70 | USED BY d04 |

| id | DISTRIBUTION DATA | DISTRIBUTION SOURCE | DISTRIBUTION DESTINATION | PATH | SUPPOSED TP [Mbps] | DURATION [min] | ESTIMATED START TIME | ESTIMATED END TIME | PRECEDING DATA DISTRIBUTION |
|---|---|---|---|---|---|---|---|---|---|
| d00 | dataA | FS | ES08 | L0, L9, L10, L14 | 20 | 120 | 00:00 | 02:00 | – |
| d01 | dataA | FS | ES01 | L0, L1, L2, L4 | 25 | 96 | 00:00 | 01:36 | – |
| d02 | dataA | FS | ES10 | L0, L9, L15, L17 | 30 | 30 | 00:00 | 01:20 | – |
| d03 | dataA | ES01 | ES04 | L4, L2, L3, L7 | 30 | 96 | 01:36 | 02:56 | d01 |
| d04 | dataA | ES01 | ES03 | L4, L6 | 50 | 48 | 01:36 | 02:24 | d01 |
| d05 | dataA | ES01 | ES02 | L4, L5 | 20 | 48 | 01:36 | 02:24 | d01 |
|  |  |  |  |  | 70 | 21 | 02:24 | 02:45 |  |

| 133f | | | | |
|---|---|---|---|---|
| PERIOD START TIME | PERIOD END TIME | USE BAND [Mbps] | REMAINING BAND [Mbps] | |
| 00:00 | 01:36 | 25 | 75 | } USED BY d01 |
| 01:36 | 02:24 | 100 | 0 | } USED BY d03, d04, AND d5 (FOR 20 Mbps) |
| 02:24 | 02:45 | 100 | 0 | } USED BY d04 AND d5 (FOR 70 Mbps) |
| 02:45 | 02:56 | 30 | 70 | } USED BY d04 |

US 10,944,846 B2

DISTRIBUTION SCHEDULE CREATION METHOD AND DISTRIBUTION SCHEDULE CREATION APPARATUS

CROSS-REFERENCE TO RELATED APPLICATION

This application is based upon and claims the benefit of priority of the prior Japanese Patent Application No. 2016-105789, filed on May 27, 2016, the entire contents of which are incorporated herein by reference.

FIELD

The embodiments discussed herein are related to a distribution schedule creation method and a distribution schedule creation apparatus.

BACKGROUND

In a wide-area distributed environment, high-capacity data is distributed to a plurality of nodes in some cases. Hereinafter, an apparatus configured to provide data to be distributed will be referred to as a file server (FS), and a distribution destination of the data will be referred to as an edge server (ES). For example, the high-capacity data of several tens of gigabytes (GB) or higher is distributed to several tens of thousands of ESs installed in a plurality of bases in some cases.

In a case where the high-capacity data is distributed to the plurality of ESs, distribution scheduling is previously performed. In the distribution scheduling, an order of the data distribution is determined in a manner that a time (overall transmission time) until data transmission with respect to all of distribution requests accepted from data users is completed can be shortened as much as possible.

To efficiently execute the data distribution, multistage distribution using the ES that has received the data also as a distribution source is conceivable. In the multistage distribution, the data is transmitted from the FS to the ES as first-stage distribution. Then, the ES that has received the data functions as the distribution source and transmits the data to the other nearest ES that requests the same data in the second and subsequent stages.

As a technology related to improvement in a data distribution efficiency, for example, a multicast data distribution method is proposed in which an occurrence frequency of retransmission processing in multicast distribution is decreased, and a speed of the entire distribution processing is improved. In addition, in a case where a high volume of data is distributed to multiple terminals by using a communication circuit, a data distribution apparatus that may complete distribution to all of the terminals in a short period of time is also conceivable.

For example, Japanese Laid-open Patent Publication No. 2000-286845 and Japanese Laid-open Patent Publication No. 2000-022686 are described as related-art technologies.

In a case where the multistage distribution is performed, the time until the distribution is completed is affected by a communication speed (band) of a communication path between the distribution source and the distribution destination. In a search for a distribution schedule with which the distribution can be completed in a shortest period of time, overall distribution times are calculated with respect to all patterns of distribution orders regarding all combinations between the distribution sources and the distribution destinations. The above-mentioned calculation corresponds to a combination optimization problem, combinatorial explosion occurs in a major-scale network where a number of servers exist, and it becomes difficult to perform the calculation within a practical period of time.

SUMMARY

According to an aspect of the invention, a schedule-creation apparatus includes a memory configured to store topology information for indicating connection relationships among a data-provision apparatus configured to hold data of a distribution target, a plurality of distribution-destination apparatuses corresponding to distribution destinations of distribution targets, and a plurality of relay apparatuses configured to relay communications between the data-provision apparatus and the plurality of distribution-destination apparatuses and communication speeds of a plurality of respective links that establish communication connections between two apparatuses among the data-provision apparatus, the plurality of distribution-destination apparatuses, and the plurality of relay apparatuses; and a processor configured to classify the mutual distribution-destination apparatuses in which a link having a lowest communication speed on a communication path with the data-provision apparatus is common among the plurality of distribution-destination apparatuses into a same group based on the topology information, identify a first distribution-destination apparatus having a highest communication speed of a directly connected link among the distribution-destination apparatuses belonging to the group, and create a distribution schedule of the data in a manner that the data is transmitted from the data-provision apparatus to the first distribution-destination apparatus in the same group, and the data is transmitted from the first distribution-destination apparatus to a second distribution-destination apparatus other than the first distribution-destination apparatus in the group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of data distribution scheduling based on a bottom-left (BL) method;

FIG. 18 illustrates an example of range information;

FIG. 20 illustrates an example of distribution schedule information;

FIG. 27 is a first diagram illustrating a generation example of the range information;

FIG. 29 is a second diagram illustrating the generation example of the range information;

FIG. 31 is a third diagram illustrating the generation example of the range information;

FIG. 33 illustrates an example of the distribution schedule information after the distribution schedule creation in which a range of the entire NW is set as a target;

FIG. 35 illustrates an example of the NW link use information after the distribution schedule creation in which the range of the entire NW is set as the target;

FIG. 36 illustrates an example of the distribution schedule information after the distribution schedule creation in which the predetermined ranges are set as the targets;

FIG. 38 illustrates an example of the NW link use information of an NW link;

FIG. 39 illustrates an example of the distribution schedule information after the distribution schedule creation in which the other ranges are set as the targets;

FIG. 44 illustrates a distribution schedule determination example designed to one range of data;

FIG. 46 illustrates an example of the distribution schedule information after distribution schedule creation designed to another range;

FIG. 48 illustrates an example of distribution schedule information before distribution schedule determination of data distribution information;

FIG. 49 illustrates an example of the NW link use information of the NW link before the distribution schedule determination of the data distribution information;

FIG. 50 illustrates an example of the distribution schedule information after the distribution schedule determination of the data distribution information; and FIG. 51 illustrates an example of the NW link use information of the NW link after the distribution schedule determination of the data distribution information.

DESCRIPTION OF EMBODIMENTS

Hereinafter, exemplary embodiments of the present disclosure will be described with reference to the drawings. It is noted that the respective exemplary embodiments can be implemented by combining a plurality of exemplary embodiments with each other within a range without producing contradictions.

First Embodiment

Figure 1:
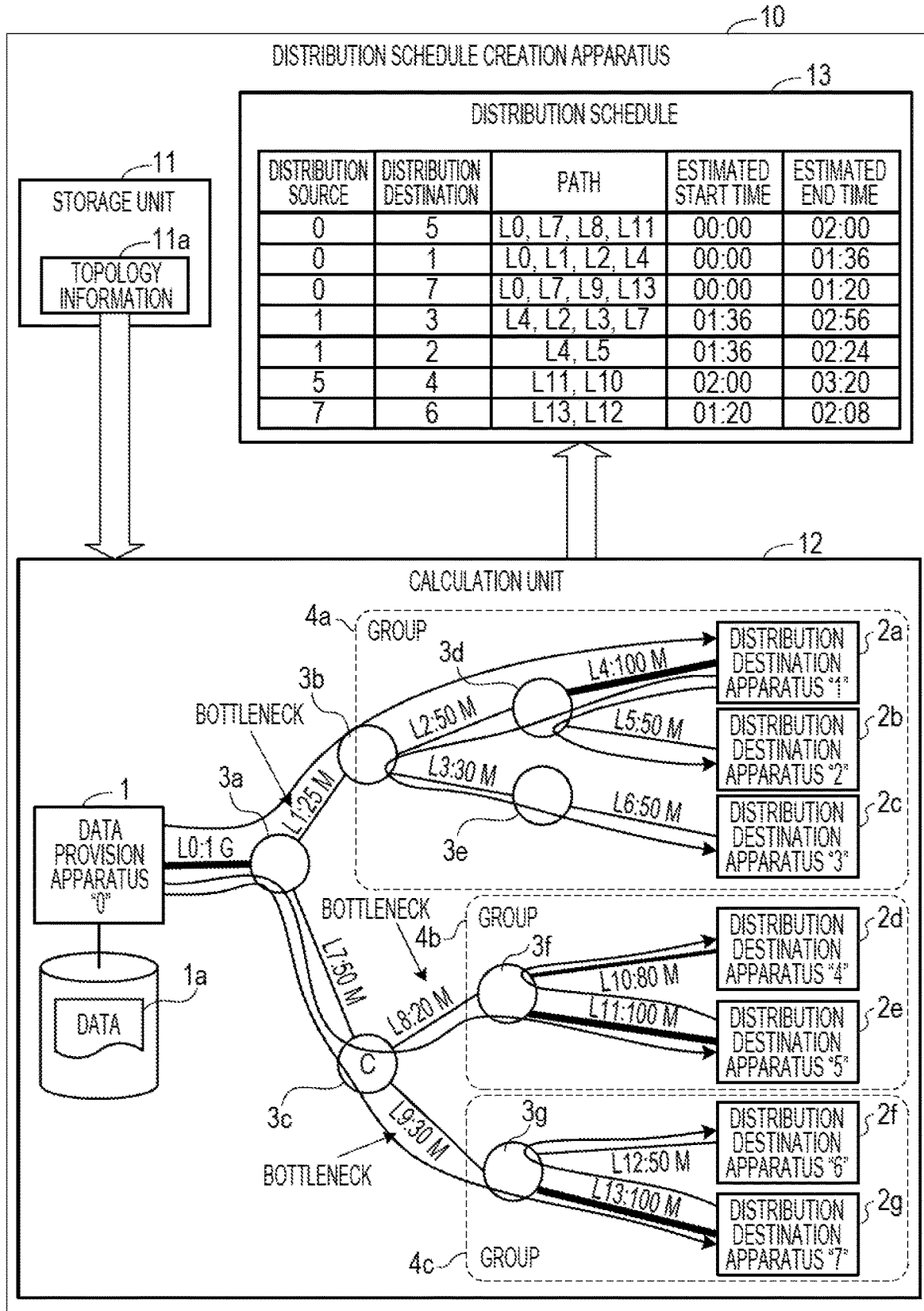
FIG. 1 illustrates a configuration example of a distribution schedule creation apparatus according to a first exemplary embodiment.

FIG. 1 illustrates a configuration example of a distribution schedule creation apparatus according to a first exemplary embodiment. A distribution schedule creation apparatus 10 includes a storage unit 11 and a calculation unit 12.

The storage unit 11 stores topology information 11*a* of a network where distribution of data 1*a* is performed. A data provision apparatus 1, distribution destination apparatuses 2*a* to 2*g*, and relay apparatuses 3*a* to 3*g* are included in the network. The data provision apparatus 1 is a computer configured to hold the data 1*a* corresponding to a distribution target. The distribution destination apparatuses 2*a* to 2*g* are devices such as computers corresponding to distribution destinations of the data. The relay apparatus 3*a* is a network device configured to relay a communication between the data provision apparatus 1 and the plurality of distribution destination apparatuses 2*a* to 2*g*. In addition, a plurality of links (identifiers "L1" to "L13") that each provide a communication connection between two apparatuses among the data provision apparatus 1, the plurality of distribution destination apparatuses 2*a* to 2*g*, and the plurality of relay apparatuses 3*a* to 3*g* are included in the network. The topology information 11*a* includes connection relationships based on the links of the data provision apparatus 1, the distribution destination apparatuses 2*a* to 2*g*, and the relay apparatuses 3a to 3g and respective communication speeds of the plurality of links (identifiers "L1" to "L13").

The calculation unit 12 creates a distribution schedule 13 of the data 1a based on the topology information 11a. For example, the calculation unit 12 classifies mutual distribution destination apparatuses in which a link (bottleneck link) having a lowest communication speed on a communication path with the data provision apparatus 1 is common among the plurality of distribution destination apparatuses 2a to 2g into same groups 4a to 4c. In the example of FIG. 1, in each of the distribution destination apparatuses 2a to 2c, the bottleneck link in the communication with the data provision apparatus 1 is the link having the identifier "L1". Therefore, the distribution destination apparatuses 2a to 2c are grouped into the same group 4a. In each of the distribution destination apparatuses 2d and 2e, the bottleneck link in the communication with the data provision apparatus 1 is the link having the identifier "L8". Therefore, the distribution destination apparatuses 2d and 2e are grouped into the same group 4b. In each of the distribution destination apparatuses 2f and 2g, the bottleneck link in the communication with the data provision apparatus 1 is the link having the identifier "L9". Therefore, the distribution destination apparatuses 2f and 2g are grouped into the same group 4c.

Next, the calculation unit 12 identifies first distribution destination apparatuses 2a, 2e, and 2g using a directly connected link having a highest communication speed among the distribution destination apparatuses belonging to the same groups 4a to 4c. Subsequently, the calculation unit 12 creates the distribution schedule 13 based on information of the distribution destination apparatuses belonging to the respective groups 4a to 4c and information of the identified first distribution destination apparatuses.

The created distribution schedule 13 indicates that, first, the data 1a is transmitted from the data provision apparatus 1 to the first distribution destination apparatuses 2a, 2e, and 2g in the groups. The distribution schedule 13 also indicates that the data 1a is transmitted from the first distribution destination apparatuses 2a, 2e, and 2g that have obtained the data to second distribution destination apparatuses 2b, 2c, 2d, and 2f other than the first distribution destination apparatuses 2a, 2e, and 2g in the groups.

While the distribution schedule 13 of the data 1a is created in the above-mentioned manner, the distribution schedule 13 can be created in a short period of time with which it is possible to perform the efficient data distribution. That is, the data transmission from the data provision apparatus 1 to the distribution destination apparatuses in the respective groups 4a to 4c is performed only once according to the distribution schedule 13. As a result, the data distribution via the link having the low communication speed corresponding to the bottleneck is performed only once, and an efficiency of the data distribution is improved. In addition, the distribution destination apparatus in which the communication speed of the directly connected link is the highest among the distribution destination apparatuses in the group is determined as the first distribution destination apparatus. With this configuration, when the data distribution is performed in the group, the data can be transmitted at a high speed from the first distribution destination apparatus corresponding to the distribution source, and even in a case where a plurality of distribution destinations exist, it is possible to perform the data transmission in a short period of time. As a result, an overall distribution time until the data distribution to all the distribution destination apparatuses is completed is shortened.

Furthermore, a calculation amount used to create the distribution schedule 13 is lower as compared with a case where the overall distribution times are compared with one another by generating all patterns in a distribution order with regard to all combinations between the distribution sources and the distribution destinations. For this reason, the creation of the distribution schedule can be performed in a short period of time.

It is noted that, when the data is distributed in each of the groups 4a to 4c too, the apparatuses other than the first distribution destination apparatus corresponding to the distribution source of the data are classified into a sub group, so that it is possible to create the efficient distribution schedule. In this case, when a plurality of the second distribution destination apparatuses belonging to the groups 4a to 4c exist, the calculation unit 12 classifies the mutual second distribution destination apparatuses in which the bottleneck link having the lowest communication speed on the communication path with the first distribution destination apparatus is common among the second distribution destination apparatuses into the same sub group. Next, the calculation unit 12 identifies the second distribution destination apparatus in which the communication speed of the directly connected link is the highest among the second distribution destination apparatuses belonging to the sub group as a third distribution destination apparatus. Subsequently, the calculation unit 12 creates the distribution schedule 13 by taking the sub group into account.

For example, the created distribution schedule indicates that, first, the data 1a is transmitted from the data provision apparatus 1 to the first distribution destination apparatuses in the groups 4a to 4c. In addition, the distribution schedule 13 indicates that the data 1a is transmitted from the first distribution destination apparatus that has received the data 1a to the third distribution destination apparatus in the sub group. Moreover, the distribution schedule 13 indicates that the data 1a is transmitted from the third distribution destination apparatus to a fourth distribution destination apparatus other than the third distribution destination apparatus in the sub group.

In this manner, the sub groups are created in the groups 4a to 4c, and the data transfer in the groups are also efficiently performed, so that it is possible to further shorten the overall transmission time corresponding to the time used for the data distribution to all the distribution destination apparatuses 2a to 2g. It is noted that, while the sub group is further created in the sub group, it is possible to substantially efficiently create the distribution schedule even in a major-scale network.

In addition, in a case where the plurality of groups 4a to 4c exist, it is possible to determine a transmission order of the data to the first distribution destination apparatuses in the respective groups such that the overall transmission time is shortened. For example, the calculation unit 12 creates the distribution schedule 13 in a manner that, as the group has a lower communication speed of the bottleneck link common to the first distribution destination apparatus belonging to each group, the transmission of the data 1a to the first distribution destination apparatus in the above-mentioned group is more preferentially performed. That is, the calculation unit 12 selects the group in an ascending order from the group having the lower communication speed of the bottleneck link and allocates unused communication resources of the respective links to the data transmission processing addressed to the first distribution destination apparatus in the selected group such that the data transmission can be started as soon as possible. With this configuration, it is possible to start the data transmission in an early stage to the first distribution destination apparatus that takes time to perform the data transmission since the communication speed is low, and lengthening of the overall transmission time is suppressed.

Furthermore, in a case where plural pieces of data of the distribution targets exist, it is possible to determine an order of the pieces of data to be transmitted such that the overall transmission time can be shortened. For example, the calculation unit 12 calculates a total communication amount based on sizes of the data and the number of the distribution destination apparatuses that request the distribution of the data with respect to each of the plural pieces of data. The total communication amount is a value indicating an accumulating total of the data amount transmitted until the data is distributed to all the distribution destination apparatuses that request the data distribution. For example, a value obtained by multiplying the number of the distribution destination apparatuses that request the distribution of the data by the sizes of the data is set as the total communication amount. Subsequently, the calculation unit 12 creates the distribution schedule 13 such that, as the data has a higher total communication amount, the transmission of the data is more preferentially performed. That is, the calculation unit 12 selects the data in a descending order from the higher total communication amount and allocates the unused communication resources of the respective links to the transmission processing of the selected data to the distribution destination apparatus that requests the relevant data such that the data transmission can be started as soon as possible. With this configuration, as the data takes more time to be distributed to all of the distribution destination apparatuses that request the data since the total communication amount of the data is higher, the data is transmitted earlier, and it is possible to suppress the lengthening of the overall transmission time.

The communication speed of the data can be dynamically changed in some cases in accordance with controls of the data provision apparatus 1 and the distribution destination apparatuses 2a to 2g. In the above-mentioned case, when even a slight band is unused in the link, the band can be effectively used, and it is possible to efficiently perform the data distribution. For example, the calculation unit 12 determines the data provision apparatus 1 or the other distribution destination apparatus corresponding to the distribution source of the data, a period during which the distribution destination apparatus receives the data distribution, and a communication speed of the distribution for each distribution destination apparatus. In the determination on the communication speed, the calculation unit 12 calculates a remaining band obtained by subtracting a communication speed of the data distribution using the link from a communication speed of the link for each link on the communication path with the apparatus corresponding to the distribution source of the data. Subsequently, the calculation unit 12 determines the communication speed in accordance with the remaining band of the link that has the least remaining band in a time slot for each of a plurality of time slots. In this manner, it is possible to shorten the overall transmission time by effectively using the sparing remaining band.

It is noted that the calculation unit 12 can be implemented, for example, by a processor included in the distribution schedule creation apparatus 10. In addition, the storage unit 11 can be implemented, for example, by a memory or a storage apparatus (e.g. a hard disk drive (HHD) or a solid state drive (SSD)) included in the distribution schedule creation apparatus 10.

Second Exemplary Embodiment

Next, a second exemplary embodiment will be described. The second exemplary embodiment is implemented by further objectifying the processing according to the first exemplary embodiment.

Figure 2:
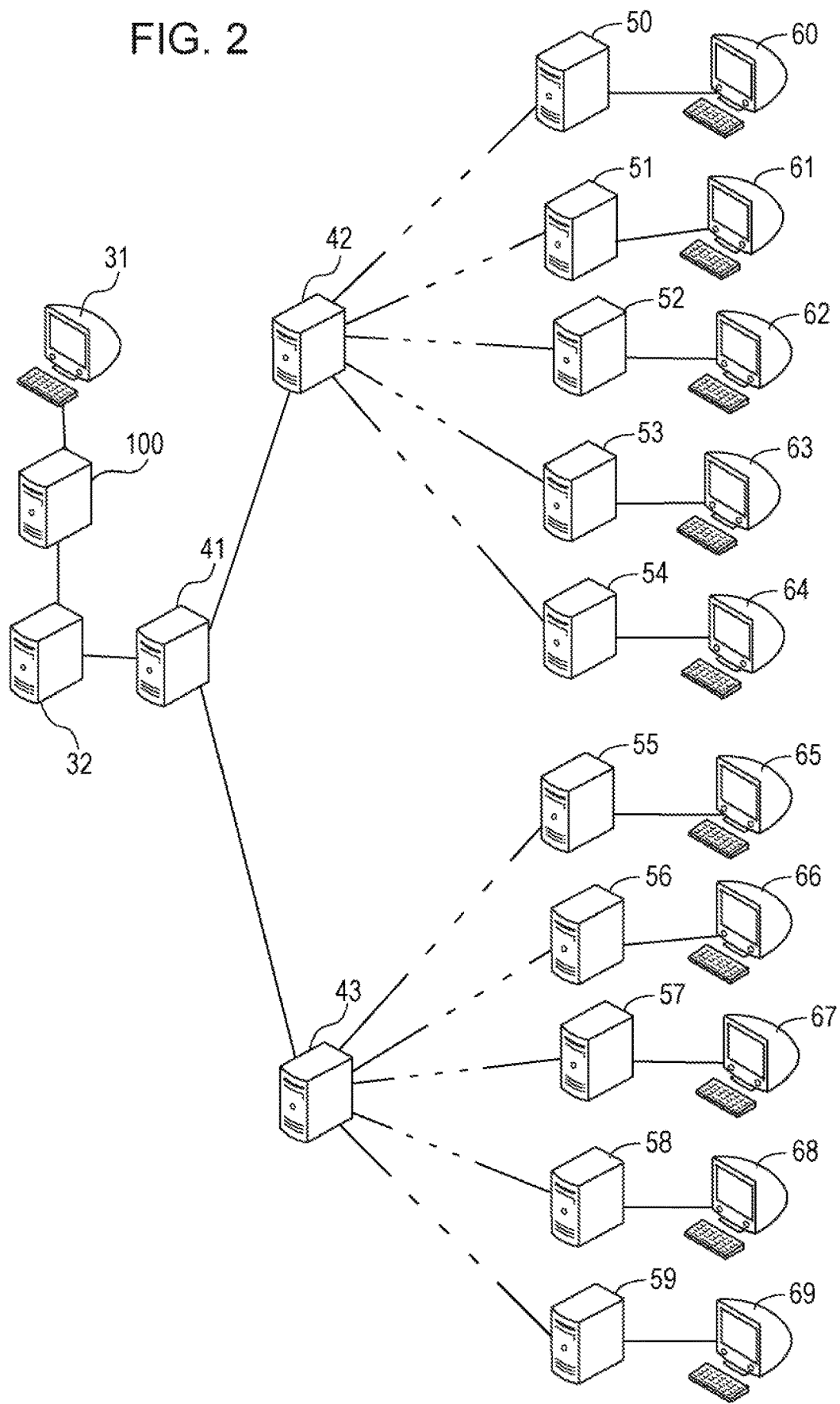
FIG. 2 illustrates a system configuration example of a second exemplary embodiment.

FIG. 2 illustrates a system configuration example according to the second exemplary embodiment. A terminal apparatus 31 used by a data provider is connected to a distribution management system 100. The distribution management system 100 is a computer configured to manage the data distribution. The distribution management system 100 is connected to an FS 32. The FS 32 is connected to a plurality of ESs 50 to 59 via a plurality of relay nodes 41, 42, 43, . . . . Terminal apparatuses 60 to 69 used by the data user are connected to the respective ESs 50 to 59. It is noted that only a single terminal apparatus is connected to a single ES in the example of FIG. 2, but a plurality of terminal apparatuses can also be connected to a single ES.

The data provider stores the distributed data in the FS 32 via the distribution management system 100 by using the terminal apparatus 31. The data user uses the terminal apparatuses 60 to 69 to specify the data to be used. When the data to be used is specified, for example, distribution requests of the data are transmitted from the ESs 50 to 59 to the distribution management system 100. The distribution management system 100 creates the distribution schedule of the data stored in the FS 32 based on the distribution requests of the data. When the distribution schedule is created, the distribution management system 100 instructs the FS 32 or the respective ESs 50 to 59 to transfer the data in accordance with the above-mentioned distribution schedule.

Figure 3:
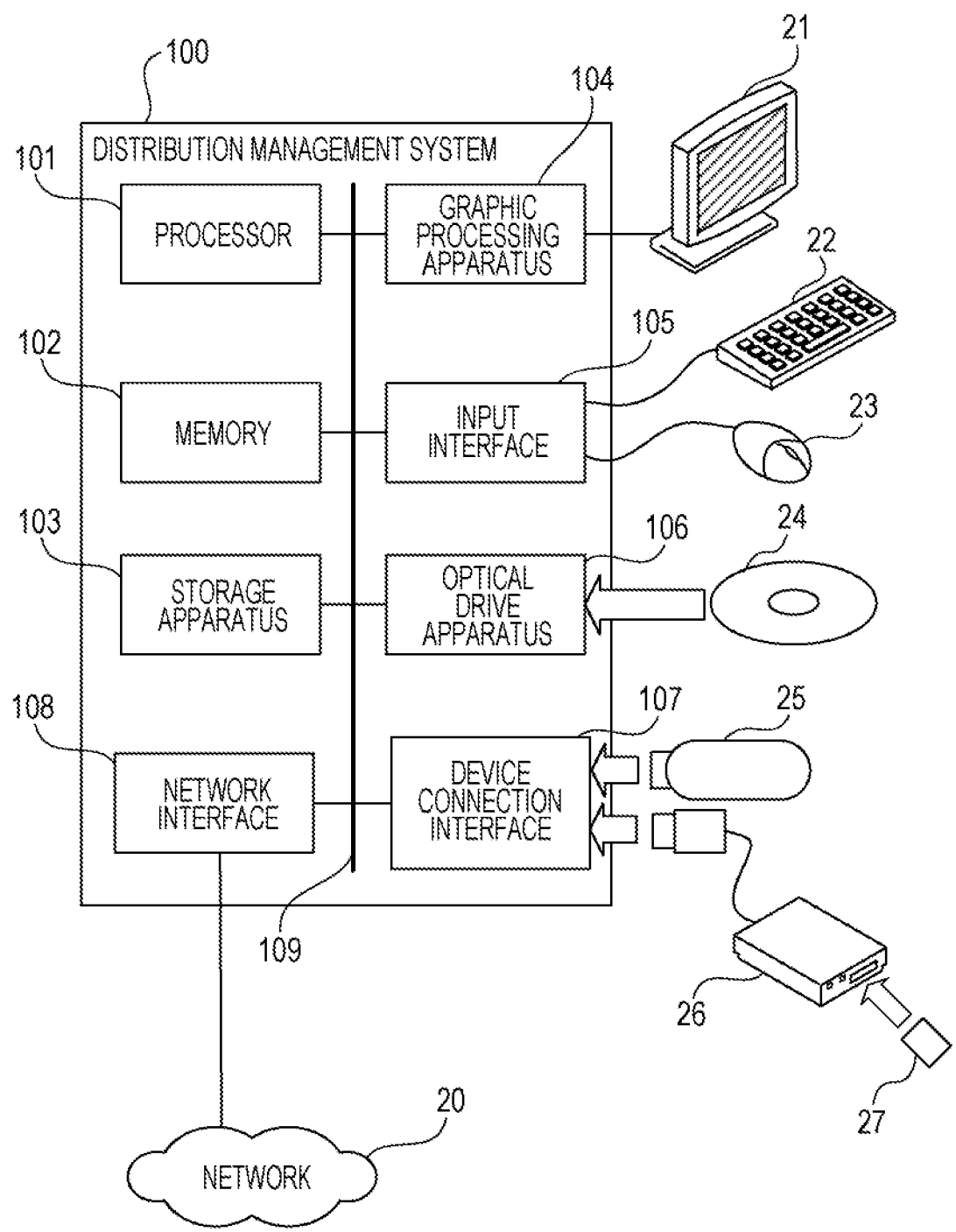
FIG. 3 illustrates a hardware configuration example of a distribution management system used in the second exemplary embodiment.

FIG. 3 illustrates a hardware configuration example of the distribution management system used in the second exemplary embodiment. In the distribution management system 100, the entire apparatus is controlled by a processor 101. A memory 102 and a plurality of peripheral devices are connected to the processor 101 via a bus 109. The processor 101 may be a multiprocessor. The processor 101 is, for example, a central processing unit (CPU), a micro processing unit (MPU), or a digital signal processor (DSP). At least a part or any combination of functions realized when the processor 101 executes a program may be realized by an electronic circuit such as an application specific integrated circuit (ASIC) or a programmable logic device (PLD).

The memory 102 is used as a main storage apparatus of the distribution management system 100. The memory 102 temporarily stores at least a part or any combination of a program of an operating system (OS) and an application program executed by the processor 101. In addition, the memory 102 stores various data used for the processing by the processor 101. A volatile semiconductor storage apparatus such as a random access memory (RAM) is used as the memory 102, for example.

The peripheral devices connected to the bus 109 include the storage apparatus 103, a graphic processing apparatus 104, an input interface 105, an optical drive apparatus 106, a device connection interface 107, and a network interface 108.

The storage apparatus 103 electrically or magnetically performs write or read of data with respect to a built-in storage medium. The storage apparatus 103 is used as an auxiliary memory apparatus of the computer. The storage apparatus 103 stores the OS program, the application program, and various data. It is noted that a hard disk drive (HHD) or a solid state drive (SSD) can be used as the storage apparatus 103, for example.

A monitor 21 is connected to the graphic processing apparatus 104. The graphic processing apparatus 104 displays an image on a screen of the monitor 21 in accordance with a command from the processor 101. The monitor 21 includes a display apparatus using a cathode ray tube (CRT), a liquid crystal display apparatus, or the like.

A key board 22 and a mouse 23 are connected to the input interface 105. The input interface 105 transmits a signal sent from the key board 22 or the mouse 23 to the processor 101. It is noted that the mouse 23 is an example of a pointing device, and another pointing device may also be used. The other pointing device includes a touch panel, a tablet, a touch pad, a track ball, or the like.

The optical drive apparatus 106 reads data recorded on an optical disc 24 by using laser light or the like. The optical disc 24 is a portable recording medium on which data is recorded in a manner that the data can be read by light reflection. The optical disc 24 includes Digital Versatile Disc (DVD), DVD-RAM, Compact Disc Read Only Memory (CD-ROM), CD-Recordable (CD-R), CD-ReWritable (CD-RW), or the like.

The device connection interface 107 is a communication interface for connecting the peripheral devices to the distribution management system 100. For example, a memory apparatus 25 and a memory reader writer 26 can be connected to the device connection interface 107. The memory apparatus 25 is a recording medium provided with a communication function with the device connection interface 107. The memory reader writer 26 is an apparatus configured to perform data write to a memory card 27 or data read from the memory card 27. The memory card 27 is a card type recording medium.

The network interface 108 is connected to a network 20. The network interface 108 performs transmission and reception of the data with another computer or communication device via the network 20.

According to the above-mentioned hardware configuration, the processing function of the second exemplary embodiment can be realized. It is noted that the terminal apparatuses 31 and 60 to 69, the FS 32, the relay nodes 41, 42, 43, . . . , and the ESs 50 to 59 can also be realized by hardware similar to the distribution management system 100. In addition, the distribution schedule creation apparatus 10 illustrated according to the first exemplary embodiment can also be realized by hardware similar to the distribution management system 100 illustrated in FIG. 3.

The distribution management system 100 executes, for example, a program recorded in a computer-readable recording medium, so that the processing function of the second exemplary embodiment is realized. A program in which a processing content executed by the distribution management system 100 is described can be recorded in various recording media. For example, the program executed by the distribution management system 100 can be stored in the storage apparatus 103. The processor 101 loads at least a part or any combination of the programs in the storage apparatus 103 onto the memory 102 to execute the program. In addition, the program executed by the distribution management system 100 can also be recorded in a portable recording medium such as the optical disc 24, the memory apparatus 25, or the memory card 27. After the program stored in the portable recording medium is installed into the storage apparatus 103 by the control from the processor 101, for example, the program can be executed. In addition, the processor 101 can directly read out the program from the portable recording medium and execute the program.

Figure 4:
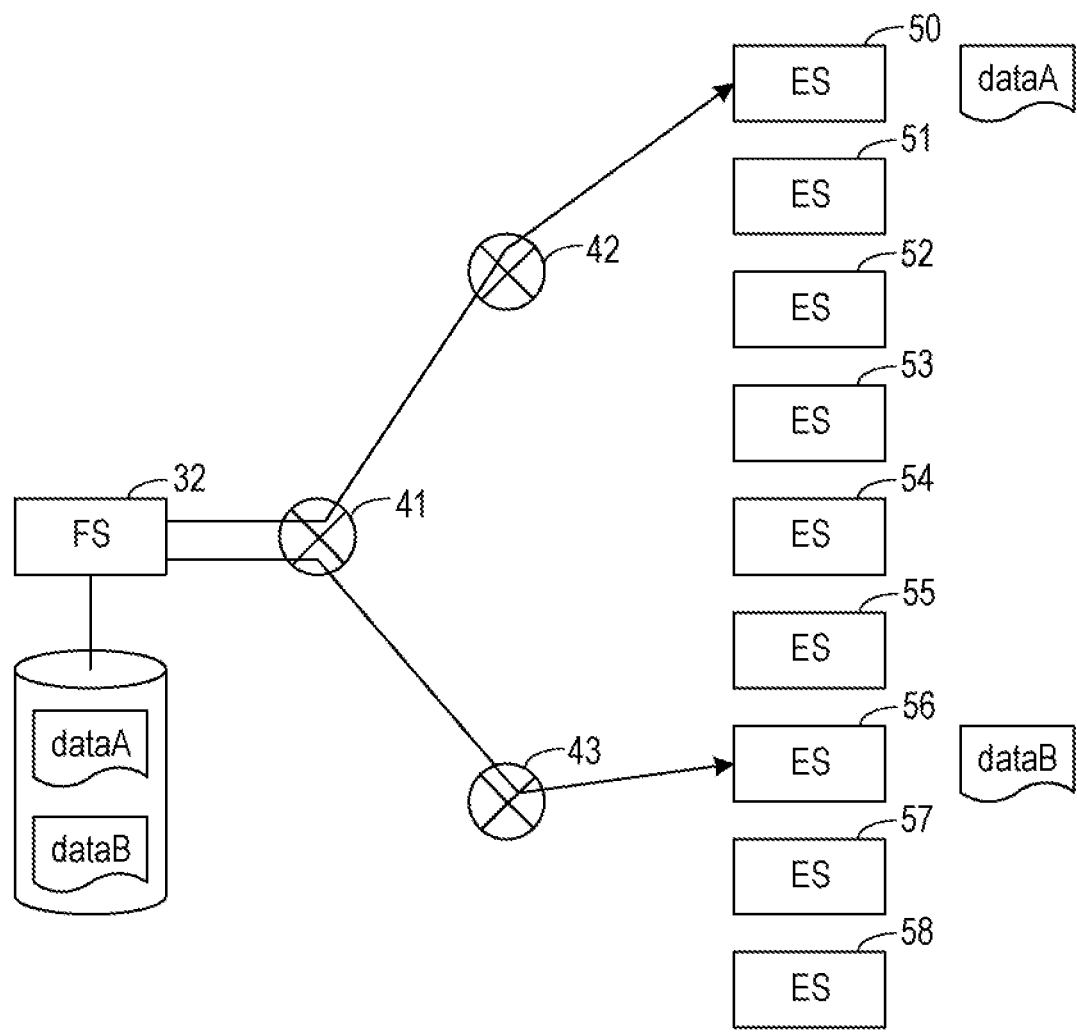
FIG. 4 illustrates an example of data transfer in a first stage of multistage distribution.

Next, with reference to FIG. 4 and FIG. 5, the multistage distribution will be described. FIG. 4 illustrates an example of data transfer in a first stage of the multistage distribution. In the example of FIG. 4, a case is supposed where "dataA" is distributed to the ESs 50 to 55, and "dataB" is distributed to the ESs 56 to 58. In the data transfer in the first stage, the respective pieces of data are transmitted from the FS 32 to one of the ESs. In the example of FIG. 4, "dataA" is transmitted to the ES 50, and "dataB" is transmitted to the ES 56.

Figure 5:
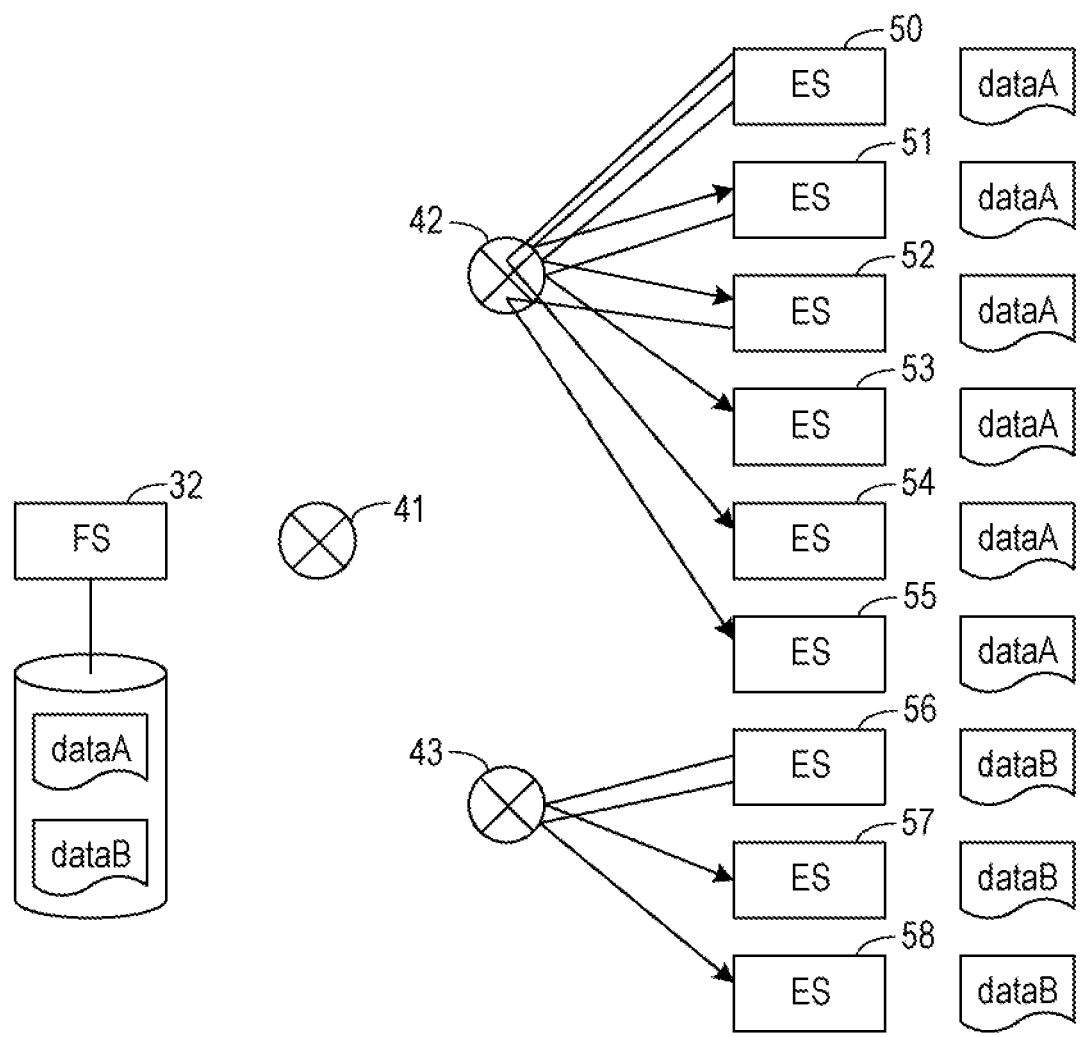
FIG. 5 illustrates an example of the data transfer in second and subsequent stages of the multistage distribution.

FIG. 5 illustrates an example of the data transfer in second and subsequent stages of the multistage distribution. Data transfer is performed between the ESs in the data transmission in the second and subsequent stages. That is, the ES that has received the data functions as the transmission source and transmits the data to the other ESs that request the same data in the second and subsequent stages. In the example of FIG. 5, "dataA" is transmitted from the ES 50 to the ESs 51, 52, and 54, and is thereafter transmitted from the ES 51 to the ES 53 and also transmitted from the ES 52 to the ES 55. On the other hand, "dataB" is transmitted from the ES 56 to the ESs 57 and 58.

The creation of the distribution schedule with which the above-mentioned multistage distribution is efficiently performed is a combination optimization problem for determining pairings of the distribution sources and the distribution destinations and distribution orders of the respective pairs. At this time, combinatorial explosion occurs if all the patterns are calculated, and calculations are not completed in a practical period of time.

A calculation amount in a case where all the patterns are calculated is $O(N^5)$ based on order notation. A detail thereof is as follows. [Step A] Calculation of the distribution paths: calculation of the distribution paths to all the ESs in which the FS and all the ESs are set as starting points (distribution sources). [Step B] Determination of the distribution schedule: calculation of the distribution times in respective combinations patterns of the distribution destinations, the distribution sources, and the distribution orders by using the calculated paths, and selection of the combination in which the overall distribution time is minimized.

In a case where the number of ESs is N (N is an integer higher than or equal to 1), the calculation amount of each processing can be estimated in the following manner.

The calculation amount of step A: $O(N^2 \log N)$

The calculation amount of the path calculation from one starting point to all the ESs becomes $O(N \log N)$ using Dijkstra method. To calculate the paths where the FS and all the ESs are set as the starting points, the calculation amount becomes $O(N^2 \log N)$.

The calculation amount of step B: $O(N^5)$

The number of pairs of the distribution sources and the distribution destinations is $N^2$. The distribution orders for the distributions to the respective pairs are up to $N^2$ steps in a case where the distribution is performed per pair. Since timings for the distributions to the respective pairs become any timing among the $N^2$ steps, the total number of combinations becomes $(N^2)^2 = N^4$. In the respective combinations, since a check on whether or not the data transmission is performed beyond the band of the network (NW) link on the distribution path with regard to the N data distributions, the calculation amount becomes $O(N^5)$.

In a case where the distribution times in all the combinations are calculated in the above-mentioned manner, when the number of ESs (N) is increased, the calculation amount is sharply increased. In view of the above, it is conceivable to carry out an approximate calculation to create the distribution schedule with which it is possible to efficiently perform the data distribution. For example, the data distribution scheduling can be considered as one type of a two-dimensional packing problem.

The two-dimensional packing problem is a combination optimization problem for calculating, when provided rectangles are arranged in a plane, how each rectangle is fitted into the plane (combinations of rectangles arrangements). A solution (approximate method) such as a bottom-left method (BL method) is devised for the two-dimensional packing problem. The BL method is a technique for repeating fitting of as many rectangles on the bottom and also on the left as possible.

When the BL method is applied to the data distribution scheduling problem, the BL method becomes a problem on how the rectangles representing the data distribution amounts are fitted into a space corresponding to the band (resource) of the NW link. FIG. 6 illustrates an example of the data distribution scheduling based on the BL method. According to the BL method, bands and times used for the data transmissions to the respective ESs 50 to 53 are represented by rectangles. For example, a length in a vertical direction of the rectangle indicates a use band, and a length in a horizontal direction of the rectangle indicates a distribution time. In this case, the respective rectangles are arranged so as to fit as many rectangles on the bottom and also on the left as possible in a space in which the time is plotted on a horizontal axis and the band is plotted on a vertical axis. The efficient distribution schedule is created in the above-mentioned manner.

It is noted however that a case where the transmission source is only the FS 32 is supposed in the BL method illustrated in FIG. 6. When the multistage distribution is performed, a plurality of transmission sources exist, and it is difficult to create the efficient distribution schedule by simply using only the BL method. Furthermore, one NW link is set as a target in the two-dimensional packing problem, and the two-dimensional packing problem is not directly applied to a plurality of NW links.

In view of the above, according to the second exemplary embodiment, attention is paid to the following two points, and the efficiency of the distribution schedule is improved. Characteristic A) the transmission time for the data transmission via the NW link having the low band becomes longer. Characteristic B) The ES that has received the data earlier transmits the data to more ESs.

Figure 7:
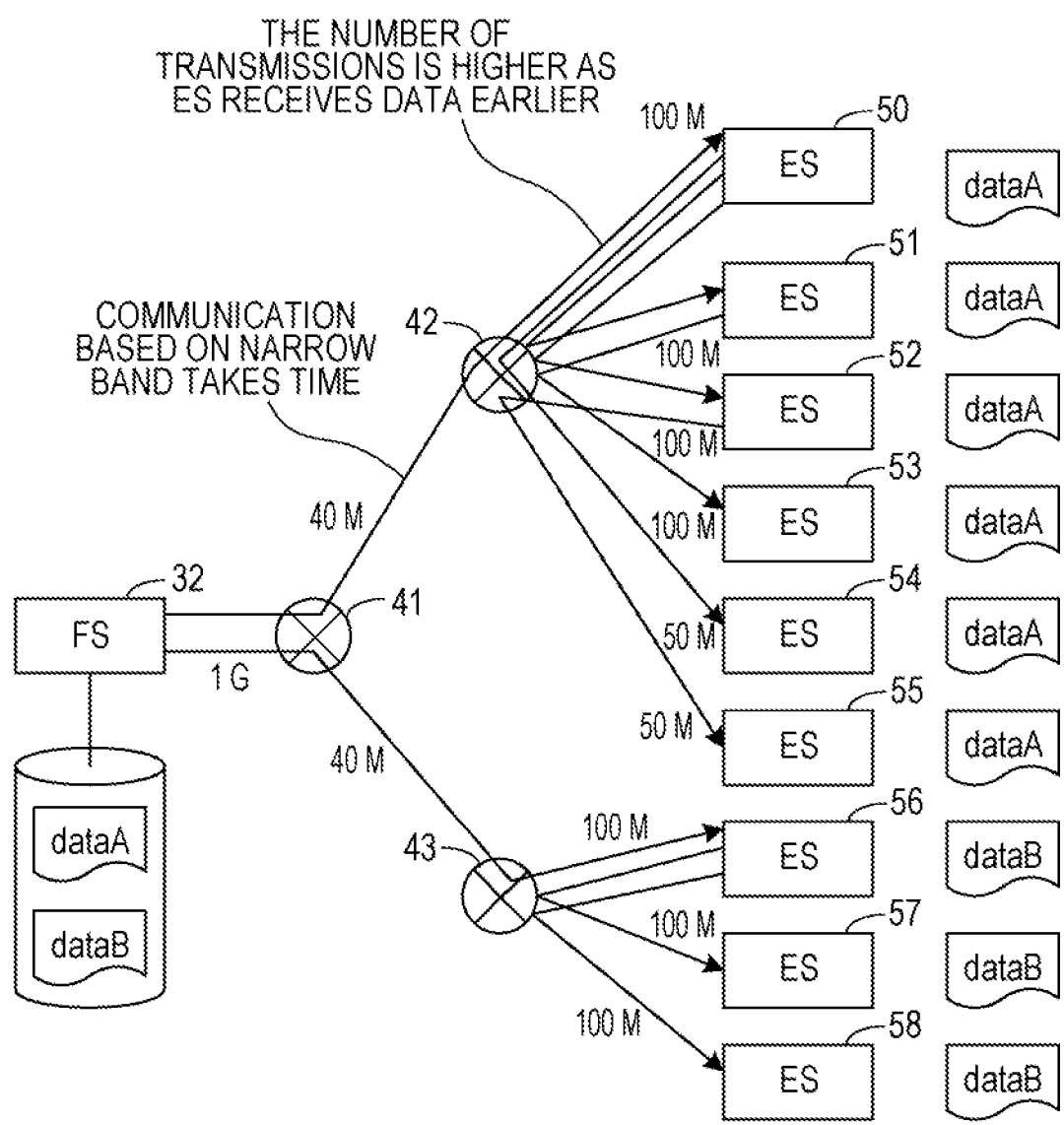
FIG. 7 is an explanatory diagram for describing focus points for improvement in a distribution schedule efficiency.

FIG. 7 is an explanatory diagram for describing focus points for improvement in the distribution schedule efficiency. In the example of FIG. 7, the band of the NW link between the relay node 41 and the relay node 42 is 40 Mbps, which is narrower than the band of the other NW link (that is, the communication speed is slower). For this reason, the data transmission through the NW link between the relay node 41 and the relay node 42 takes time (characteristic A). In addition, the ES 50 that has received the data from the FS 32 first transmits the data to the other three ESs 51, 52, and 54. On contrast to this, the ES 56 transmits the data to the other two ESs, and the ESs 51 and 52 respectively transmit the data to the other single ES. In this manner, as the ES has received the data earlier, the number of data transmissions is higher than the other ESs (characteristic B). As the stage number in the multistage distribution is later in the above-mentioned manner, the number of ESs that have already received the data is increased, and the number of ESs that have not received the data is decreased. As a result, as the ES has a later data reception time, the number of ESs corresponding to the data distribution targets thereafter is lower, and the number of data transmissions is lower.

The distribution management system 100 according to the second exemplary embodiment appropriately executes grouping of the ES groups where an inter-ES distribution is performed by taking into account the above-mentioned two focus points, so that the efficiency of the data transfer is improved. Hereinafter, the ES group after the grouping will be referred to as an inter-ES distribution range (or simply referred to as a "range"). The inter-ES distribution is performed only within the inter-ES distribution range. The inter-ES distribution range is an example of the group or the sub group described according to the first exemplary embodiment. It is noted that, according to the second exemplary embodiment, the entire network is treated as a single range (major group), and another range generated within the single range will be referred to as a sub range with respect to the range of the generation source.

Figure 8:
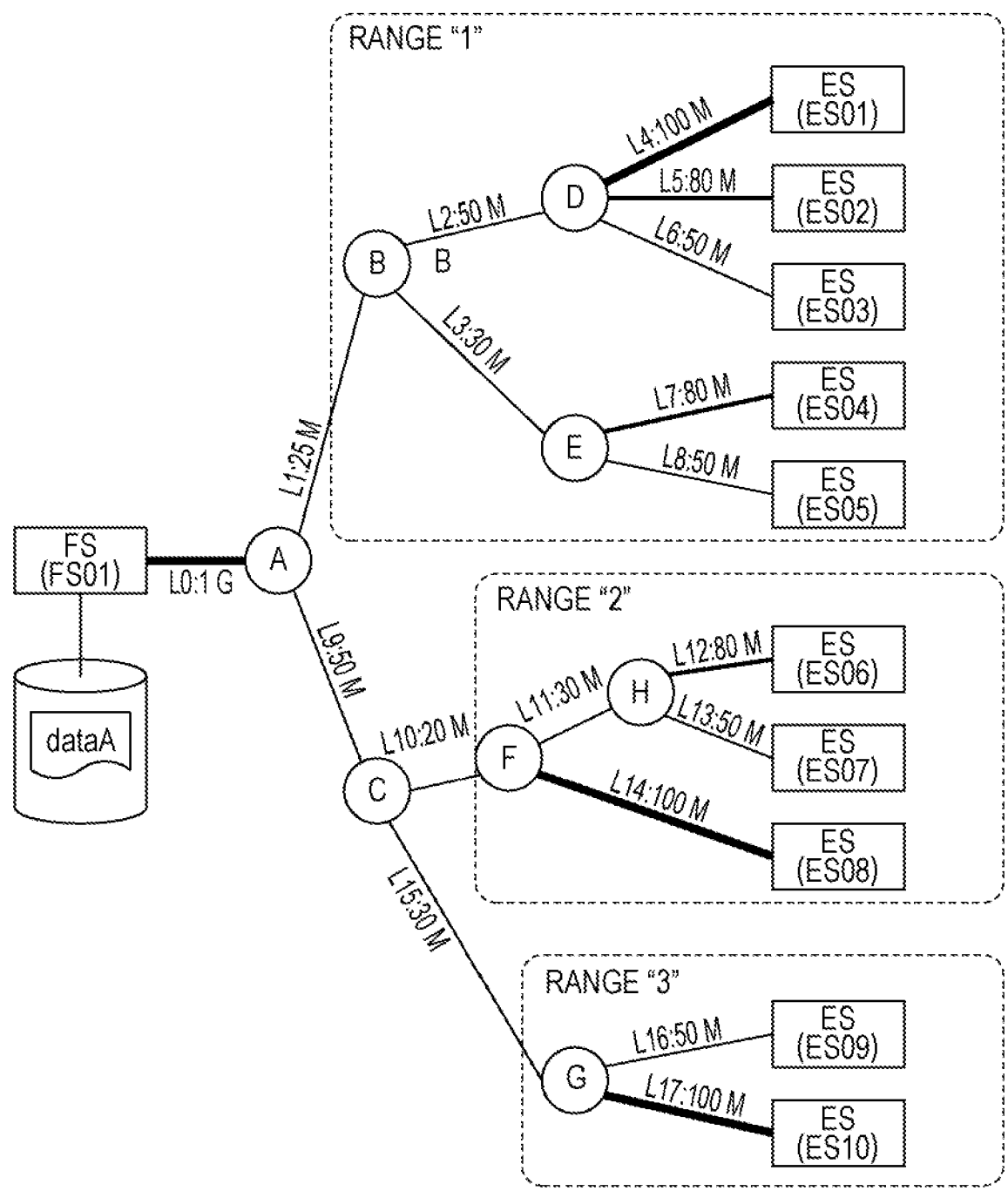
FIG. 8 illustrates a determination example of an inter-edge server (inter-ES) distribution range.

FIG. 8 illustrates a determination example of the inter-ES distribution range. NW topology illustrated in FIG. 8 includes a single FS, eight relay nodes, and ten ESs. The FS is assigned with an identifier "FS01". This FS will be hereinafter referred to as an FS "FS01". The eight relay nodes are respectively assigned with identifiers "A" to "H". These relay nodes will be hereinafter referred to as relay nodes "A" to "H". The ten ESs are respectively assigned with identifiers "ES01" to "ES10". These ESs will be hereinafter referred to as ESs "ES01" to "ES10".

The distribution management system 100 narrows down the range where the data transmission is performed between the ESs to shorten the calculation time. Subsequently, the distribution management system 100 performs the creation processing of the distribution schedule while being dissolved in the narrowed-down range to reduce the number of distribution destination candidates in the respective ranges.

When the narrowing-down is performed, in order to also shorten the overall transmission time, the distribution management system 100 pays attention to the distribution paths from the transmission source to the respective addresses and narrows down the ESs where the bottleneck link (BL: the NW link having the lowest band in the distribution paths) is the same as the range of the inter-ES distribution. That is, attention is paid on the above-mentioned characteristic A, and the distribution management system 100 avoids as many data transmissions via the NW links having a narrow band as possible and shortens the individual data transmission times.

In the example of FIG. 8, the range is determined based on the BL in a case where the data is distributed from the FS "FS01" to the respective ESs "ES01" to "ES10". In FIG. 8, the FS "FS01" and the ESs "ES01" to "ES10" are connected to one another via the relay nodes "A" to "H". The apparatuses are connected to one another via NW links assigned with the identifiers "L0" to "L17" (hereinafter, will be referred to as NW links "L0" to "L17"). In FIG. 8, bands (bps) of the NW links are indicated along line segments representing the respective NW links.

Here, the BLs between the FS "FS01" and the respective ESs "ES01" to "ES10" will be discussed. The NW link "L1" becomes the BL in each of the ESs "ES01" to "ES5". Thus, the ESs "ES01" to "ES5" are grouped as one range. The NW link "L10" becomes the BL in each of the ESs "ES06" to "ES08". Thus, the ESs "ES06" to "ES08" are grouped as one range. The NW link "L15" becomes the BL in each of the ESs "ES09" and "ES10". Thus, the ESs "ES09" and "ES10" are grouped as one range.

Figure 9:
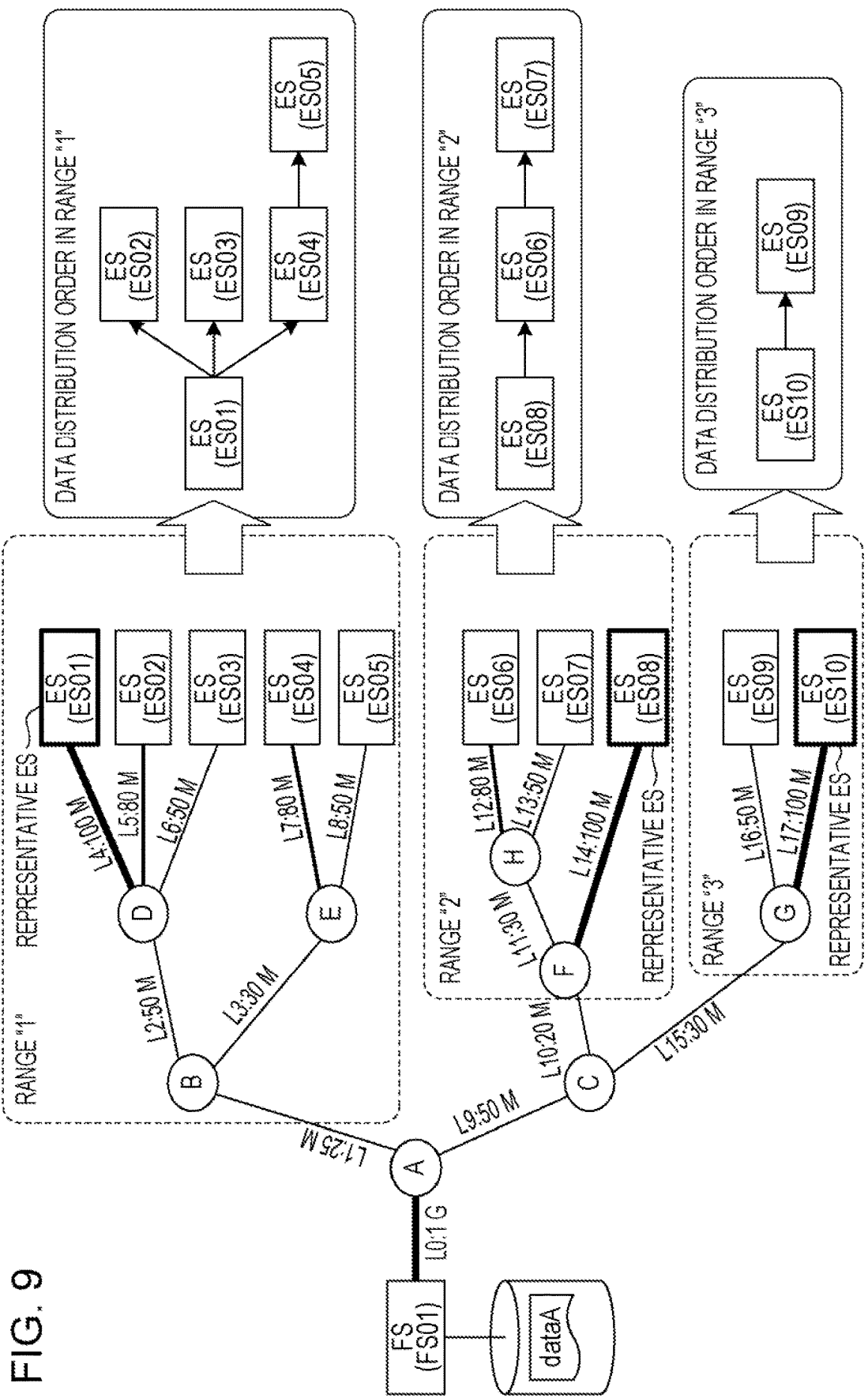
FIG. 9 illustrates a determination example of a representative ES.

After the ranges are determined, the distribution management system 100 determines an ES (representative ES) that receives the data first within each of the ranges to shorten the data transmission time in each of the ranges of the inter-ES distribution. FIG. 9 illustrates a determination example of the representative ES. The distribution management system 100 pays attention to the NW links directly connected to the respective ESs "ES01" to "ES10" and selects the ES where the band of the NW link is maximized as the representative ES. That is, while attention is paid to the characteristic B, the distribution management system 100 transmits the data to the representative ES with which the throughput at the time of the transmission is increased on a priority basis to improve the efficiency of the inter-ES distribution. In the example of FIG. 9, the ESs "ES01", "ES08", and "ES10" become the representative ESs in the respectively belonging ranges.

The distribution management system 100 also generates sub ranges in the respective ranges by using the bottleneck link of the distribution path from the representative ES to the other ESs in the same range and selects the representative ESs in the sub ranges. With this configuration, it is also possible to efficiently perform the distribution in the second and subsequent stages of the multistage distribution.

For example, the ES "ES01" that has received the data from the FS "FS01" transmits the data to the ESs "ES02" to "ES04" in a range "1". Next, the ES "ES04" transmits the data to the ES "ES05". The ES "ES08" that has received the data from the FS "FS01" transmits the data to the ES "ES06" in a range "2". Next, the ES "ES06" transmits the data to the ES "ES07". The ES "ES10" that has received the data from the FS "FS01" transmits the data to the ES "ES09" in a range "3".

Figure 10:
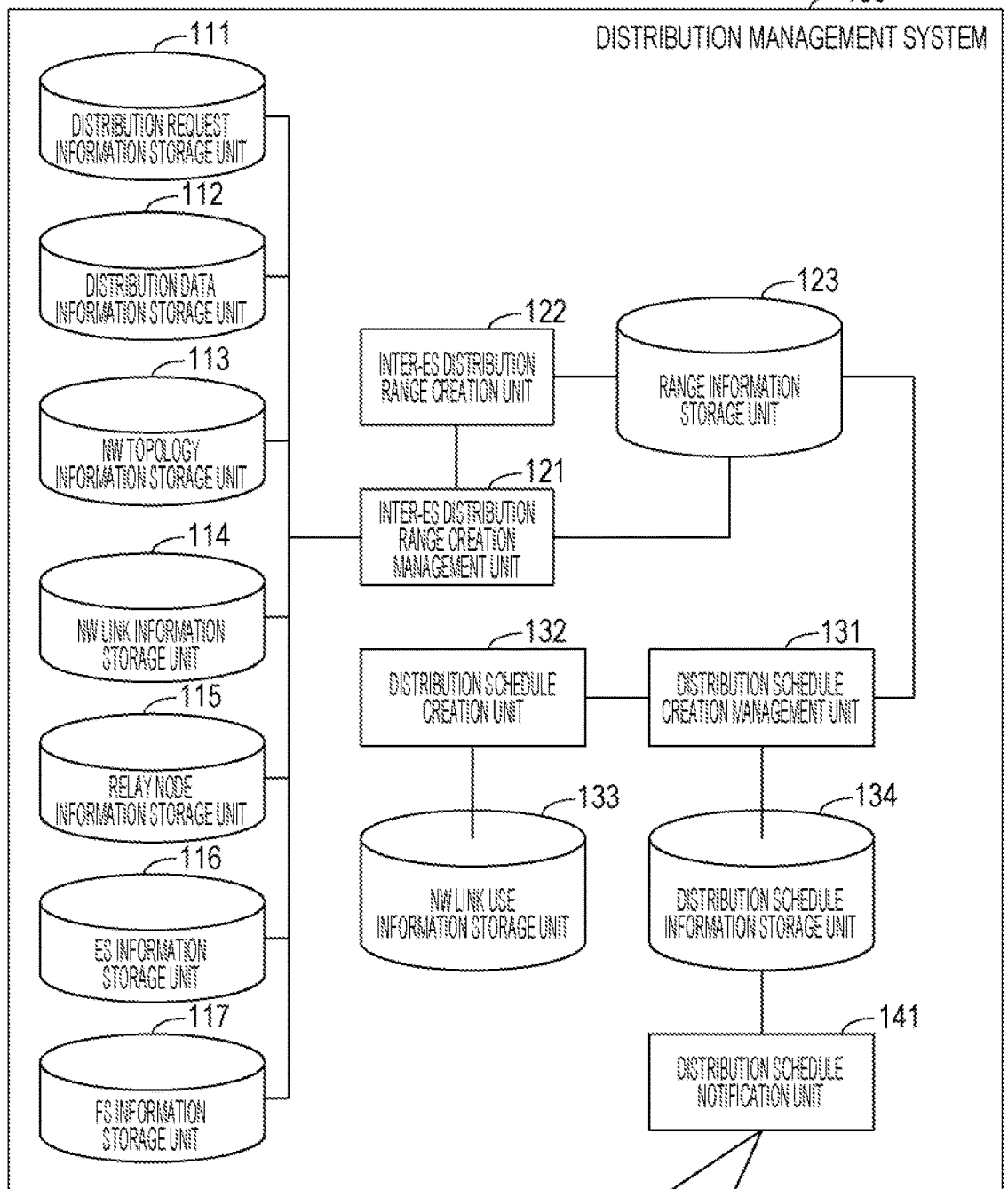
FIG. 10 is a block diagram illustrating a function of the distribution management system.

While the distribution management system 100 creates the distribution schedule such that the data transmission is performed in the above-mentioned order, the efficient data distribution is carried out. FIG. 10 is a block diagram illustrating a function of the distribution management system. The distribution management system 100 includes a distribution request information storage unit 111, a distribution data information storage unit 112, an NW topology information storage unit 113, an NW link information storage unit 114, a relay node information storage unit 115, an ES information storage unit 116, an FS information storage unit 117, an inter-ES distribution range creation management unit 121, an inter-ES distribution range creation unit 122, a range information storage unit 123, a distribution schedule creation management unit 131, a distribution schedule creation unit 132, an NW link use information storage unit 133, a distribution schedule information storage unit 134, and a distribution schedule notification unit 141.

The distribution request information storage unit 111 stores information (distribution request information) related to the distribution request for instructing the distribution to the ES. The distribution data information storage unit 112 stores information (distribution data information) related to the distributed data. The NW topology information storage unit 113 stores information (NW topology information) indicating the configuration of the network. The NW link information storage unit 114 stores information (NW link information) indicating the bands of the respective NW links. The relay node information storage unit 115 stores information (relay node information) indicating the NW link connected to the relay node. The ES information storage unit 116 stores information (ES information) indicating the NW link connected to the ES. The FS information storage unit 117 stores information (FS information) indicating the NW link connected to the FS.

The inter-ES distribution range creation management unit 121 performs collection of information used to create the inter-ES distribution range and performs an inter-ES distribution range creation instruction to the inter-ES distribution range creation unit 122 based on the collected information. The inter-ES distribution range creation unit 122 creates the inter-ES distribution range in accordance with an instruction from the inter-ES distribution range creation management unit 121. The inter-ES distribution range creation unit 122 stores the created inter-ES distribution range in the range information storage unit 123.

The range information storage unit 123 stores information (range information) indicating the ESs belonging to each inter-ES distribution range, the representative ES, and the like. The distribution schedule creation management unit 131 obtains the range information and instructs the distribution schedule creation unit 132 to perform the creation of the distribution schedule for each range. The distribution schedule creation management unit 131 integrates the distribution schedules with one another for each area to be stored in the distribution schedule information storage unit 134.

The distribution schedule creation unit 132 creates the distribution schedule for each area. For example, the distribution schedule creation unit 132 uses the NW link use information storage unit 133 to manage the use plan of the NW link based on the created distribution schedule as NW link use information. Subsequently, the distribution schedule creation unit 132 determines whether or not the data distribution can be performed in the free band of the NW link by referring to the NW link use information and creates as efficient distribution schedule as possible.

The NW link use information storage unit 133 stores information (NW link use information) indicating the use plan of the NW link. The distribution schedule information storage unit 134 stores information (distribution schedule information) indicating the created distribution schedule.

It is noted that lines connecting the respective elements illustrated in FIG. 10 to each other represents a part of the communication path, and a communication path other than the illustrated communication path can also be set. In addition, the functions of the respective elements illustrated in FIG. 10 can be realized, for example, while a computer is caused to execute the program modules corresponding to the elements.

Figure 11:
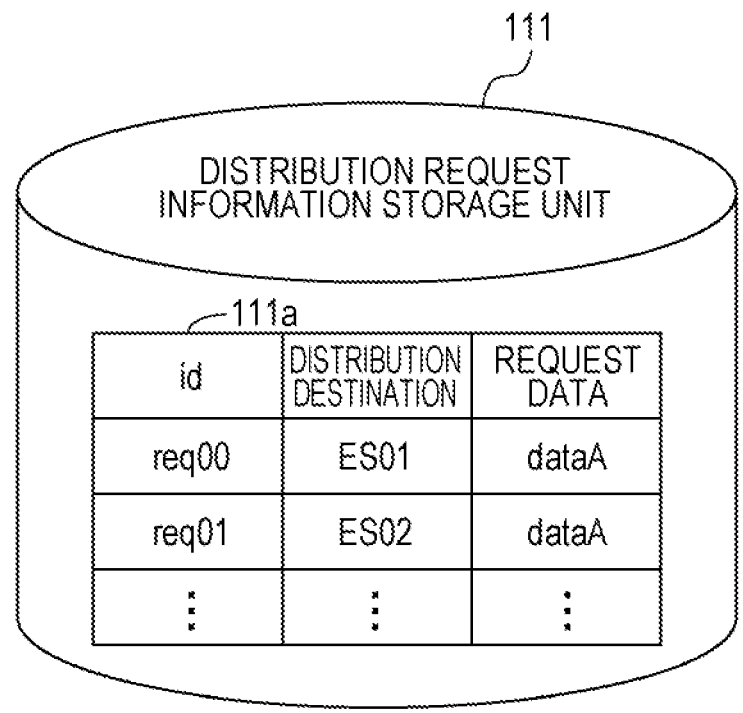
FIG. 11 illustrates an example of distribution request information.

Hereinafter, with reference to FIG. 11 to FIG. 20, the information stored in each of the storage units will be described in detail. FIG. 11 illustrates an example of the distribution request information. Distribution request information 111a includes fields of id, distribution destination, and request data, for example. In the id field, an identifier of the distribution request is set. In the distribution destination field, an identifier of the ES corresponding to the distribution destination of the data specified by the distribution request is set. In the request data field, an identifier of the data of the distribution target is set. It is possible to determine which data is transmitted to which ES based on the distribution request information 111a described above.

Figure 12:
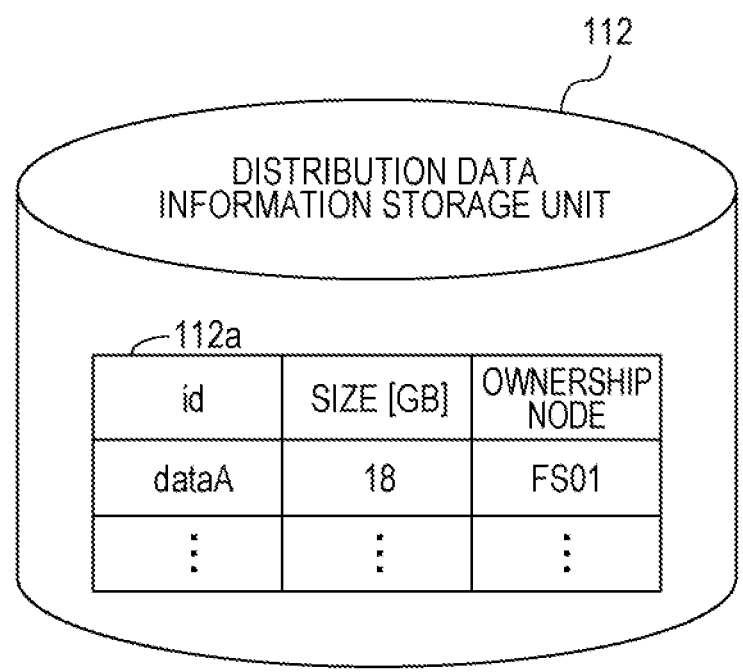
FIG. 12 illustrates an example of distribution data information.

FIG. 12 illustrates an example of the distribution data information. Distribution data information 112a includes fields of id, size, and ownership node, for example. In the id field, an identifier of the data of the distribution target is set. In the size field, a size of the data is set in units of GB, for example. In the ownership node field, an identifier of the FS that holds the data is set. The initial distribution source of the data and the amount of data to be transmitted can be determined based on the distribution data information 112a.

Figure 13:
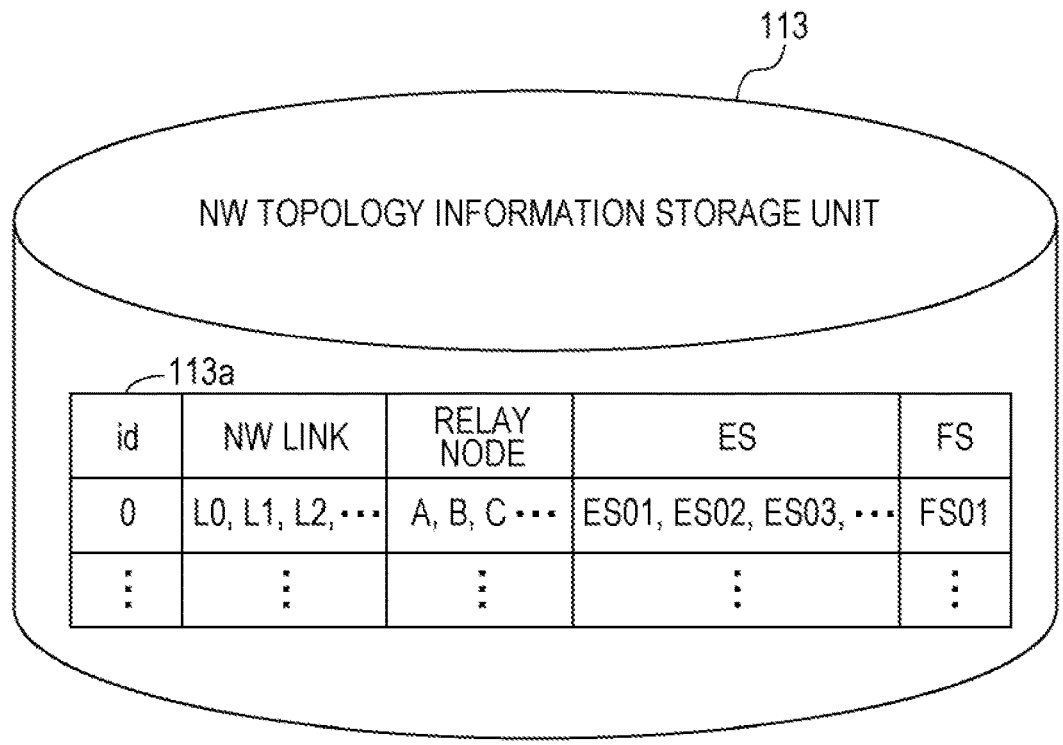
FIG. 13 illustrates an example of network (NW) topology information.

FIG. 13 illustrates an example of the NW topology information. NW topology information 113a includes fields of id, NW link, relay node, ES, and FS, for example. In the id field, an identifier of the network corresponding to the management target is set. In the NW link field, identifiers of all the NW links that connect the apparatuses in the network with one another are set. In the relay node field, identifiers of all the relay nodes in the network are set. In the ES field, identifiers of all the ESs in the network are set. In the FS field, the identifiers of all the FSs in the network are set. The components of the network can be recognized based on the NW topology information 113a described above.

Figure 14:
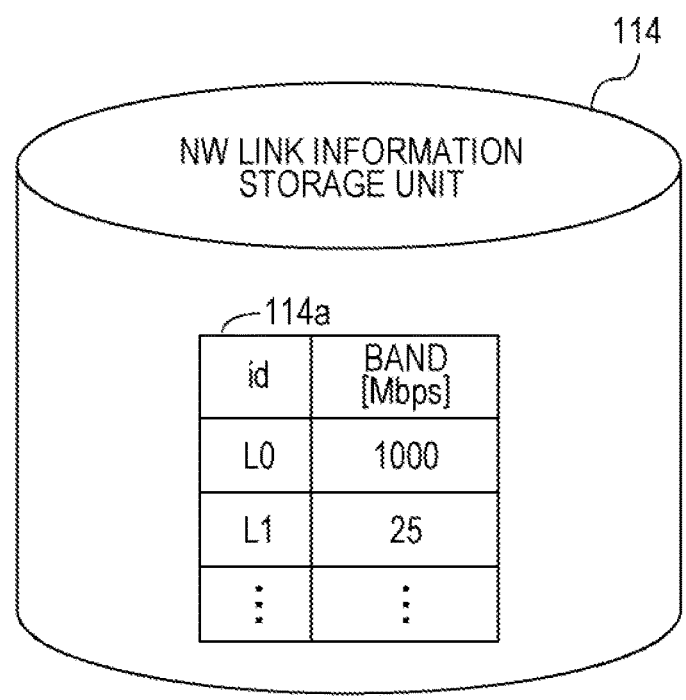
FIG. 14 illustrates an example of NW link information.

FIG. 14 illustrates an example of the NW link information. NW link information 114a includes fields of id and band, for example. In the id field, an identifier of the NW link is set. In the band field, a communication speed (band) of the NW link is set in units of Mbps, for example. The bands of the respective NW links can be found based on the NW link information described above.

Figure 15:
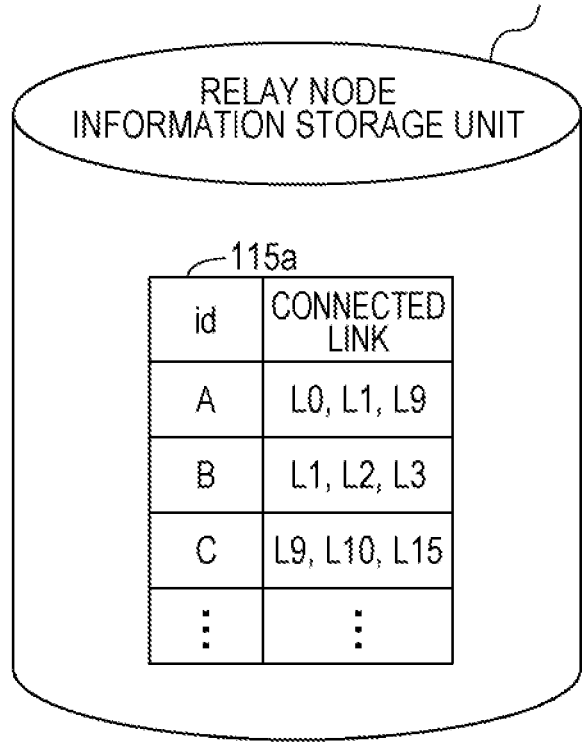
FIG. 15 illustrates an example of relay node information.

FIG. 15 illustrates an example of the relay node information. Relay node information 115a includes fields of id and connected link, for example. In the id field, an identifier of the relay node is set. In the connected link field, an identifier of the NW link directly connected to the relay node is set. It is possible to determine through which NW links the respective relay nodes relay the data based on the relay node information 115a described above.

Figure 16:
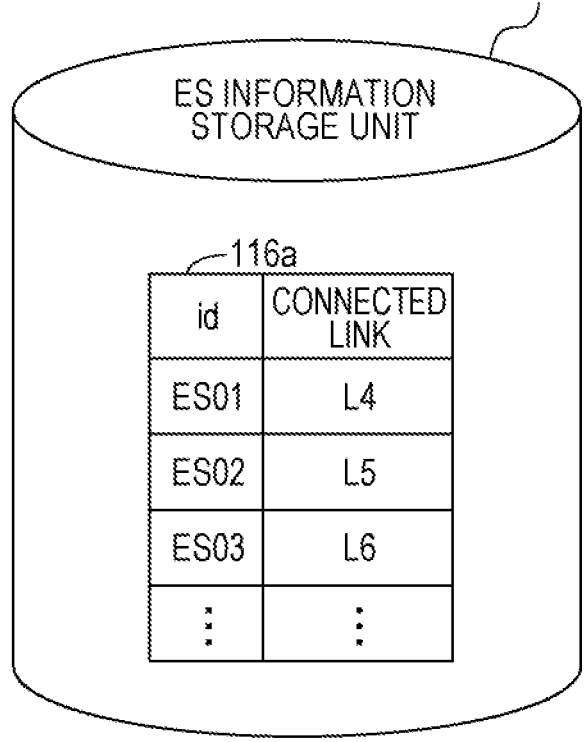
FIG. 16 illustrates an example of ES information.

FIG. 16 illustrates an example of the ES information. ES information 116a includes fields of id and connected link, for example. In the id field, an identifier of the ES is set. In the connected link field, an identifier of the NW link directly connected to the ES is set. It is possible to determine through which NW links the respective ESs transmit and receive the data based on the ES information 116a described above. When the ES information 116a and the NW link information 114a are used in combination, it is possible to determine the band of the NW link directly connected to the ES.

Figure 17:
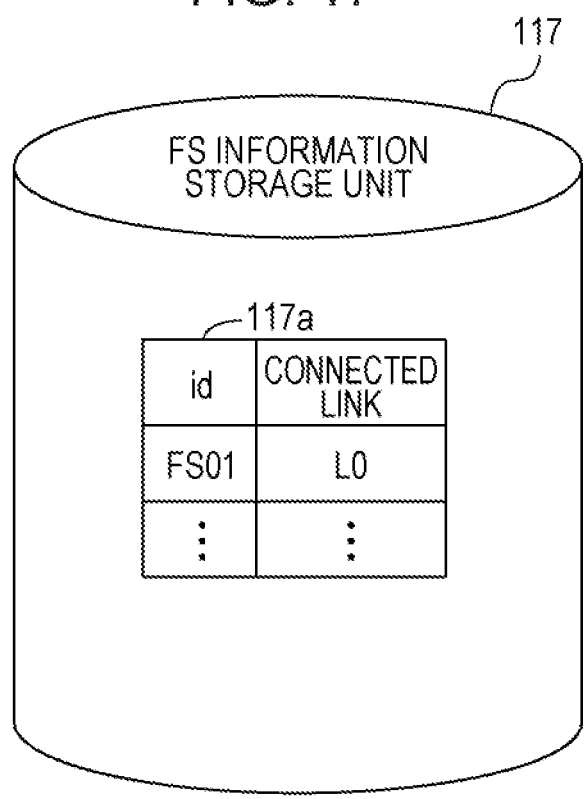
FIG. 17 illustrates an example of file server (FS) information.

FIG. 17 illustrates an example of the FS information. FS information 117a includes fields of id and connection link, for example. In the id field, an identifier of the FS is set. In the connected link field, an identifier of the NW link directly connected to the FS is set. It is possible to determine through which NW links the respective FSs transmit the data based on the FS information 117a described above.

FIG. 18 illustrates an example of the range information. Range information 123a includes fields of range id, belonging ES, bottleneck link (BL), representative ES, and sub range, for example. In the range id field, an identifier of a range indicating the entire network or the inter-ES distribution range is set. In the belonging ES field, identifiers of the ESs belonging to the range are set. In the bottleneck link field, an identifier of the NW link corresponding to the BL common to the ESs belonging to the range is set. In the representative ES field, an identifier of the representative ES in the range is set. The FS becomes the representative ES in a case where the entire network is set as the range. In the sub range field, an identifier of a range (sub range) obtained by further finely grouping the ESs belonging to the range is set. An appropriate distribution order can be determined based on the range information 123a described above.

Figure 19:
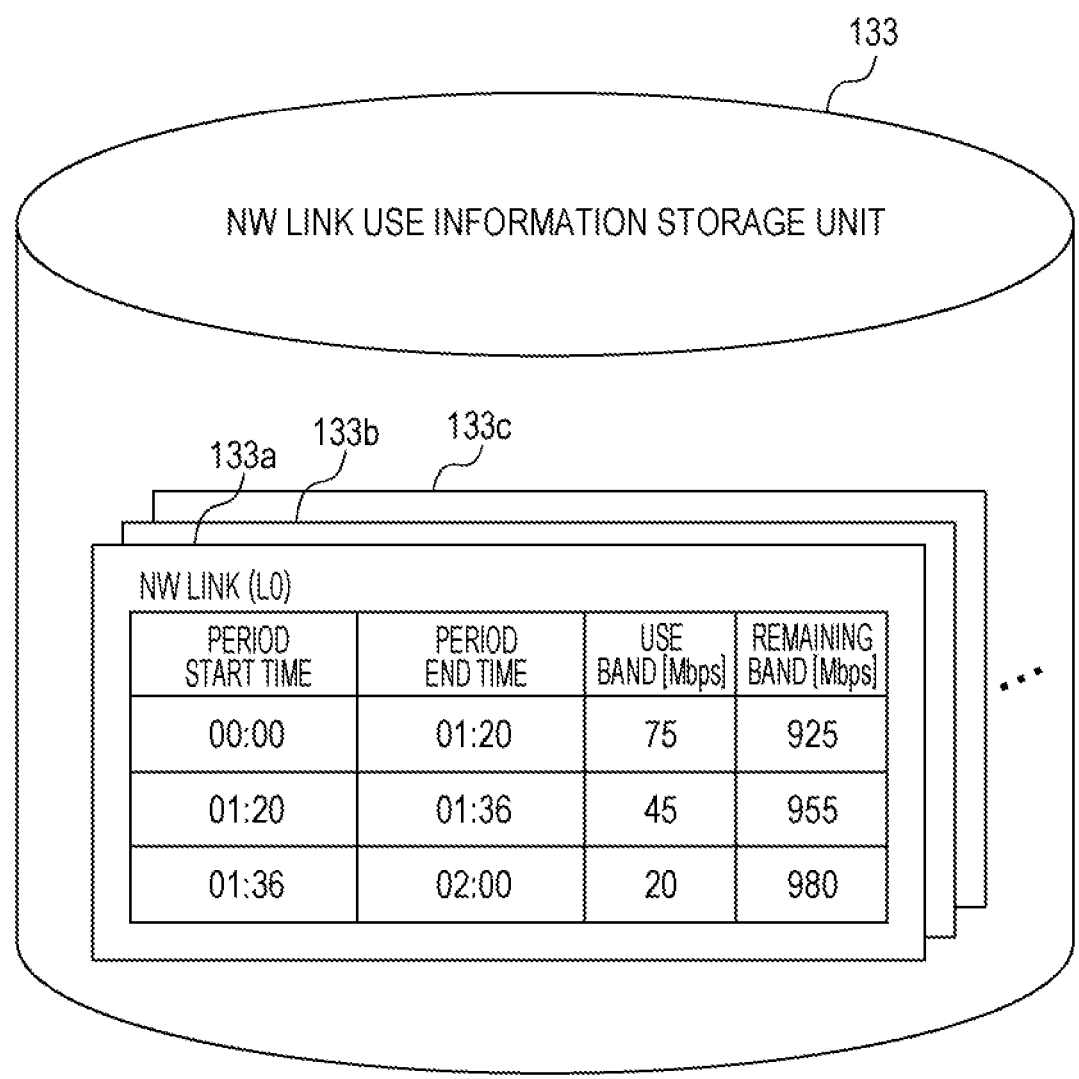
FIG. 19 illustrates an example of NW link use information.

FIG. 19 illustrates an example of the NW link use information. In the example of FIG. 19, pieces of NW link use information 133a, 133b, 133c, . . . are provided for the respective NW links. The respective pieces of NW link use information 133a, 133b, 133c, . . . include fields of period start time, period end time, use band, and remaining band. In the period start time field, a start time of a period during which the use band of the NW link is stable is set. In the period end time field, an end time of the period during which the use band of the NW link is stable is set. In the use band field, a use band (communication amount per unit time) in the period during which the use band of the NW link is stable is set. In the remaining band field, a value (remaining band) obtained by subtracting the use band from the band indicating the highest communication speed of the NW link is set. The remaining bands of the respective NW links based on the previously created distribution schedule can be determined based on the NW link use information 133a, 133b, 133c, . . . described above.

FIG. 20 illustrates an example of the distribution schedule information. Distribution schedule information 134a is constituted, for example, by a record for each data distribution information. The distribution schedule information 134a includes fields of id, distribution data, distribution source, distribution destination, path, supposed TP, duration, expected start time, expected end time, and preceding data distribution, for example. In the id field, identifiers ("d00", "d01", . . . ) of data distribution information are set. Hereinafter, the respective pieces of the data distribution information having the identifiers "d00", "d01", . . . will be referred to as data distribution information "d00", "d01", . . . .

In the distribution data field, an identifier of the data of the distribution target is set. In the distribution source field, an identifier of the FS or the ES that transmits the data of the distribution target is set. In the distribution destination field, an identifier of the ES that receives the data of the distribution target is set. In the path field, an identifier of the NW link through which the data distribution is performed is set. In the supposed TP field, a supposed communication speed (supposed throughput: TP) when the data distribution is performed is set. A value indicating a band of the path having the narrowest band on the path of the data distribution is set as the supposed throughput, for example. In the duration field, a time used to perform the data distribution is set. The duration is a value obtained by dividing the size of the distributed data by the supposed throughput. In the expected start time field, an expected time when the data distribution is to be started is set. In the expected end time field, an expected time when the data distribution is to be ended is set. In the preceding data distribution field, an identifier of the data distribution information that is demanded to be ended before the corresponding data distribution is executed is set.

The distribution management system 100 having the above-mentioned configuration creates the efficient distribution schedule and transmits the distribution schedule to the FS "FS01" or the ESs "ES01" to "ES10". Hereinafter, the processing executed by the distribution management system 100 will be described with reference to FIG. 21 to FIG. 25.

Figure 21:
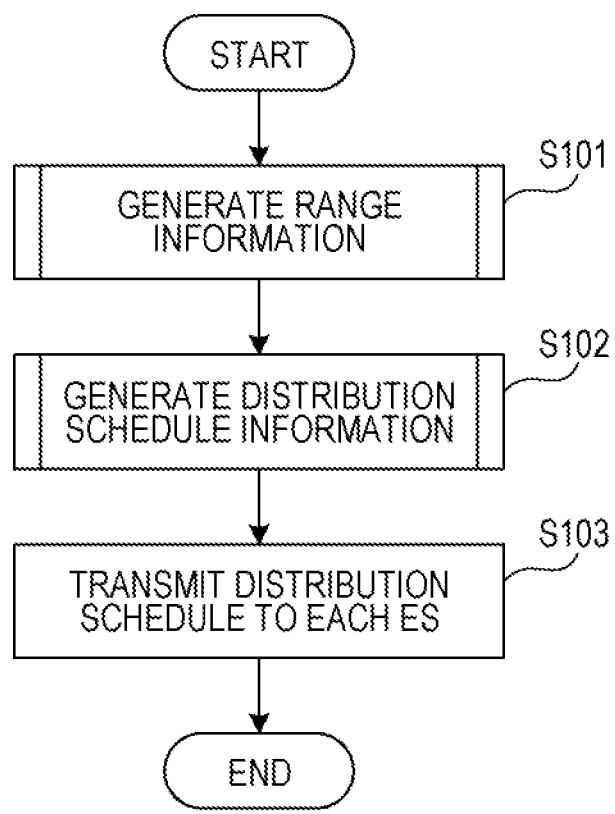
FIG. 21 is a flow chart illustrating an example of a procedure of data distribution management.

FIG. 21 is a flow chart illustrating an example of the data distribution management procedure. Hereinafter, the processing illustrated in FIG. 21 will be described along step numbers. The following processing is executed, for example, when the data provider inputs the data distribution instruction via the terminal apparatus 31. In addition, the following processing can also be started at a previously set time.

[Step S101] The inter-ES distribution range creation management unit 121 and the inter-ES distribution range creation unit 122 cooperate with each other to generate the range information 123a (see FIG. 18). A detail of range information generation processing will be described below (see FIG. 22).

[Step S102] The distribution schedule creation management unit 131 and the distribution schedule creation unit 132 cooperate with each other to generate the distribution schedule information 134a (see FIG. 20). A detail of distribution schedule generation processing will be described below (see FIG. 24).

[Step S103] The distribution schedule notification unit 141 transmits the distribution schedules of the data to the respective ESs indicated by the distribution schedule information to the respective ESs. The respective ESs request the FS "FS01" or the ES of the distribution source for the data at the expected start time indicated by the distribution schedule information based on this notification and receives the data distribution.

Figure 22:
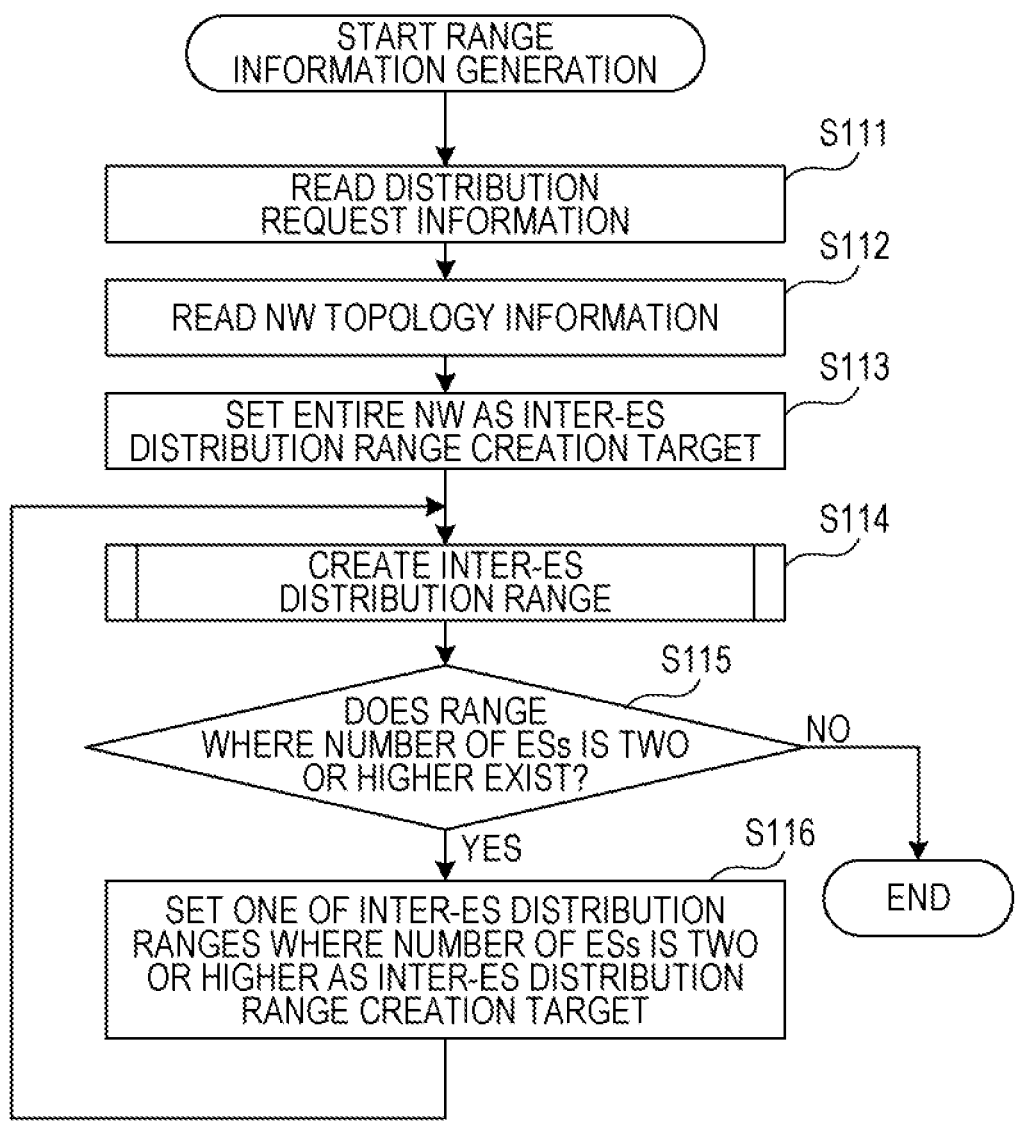
FIG. 22 is a flow chart illustrating an example of a procedure of range information generation processing.

Next, a procedure of the range information generation processing will be described. FIG. 22 is a flow chart illustrating an example of the procedure of the range information generation processing. Hereinafter, the processing illustrated in FIG. 22 will be described along step numbers.

[Step S111] The inter-ES distribution range creation management unit 121 reads the distribution request information 111a from the distribution request information storage unit 111. [Step S112] The inter-ES distribution range creation management unit 121 reads the information related to the NW topology. For example, the inter-ES distribution range creation management unit 121 reads the NW topology information 113a from the NW topology information storage unit 113. Next, the inter-ES distribution range creation management unit 121 reads the NW link information 114a from the NW link information storage unit 114. Next, the inter-ES distribution range creation management unit 121 reads the relay node information 115a from the relay node information storage unit 115. Next, the inter-ES distribution range creation management unit 121 reads the ES information 116a from the ES information storage unit 116. Next, the inter-ES distribution range creation management unit 121 reads the FS information 117a from the FS information storage unit 117.

[Step S113] The inter-ES distribution range creation management unit 121 sets the entire NW as an inter-ES distribution range creation target. For example, the inter-ES distribution range creation management unit 121 adds a record of the range id "all" to the range information 123a. At this time, the inter-ES distribution range creation management unit 121 sets the identifier of the ES set as the distribution destination of the data of the distribution target in the distribution request information 111a among the ESs "ES01" to "ES10" in the NW as a belonging ES of the added record. In addition, the inter-ES distribution range creation management unit 121 sets the identifier of the FS "FS01" as the representative ES of the added record.

[Step S114] The inter-ES distribution range creation management unit 121 instructs the inter-ES distribution range creation unit 122 to create the inter-ES distribution range in the range of the inter-ES distribution range creation target. At this time, the inter-ES distribution range creation management unit 121 transmits the information related to the NW topology read in step S112 to the inter-ES distribution range creation unit 122. The inter-ES distribution range creation unit 122 creates the inter-ES distribution range in accordance with the instruction. A detail of the inter-ES distribution range creation processing will be described below (see FIG. 23).

[Step S115] The inter-ES distribution range creation management unit 121 refers to the range information 123a and determines whether or not a range where the number of belonging ESs is 2 or higher exists among the ranges where the sub range is not set. When the relevant ranges exist, the processing proceeds to step S116. When the relevant ranges do not exist, the range information generation processing is ended.

[Step S116] The inter-ES distribution range creation management unit 121 sets one of the inter-ES distribution ranges where the number of belonging ESs is 2 or higher among the ranges where the sub range is not set as the inter-ES distribution range creation target, and the processing proceeds to step S114.

Figure 23:
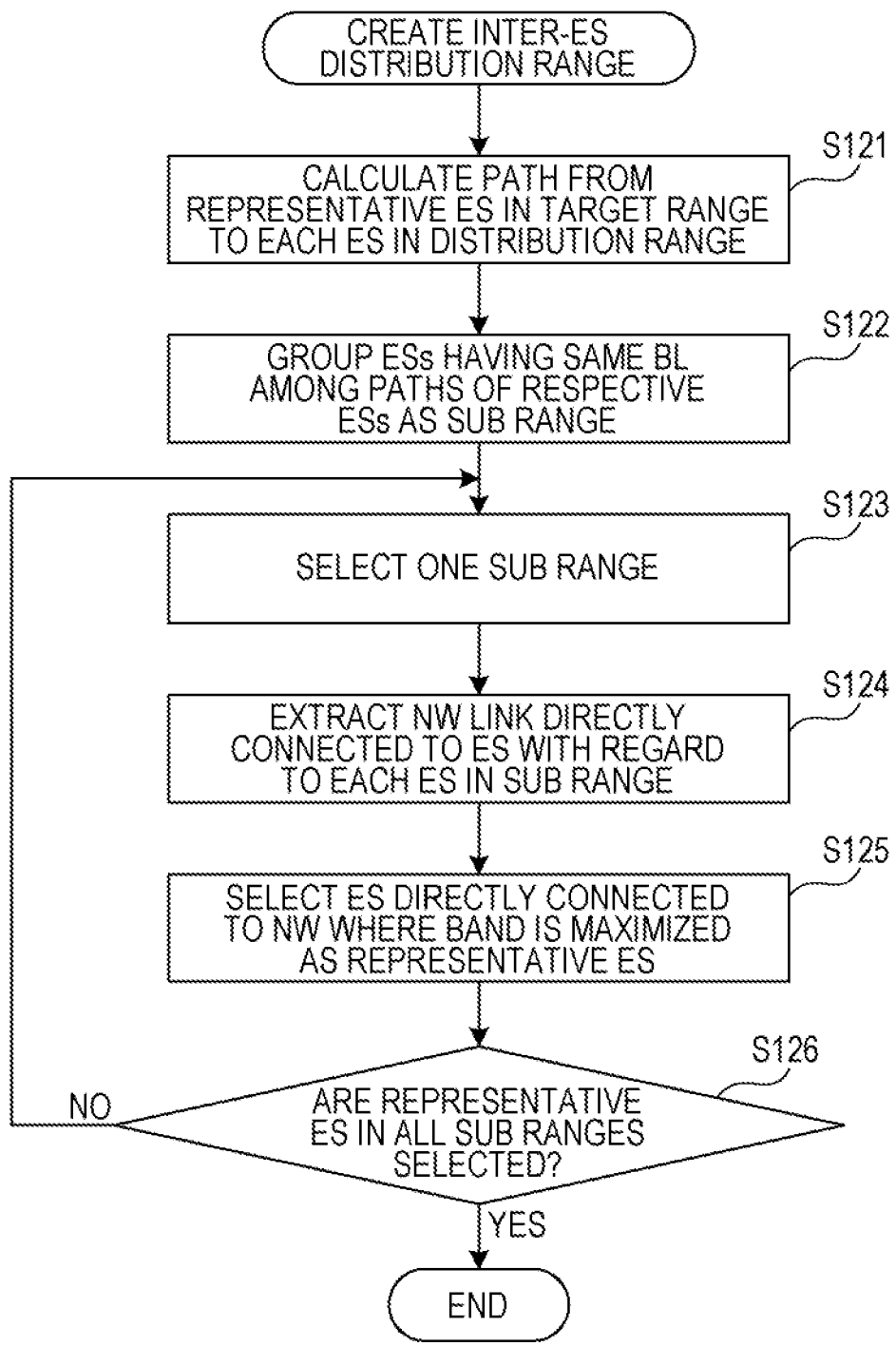
FIG. 23 is a flow chart illustrating an example of a procedure of inter-ES distribution range creation processing.

Next, a detail of the inter-ES distribution range creation processing will be described. FIG. 23 is a flow chart illustrating an example of a procedure of the inter-ES distribution range creation processing. Hereinafter, the processing illustrated in FIG. 23 will be described along step numbers. The inter-ES distribution range creation processing is executed, for example, in accordance with a call of the inter-ES distribution range creation processing from the inter-ES distribution range creation management unit 121.

[Step S121] The inter-ES distribution range creation unit 122 calculates paths from the representative ES in the target range to the respective ESs in the distribution range. For example, the inter-ES distribution range creation unit 122 reproduces the NW topology illustrated in FIG. 8 based on the NW topology information 113a, the relay node information 115a, the ES information 116a, and the FS information 117a. Subsequently, the inter-ES distribution range creation unit 122 creates, for each of the ESs other than the representative ES, a list of the NW links on the path from the representative ES to the relevant ES.

[Step S122] The inter-ES distribution range creation unit 122 determines the BL on the path with regard to each of the ESs other than the representative ES based on the NW link information 114a. For example, the bands of the respective NW links on the path of each of the ESs are compared with one another, and the NW link having the narrowest band is the BL. Next, the inter-ES distribution range creation unit 122 groups the ESs where the BL is common among the respective ESs other than the representative ES into the same inter-ES distribution range (sub range).

The inter-ES distribution range creation unit 122 sets an identifier of the sub range generated by the grouping in the sub range field of the record of the target range in the range information 123a. In addition, the inter-ES distribution range creation unit 122 adds the record corresponding to the generated sub range to the range information 123a. In the range id field of the added record, the identifier of the sub range is set. In the belonging ES field of the added record, the identifiers of the ESs where the BL is common in the target range are set. In the bottleneck link field of the added record, the identifier of the NW link corresponding to the common BL to the ESs belonging to the sub range is set.

[Step S123] The inter-ES distribution range creation unit 122 selects one of the sub ranges generated in step S122. [Step S124] With regard to each of the ESs in the selected sub range, the inter-ES distribution range creation unit 122 extracts the NW link directly connected to the ES based on the ES information 116a. In addition, the inter-ES distribution range creation unit 122 extracts the band of the extracted NW link based on the NW link information 114a.

[Step S125] The inter-ES distribution range creation unit 122 selects the ES having the highest band of the directly connected NW link among the ESs belonging to the selected sub range as the representative ES. The inter-ES distribution range creation unit 122 sets the identifier of the selected ES in the representative ES field of the record of the sub range in the range information 123a.

[Step S126] The inter-ES distribution range creation unit 122 determines whether or not the representative ESs are selected with regard to all the sub ranges generated in step S122. When the representatives ESs in all the sub ranges have been already selected, the inter-ES distribution range creation processing is ended. When the sub range where the representative ES has not yet been selected exists, the processing proceeds to step S123.

Figure 24:
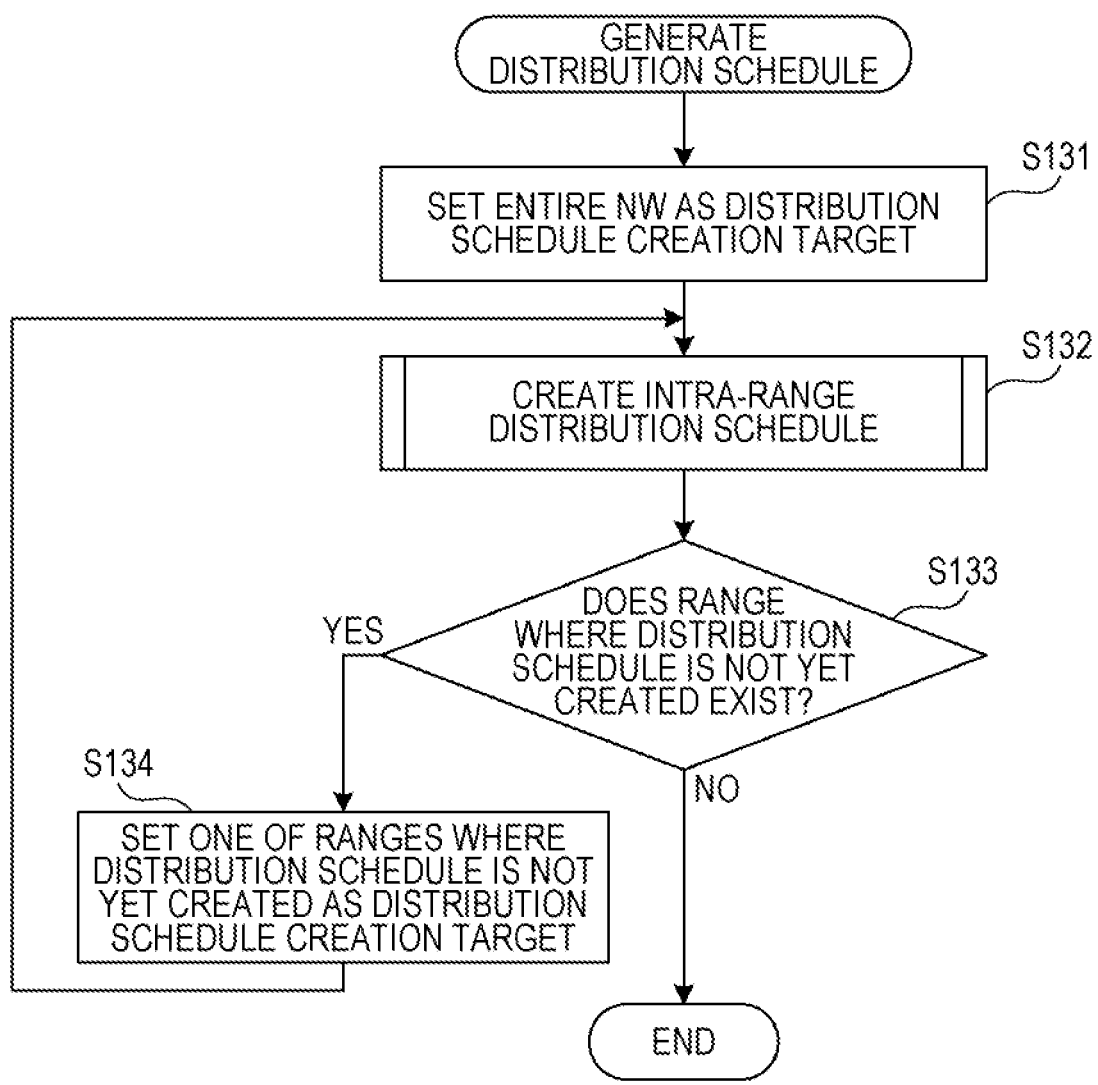
FIG. 24 is a flow chart illustrating an example of a procedure of distribution schedule generation processing.

The range information 123a illustrated in FIG. 18 is generated in the above-mentioned manner. After the generation of the range information 123a, the distribution schedule generation processing is performed. FIG. 24 is a flow chart illustrating an example of a procedure of the distribution schedule generation processing. Hereinafter, the processing illustrated in FIG. 24 will be described along step numbers.

[Step S131] The distribution schedule creation management unit 131 sets the entire NW as the distribution schedule creation target. [Step S132] The distribution schedule creation management unit 131 instructs the distribution schedule creation unit 132 to perform intra-range distribution schedule creation in the range of the distribution schedule creation target. Then, the distribution schedule creation unit 132 executes intra-range distribution schedule creation processing, and the distribution schedule of the data from the representative ES in the range of the creation target to the representative ES in the sub range in the range is created. A detail of the intra-range distribution schedule creation processing will be described below (see FIG. 25).

[Step S133] The distribution schedule creation management unit 131 determines whether or not the range where the distribution schedule has not yet been created exists among the ranges registered in the range information 123a. When the relevant range exists, the processing proceeds to step S134. When the creation of the distribution schedule is completed with regard to all the ranges, the distribution schedule generation processing is ended.

[Step S134] The distribution schedule creation management unit 131 sets one of the ranges where the distribution schedule in the range has not yet been created among the ranges where the distribution schedule has been already created in which the representative ES is set as the distribution destination as the distribution schedule creation target. Thereafter, the processing proceeds to step S132.

Figure 25:
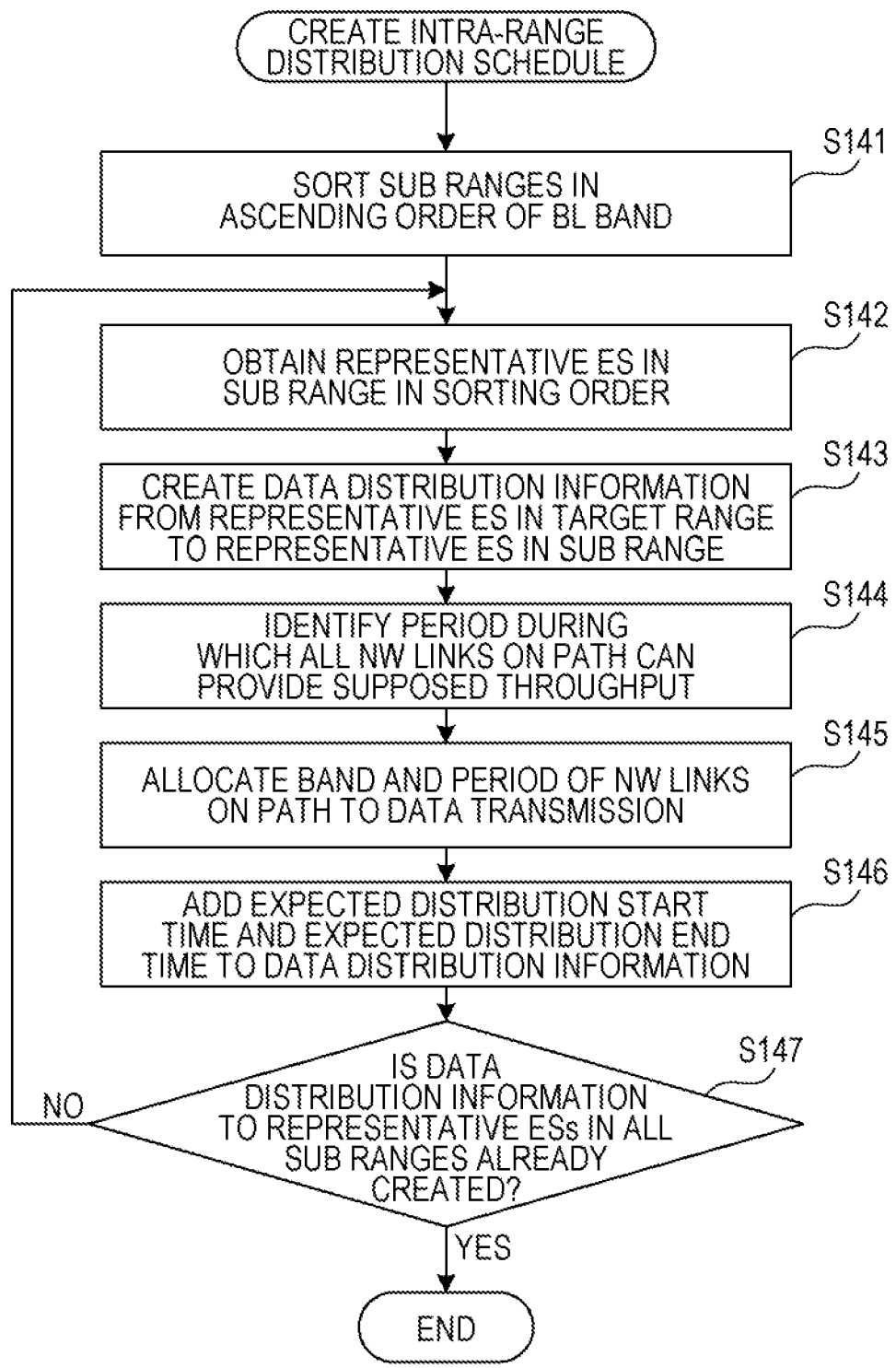
FIG. 25 is a flow chart illustrating an example of a procedure of intra-range distribution schedule creation processing.

Next, the intra-range distribution schedule creation processing will be described in detail. FIG. 25 is a flow chart illustrating an example of a procedure of the intra-range distribution schedule creation processing. Hereinafter, the processing illustrated in FIG. 25 will be described along step numbers. It is noted that the range of the distribution schedule creation target will be referred to as a target range.

[Step S141] The distribution schedule creation unit 132 sorts the sub ranges created in the target range in an ascending order of the BL. For example, the distribution schedule creation unit 132 refers to the record of the target range in the range information 123a and extracts the sub range in the range. Next, the distribution schedule creation unit 132 obtains the bottleneck links from the respective records where the identifier of the extracted sub range is set by using the range id. Next, the distribution schedule creation unit 132 obtains the bands of the BLs in the respective sub ranges from the NW link information 114a. Subsequently, the distribution schedule creation unit 132 sorts the sub ranges in an ascending order of the values of the bands of the BLs in the range.

[Step S142] The distribution schedule creation unit 132 obtains the representative ESs in the sub ranges in the sort order (ascending order of the band). For example, the distribution schedule creation unit 132 identifies the sub range at the highest rank in the sort order among the sub ranges where the representative ES has not yet been obtained corresponding to the sub ranges of the target range. Subsequently, the distribution schedule creation unit 132 obtains the representative ES of the record corresponding to the identified sub range from the range information 123a.

[Step S143] The distribution schedule creation unit 132 creates the data distribution information from the representative ES in the target range to the representative ESs in the sub ranges obtained in step S142. The data distribution information includes the identifier of the distributed data, the identifier of the distribution source (representative ES in the target range), the distribution destination (identifier of the representative ES in the sub range), the path from the distribution source to the distribution destination, the supposed throughput, and the duration. The distribution schedule creation unit 132 registers the created data distribution information in the distribution schedule information 134a as a new record.

[Step S144] The distribution schedule creation unit 132 identifies a period during which the supposed throughput can be provided on all the NW links on the path. For example, the distribution schedule creation unit 132 refers to the NW link use information of the NW links on the path and identifies the period during which the supposed throughput can be provided on all the NW links on the path (distributable period). A period during which the remaining band is higher than or equal to the supposed throughput in the NW link use information is a period during which the supposed throughput on the NW link can be provided (provision available period). The period during which all the NW links on the path are in the provision available period corresponds to the distributable period.

[Step S145] The distribution schedule creation unit 132 determines an earliest time slot among time slots for the duration in the distributable period obtained in step S144 as a distribution time slot. Subsequently, the distribution schedule creation unit 132 allocates the period of the distribution time slot of each of the NW links on the path and the band for the supposed throughput in the period to the data transmission from the representative ES in the target range to the representative ES in the obtained sub range.

[Step S146] The distribution schedule creation unit 132 adds an expected distribution start time and an expected distribution end time to the data distribution information. For example, the distribution schedule creation unit 132 sets a start time of the distribution time slot determined in step S145 as the expected distribution start time. In addition, the distribution schedule creation unit 132 sets an end time of the distribution time slot as the expected distribution end time. Subsequently, the distribution schedule creation unit 132 sets the expected distribution start time and the expected distribution end time in the record added in step S144 to the distribution schedule information 134a.

[Step S147] The distribution schedule creation unit 132 determines whether or not the data distribution information for distributing the data to the representative ES has been already created with respect to all the sub ranges in the target range. In a case where the creation of the data distribution information with respect to all the sub ranges is completed, the intra-range distribution schedule creation processing is ended. In a case where the sub range where the data distribution information has not yet been created exists, the processing proceeds to step S142.

The distribution schedule is created in the above-mentioned manner. While the data distribution is performed in accordance with the created distribution schedule, a use frequency of the NW link having the narrow band is decreased, and the distribution time as a whole is shortened. In addition, as compared with a case where all the combinations of the data distributions are generated, the creation of the distribution schedule can be facilitated, and it is possible to promptly create the distribution schedule.

Hereinafter, a specific example of the data distribution in a case where data having the identifier "dataA" (hereinafter, will be referred to as data "dataA") is distributed from the FS "FS01" to the ESs "ES01" to "ES10" in the NW topology illustrated in FIG. 8 will be described. It is noted that the size of the data "dataA" is set as 18 GB. First, an inter-ES distribution range creation situation will be described with reference to FIG. 26 to FIG. 31.

Figure 26:
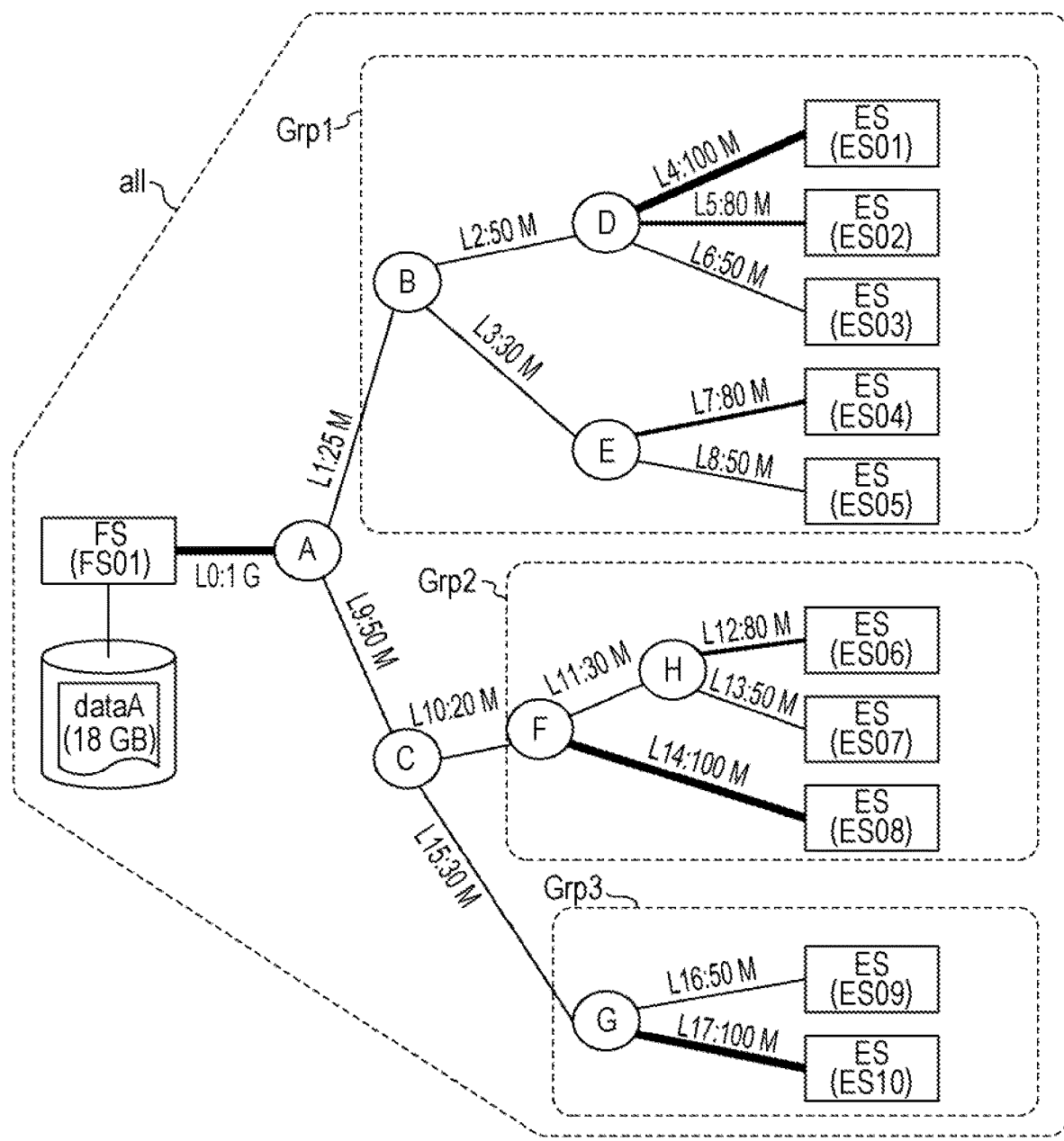
FIG. 26 illustrates a creation example of a sub range in which an entire NW is set as a target.

FIG. 26 illustrates a creation example of a sub range in which an entire NW is set as a target. In a case where the entire range is set as a target, grouping of the ESs "ES01" to "ES10" while the FS "FS01" is set as a start point is performed. For example, distribution paths to the respective ESs "ES01" to "ES10" in which the FS "FS01" is set as the start point are calculated, and the mutual ESs in which the NW link (BL) having the lowest band width is the same are grouped into the same sub range.

In the example of FIG. 26, the ESs "ES01" to "ES05" are grouped into a range having an identifier "Grp1" (hereinafter, will be referred to as a range "Grp1"). The BL of the ESs "ES01" to "ES05" belonging to the range "Grp1" is the NW link "L1" between a relay node "A" and a relay node "B".

The ESs "ES06" to "ES08" are grouped into a range having an identifier "Grp2" (hereinafter, will be referred to as a range "Grp2"). The BL of the ESs "ES06" to "ES08" belonging to the range "Grp2" is the NW link "L10" between a relay node "C" and a relay node "F".

The ESs "ES09" and "ES10" are grouped into a range having an identifier "Grp3" (hereinafter, will be referred to as a range "Grp3"). The BL of the ESs "ES09" and "ES10" belonging to the range "Grp3" is the NW link "L15" between the relay node "C" and a relay node "G".

When a new range (sub range) is generated, the representative ES is selected for each sub range. In the selection of the representative ES, among the ESs in the respective sub ranges, the ES in which the directly connected NW link becomes the highest is selected as the representative ES.

For example, in the case of the range "Grp1" illustrated in FIG. 26, the five ESs "ES01" to "ES05" are included. The band of the link "L4" directly connected to the ES "ES01" is "100 Mbps". The band of the link "L5" directly connected to the ES "ES02" is "80 Mbps". The band of the link "L6" directly connected to the ES "ES03" is "50 Mbps". The band of the link "L7" directly connected to the ES "ES04" is "80 Mbps". The band of the link "L8" directly connected to the ES "ES05" is "50 Mbps".

The edge server having the highest band of the directly connected NW link among the ESs "ES01" to "ES05" is the ES "ES01". In view of the above, the ES "ES01" is selected as the representative ES. Similarly, the ES "ES08" is selected as the representative ES in the range "Grp2". In addition, the ES "ES10" is selected as the representative ES in the range "Grp3".

The range information 123a is updated in accordance with the creation of the sub range and the selection result of the representative ES as described above. FIG. 27 is a first diagram illustrating a generation example of the range information. In the example of FIG. 27, a record in which the entire NW is set as a range (range id "all") and records respectively corresponding to the sub ranges (ranges "Grp1", "Grp2", and "Grp3") are added to the range information 123a. In addition, the ranges "Grp1", "Grp2", and "Grp3" generated as the sub ranges are added to the sub range field of the record in which the entire NW is set as the range.

The sub ranges created by the processing illustrated in FIG. 26 and FIG. 27 include a plurality of ESs. In view of the above, while the each of the created sub ranges is set as the target, the ESs belonging to the sub range are grouped to create a sub range. Subsequently, the representative ES in the created sub range is selected.

Figure 28:
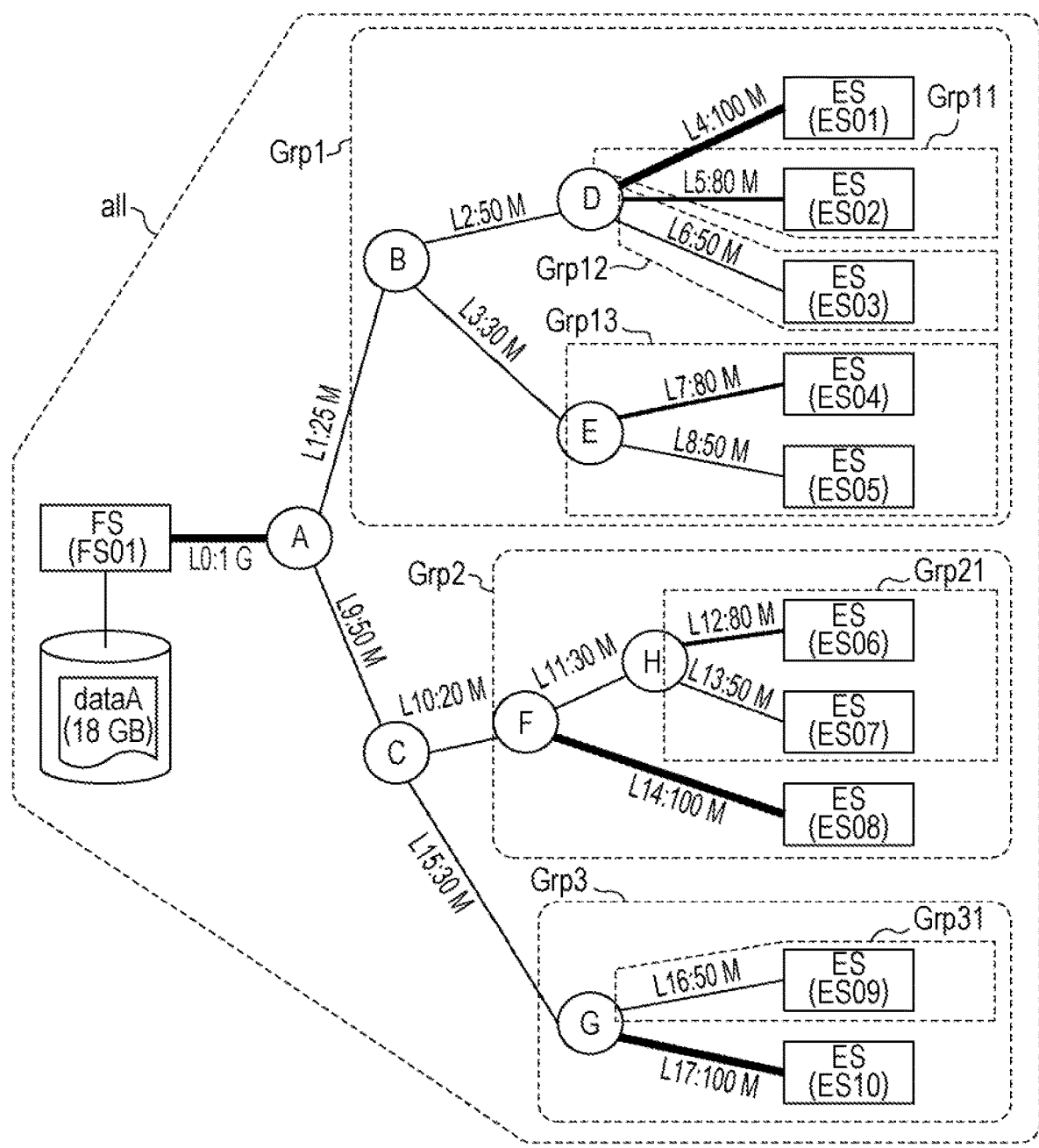
FIG. 28 illustrates a creation example of the sub range in which predetermined ranges are set as targets.

FIG. 28 illustrates a creation example of the sub range in which the ranges "Grp1", "Grp2", and "Grp3" are set as the targets. With regard to the range "Grp1", three sub ranges having identifiers "Grp11", "Grp12", and "Grp13" (hereinafter, will be referred to as ranges "Grp11", "Grp12", and "Grp13") are created. The representative ES in the range "Grp11" is the ES "ES02". The representative ES in the range "Grp12" is the ES "ES03". The representative ES in the range "Grp13" is the ES "ES04".

With regard to the range "Grp2", one sub range having an identifier "Grp21" (hereinafter, will be referred to as a range "Grp21") is created. The representative ES in the range "Grp21" is the ES "ES06".

With regard to the range "Grp3", one sub range having an identifier "Grp31" (hereinafter, will be referred to as a range "Grp31") is created. The representative ES in the range "Grp31" is the ES "ES09".

Subsequently, information corresponding to the sub ranges (ranges "Grp11", "Grp12", "Grp13", "Grp21", and "Grp31") illustrated in FIG. 28 is added to the range information 123a.

FIG. 29 is a second diagram illustrating the generation example of the range information. In the example of FIG. 29, records respectively corresponding to the generated sub ranges (range ids "Grp11", "Grp12", "Grp13", "Grp21", and "Grp31") are added to the range information 123a. In addition, the identifiers of the generated sub ranges are set in the sub range field of the record of the range at the generated source.

The respective ranges including the ranges "Grp13" and "Grp21" among the sub ranges created by the processing illustrated in FIG. 28 and FIG. 29 include a plurality of ESs. In view of the above, the sub ranges are further generated with regard to these ranges.

Figure 30:
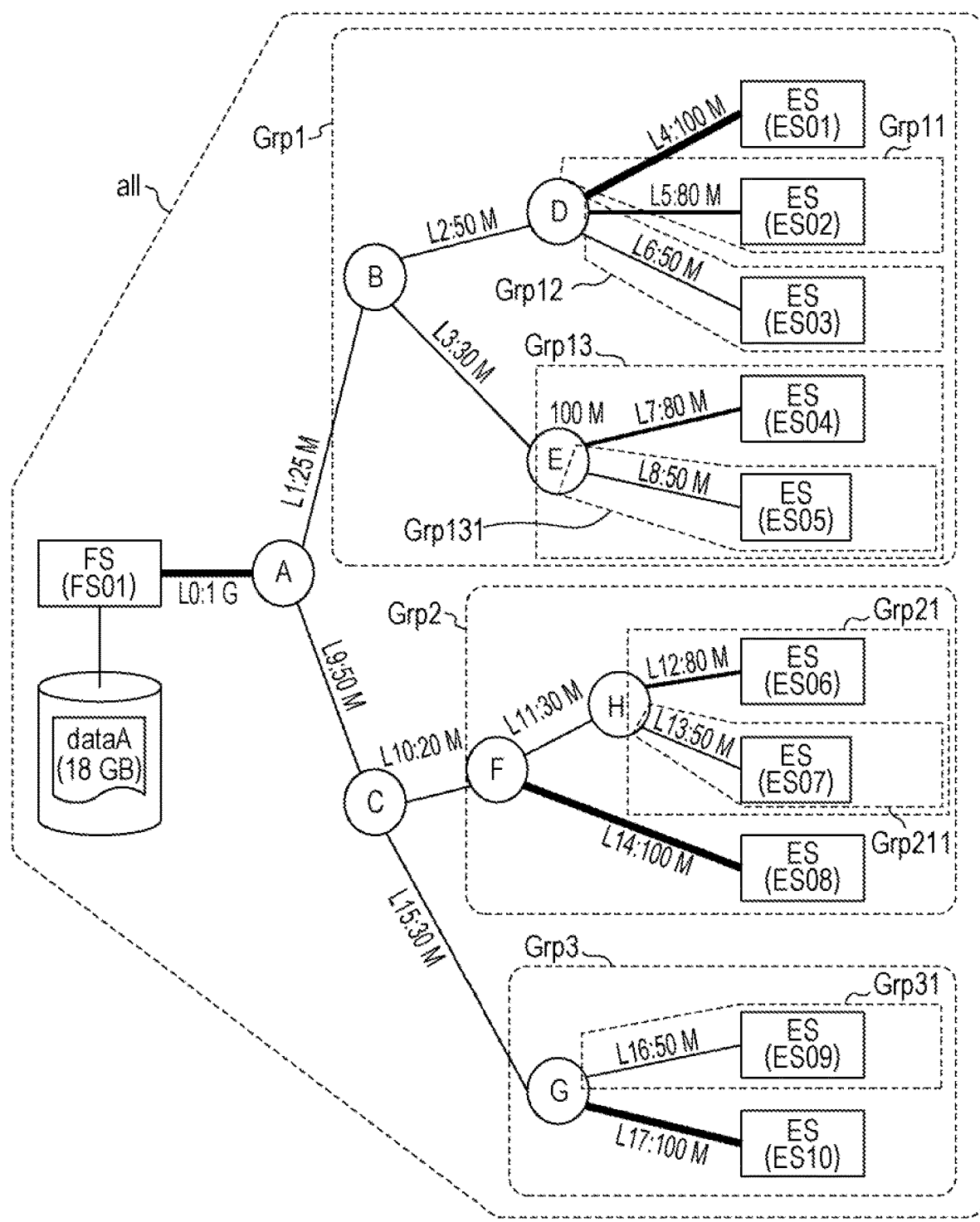
FIG. 30 illustrates a creation example of the sub range in which other ranges are set as the targets.

FIG. 30 illustrates a creation example of a sub range in which the ranges "Grp13" and "Grp21" are set as the targets. With regard to the range "Grp13", one sub range having an identifier "Grp131" (hereinafter, will be referred to as a range "Grp131") is created. The representative ES in the range "Grp131" is the ES "ES05".

With regard to the range "Grp21", one sub range having an identifier "Grp211" (hereinafter, will be referred to as a range "Grp211") is created. The representative ES in the range "Grp211" is the ES "ES07".

Subsequently, information corresponding to the sub ranges (ranges "Grp131" and "Grp211") illustrated in FIG. 30 is added to the range information 123a. FIG. 31 is a second diagram illustrating the generation example of the range information. In the example of FIG. 31, records respectively corresponding to the generated sub ranges (range ids "Grp131" and "Grp211") are added to the range information 123a. In addition, the identifiers of the generated sub ranges are set in the sub range field of the record of the range at the generation source.

The records where the sub range is not set among the records registered in the range information 123a illustrated in FIG. 31 all have a single belonging ES. Therefore, the range information generation processing is ended, and the distribution schedule generation processing is performed based on the range information 123a illustrated in FIG. 31.

First, the creation of the distribution schedule in which the range of the entire NW is set as the target is performed. In this case, first, the ranges "Grp1", "Grp2", and "Grp3" corresponding to the sub ranges for the entire NW are sorted in an ascending order of the band of the BL. Accordingly, the order corresponds to the ranges "Grp2", "Grp1", and "Grp3". Next, the distribution schedule to the representative ES is determined in the sort order.

Figure 32:
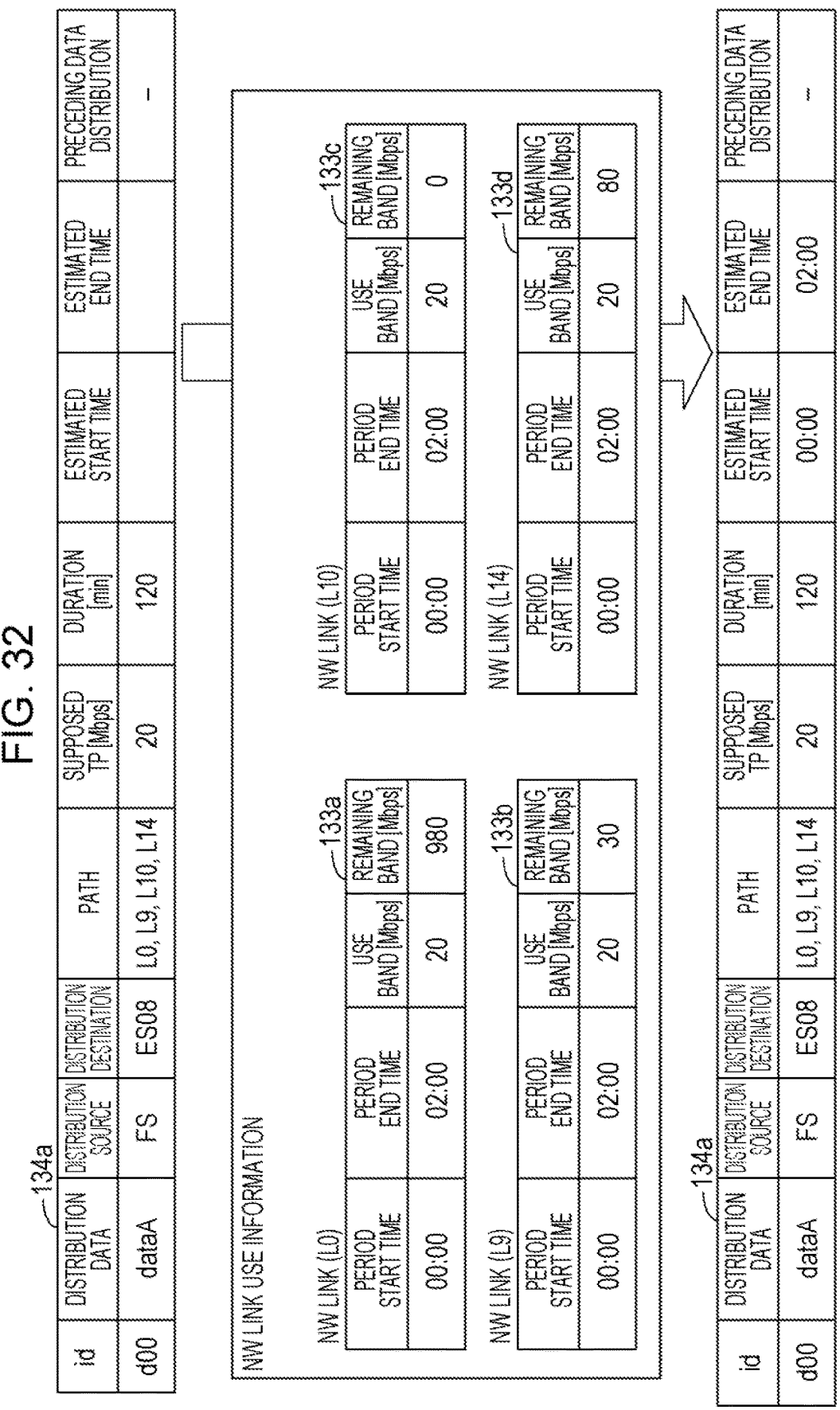
FIG. 32 illustrates a determination example of a distribution schedule designed to a predetermined range.

FIG. 32 illustrates a determination example of the distribution schedule designed to the range "Grp2". The representative ES in the range "Grp2" is the ES "ES08". In view of the above, the data distribution information "d00" indicating the data distribution from the FS "FS01" to the ES "ES08" is added to the distribution schedule information 134a as one record. The data distribution time slot is determined based on the NW link use information 133a to 133d of the NW links indicated by the path of the data distribution information. That is, a period (distributable period) during which the band for the supposed throughput can be provided in the duration is identified with regard to all the NW links in the path (NW links "L0", "L9", "L10", and "L14"). In the example of FIG. 32, since the data distribution is not yet allocated in any of the NW links, in a case where the data distribution start time is "00:00", the band for 20 Mbps can be provided during a period of "00:00 to 02:00". In view of the above, "00:00 to 02:00" is determined as a distribution period, and the allocation result of the band in the identified period is reflected on the use information of all the NW links. Subsequently, the expected start time "00:00" and the expected end time "02:00" are added to the data distribution information "d00".

The distribution schedule from the FS "FS01" to the representative ES in the sort order with regard to the remaining sub ranges ("Grp1" and "Grp2") too. Subsequently, the distribution schedule information 134a is updated in accordance with the determined schedule.

FIG. 33 illustrates an example of the distribution schedule information after the distribution schedule creation in which the range of the entire NW is set as the target. As illustrated in FIG. 33, the data distribution information from the FS "FS01" to the ESs "ES01" and "ES10" corresponding to the respective representative ESs in the sub ranges ("Grp1" and "Grp2") is added to the distribution schedule information 134a. The data distribution in which the FS "FS01" is set as the distribution source is performed in accordance with the distribution schedule information 134a described above.

Figure 34:
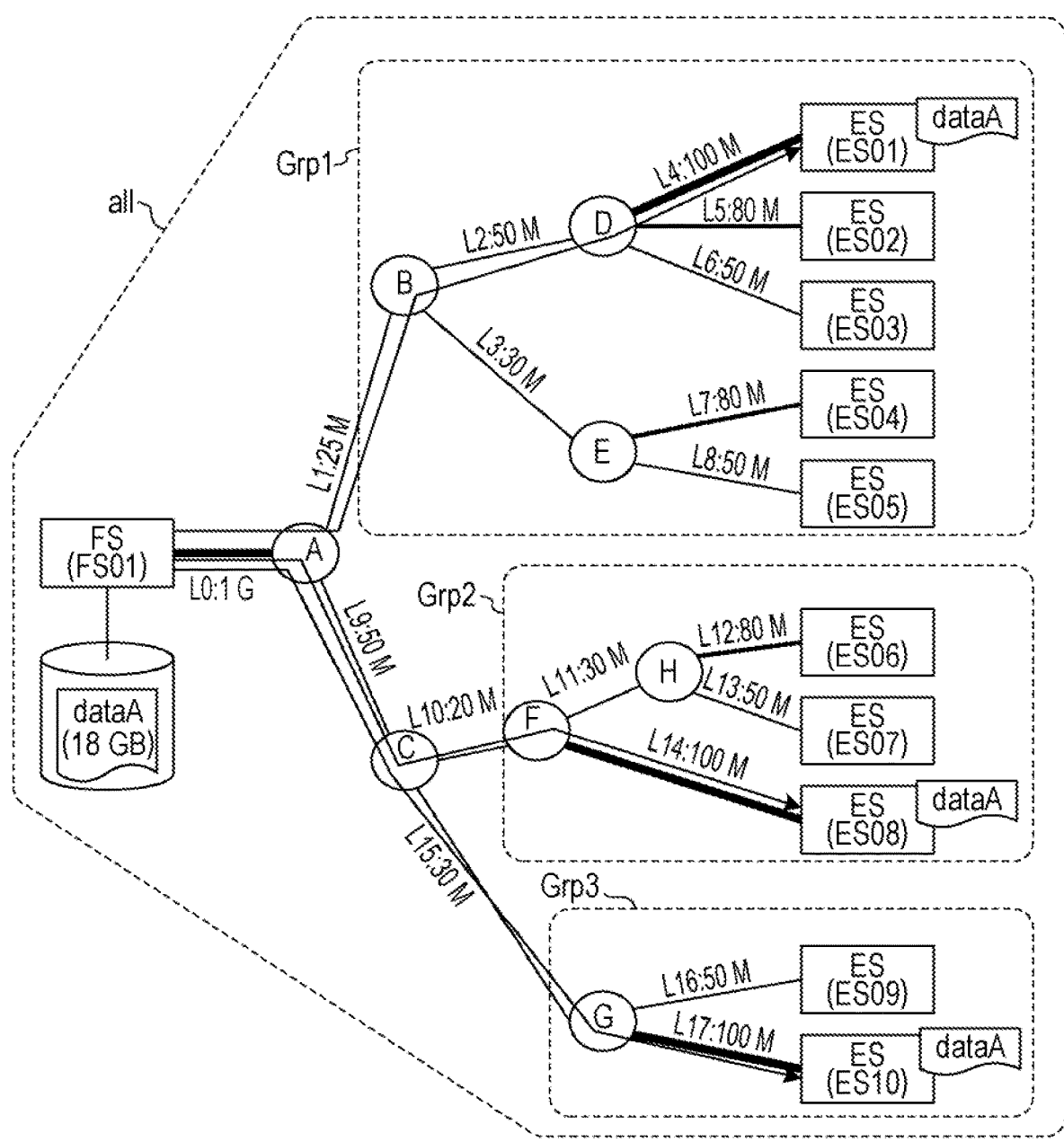
FIG. 34 illustrates a data distribution situation in accordance with the distribution schedule in which the range of the entire NW is set as the target.

FIG. 34 illustrates a data distribution situation in accordance with the distribution schedule in which the range of the entire NW is set as the target. As illustrated in FIG. 34, the data is distributed from the FS "FS01" to the single ES in each of the sub ranges.

When the distribution period of the data distribution information is confirmed, the NW link use information of the NW link on the path is updated. FIG. 35 illustrates an example of the NW link use information after the distribution schedule creation in which the range of the entire NW is set as the target. As illustrated in FIG. 35, the NW link use information 133a, the NW link use information 133b, and the NW link use information 133e for the respective NW links indicate the use bands of the respective NW links and time transients of the remaining bands when the data distribution is performed along the confirmed distribution schedule. For example, in the NW link having the identifier "L0", executions of three data distributions are started at the same time from the time "00:00", and the band at 75 Mbps is used. The data distribution to the ES "ES10" is ended at a time "01:20", and the use band is decreased to 45 Mbps. Furthermore, the data distribution to the ES "ES01" is ended at a time "01:36", and the use band is decreased to 20 Mbps.

Next, the distribution schedule is determined in which the respective sub ranges (ranges "Grp1", "Grp2", and "Grp3") created from the entire distribution NW are set as the targets. Subsequently, the distribution schedule information 134a is updated in accordance with the determined schedule.

FIG. 36 illustrates an example of the distribution schedule information after the distribution schedule creation in which the ranges "Grp1", "Grp2", and "Grp3" are set as the targets. For example, with regard to the range "Grp1", the distribution schedule designed to the sub ranges (ranges "Grp11", "Grp12", and "Grp13") for the range "Grp1" is created, and the data distribution information indicating the relevant distribution schedule is added to the distribution schedule information 134a. The preceding data distribution in the added data distribution information is the distribution to the ES "ES01" corresponding to the distribution source (data distribution information "d00"). This indicates that the data distribution in accordance with the data distribution information "d03", "d04", and "d05" is not started unless the data is distributed to the ES "ES01" corresponding to the distribution source.

Figure 37:
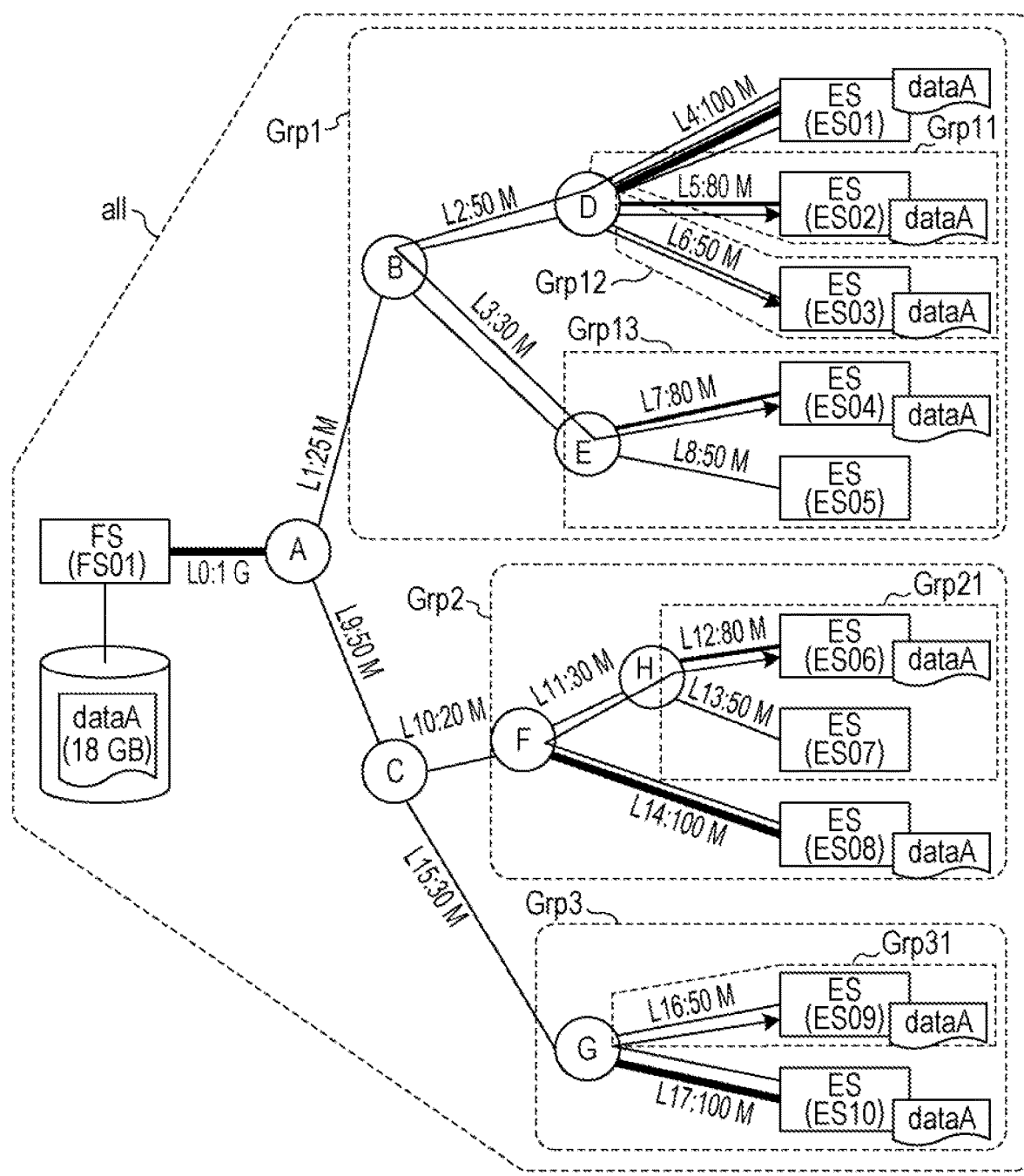
FIG. 37 illustrates the data distribution situation in accordance with the distribution schedule in which the predetermined ranges are set as the targets.

FIG. 37 illustrates the data distribution situation in accordance with the distribution schedule in which the ranges "Grp1", "Grp2", and "Grp3" are set as the targets. As illustrated in FIG. 37, in each of the ranges "Grp1", "Grp2", and "Grp3", the data is distributed from the ESs "ES01", "ES08", and "ES10" corresponding to the representative ESs to the single ES in each of the sub ranges.

It is noted that the data distribution destinations in which the ES "ES01" is set as the distribution source are the three ESs "ES02" to "ES04". Whether or not the data distribution to the three ESs can be started at the time relies on the use band the remaining band of the NW link "L4" corresponding to an overlapping path.

FIG. 38 illustrates an example of the NW link use information of the NW link "L4". A time slot from the time "00:00" to the time "01:36" is used in the data distribution based on the data distribution information "d00". The distribution can be started at the same time in the data distribution information "d03" and "d04" from the time "01:36" based on an availability of the NW link "L4". It is noted however that the remaining band of the NW link having the identifier "L4" from the time "01:36" is only 20 Mbps. This remaining band is lower than the supposed TP (80 Mbps) in the data distribution information "d05". For this reason, starting of the data distribution in accordance with the data distribution information "d05" stands by until the time reaches "02:56" at which the remaining band of the NW link "L4" becomes higher than or equal to 80 Mbps.

As illustrated in FIG. 36, with regard to the ranges "Grp2" and "Grp3" too, the data distribution information "d06" and the data distribution information "d07" indicating the distribution schedule to the sub range therein are generated and added to the distribution schedule information 134a.

Next, the distribution schedule in which the respective ranges "Grp11", "Grp12", "Grp13", "Grp21", and "Grp31" generated from the ranges "Grp1", "Grp2", and "Grp3" are set as the targets is determined. It is noted that, with regard to the ranges "Grp11" and "Grp12" among the ranges "Grp11", "Grp12", and "Grp13" created from the range "Grp1", the processing is skipped since the sub range is not created. In addition, with regard to the range "Grp31" created from the range "Grp3", the processing is skipped since the sub range is not created. As a result, the distribution schedule in which the ranges "Grp13" and "Grp21" are set as the targets is determined. Subsequently, the distribution schedule information 134a is updated in accordance with the determined schedule.

FIG. 39 illustrates an example of the distribution schedule information after the distribution schedule creation in which the ranges "Grp13" and "Grp21" are set as the targets. For example, with regard to the range "Grp13", the distribution schedule designed to the sub range (range "Grp131") for the range "Grp13" is created, and the data distribution information "d08" indicating the relevant distribution schedule is added to the distribution schedule information 134a. In addition, with regard to the range "Grp21", the distribution schedule designed to the sub range (range "Grp211") for the range "Grp21" is created, and the data distribution information "d09" indicating the relevant distribution schedule is added to the distribution schedule information 134a.

Figure 40:
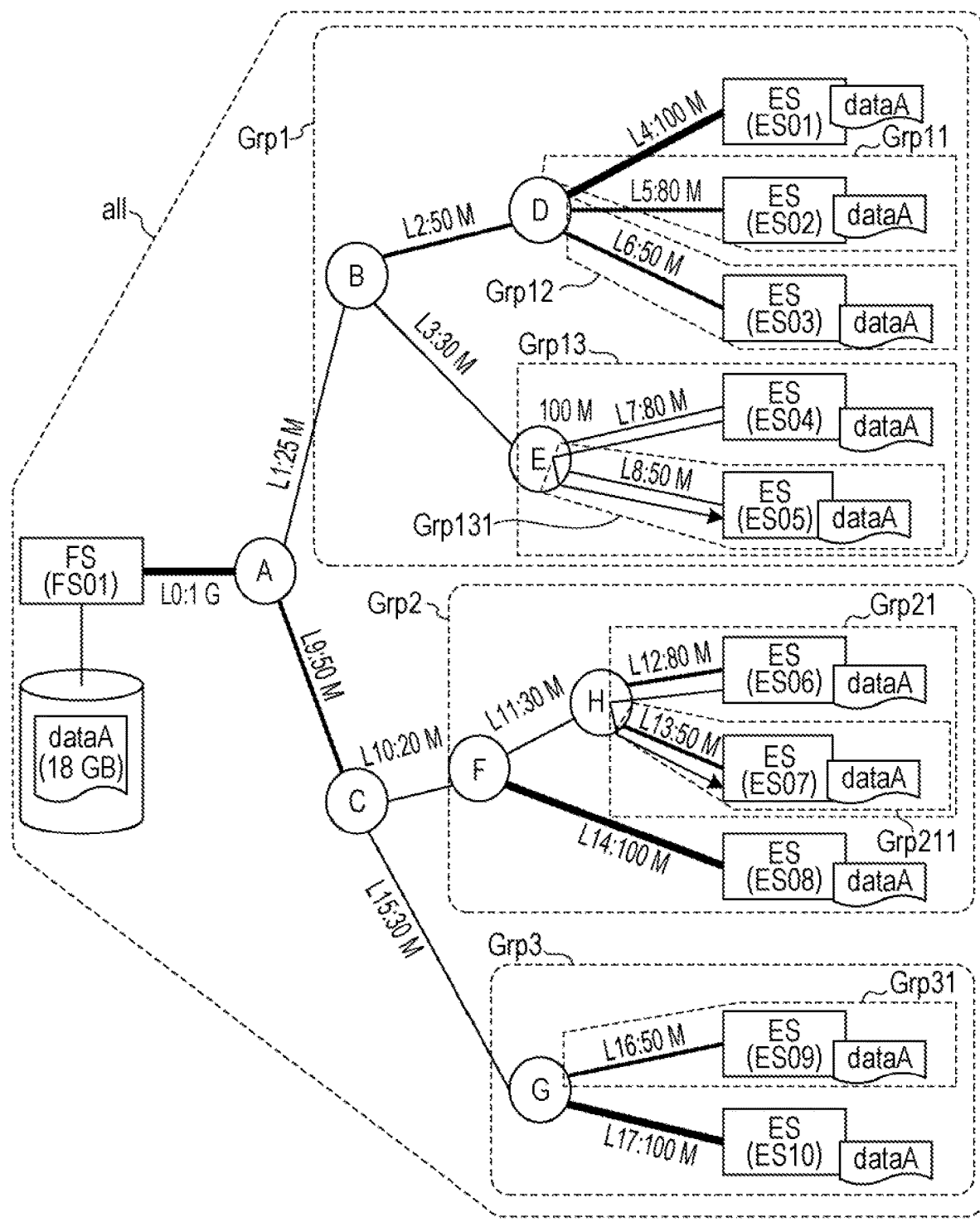
FIG. 40 illustrates the data distribution situation in accordance with the distribution schedule in which the other ranges are set as the targets.

FIG. 40 illustrates the data distribution situation in accordance with the distribution schedule in which the ranges "Grp13" and "Grp21" are set as the targets. As illustrated in FIG. 40, in the respective ranges "Grp13" and "Grp21", the data is distributed from the ESs "ES04" and "ES06" corresponding to the representative ESs to the single ES in each of the sub ranges. As a result, the data is distributed to all the ESs. That is, when the data distribution is performed in accordance with the distribution schedule information illustrated in FIG. 39, the data distribution is performed in all the ESs. As a result, the creation of the distribution schedule is ended.

Figure 41:
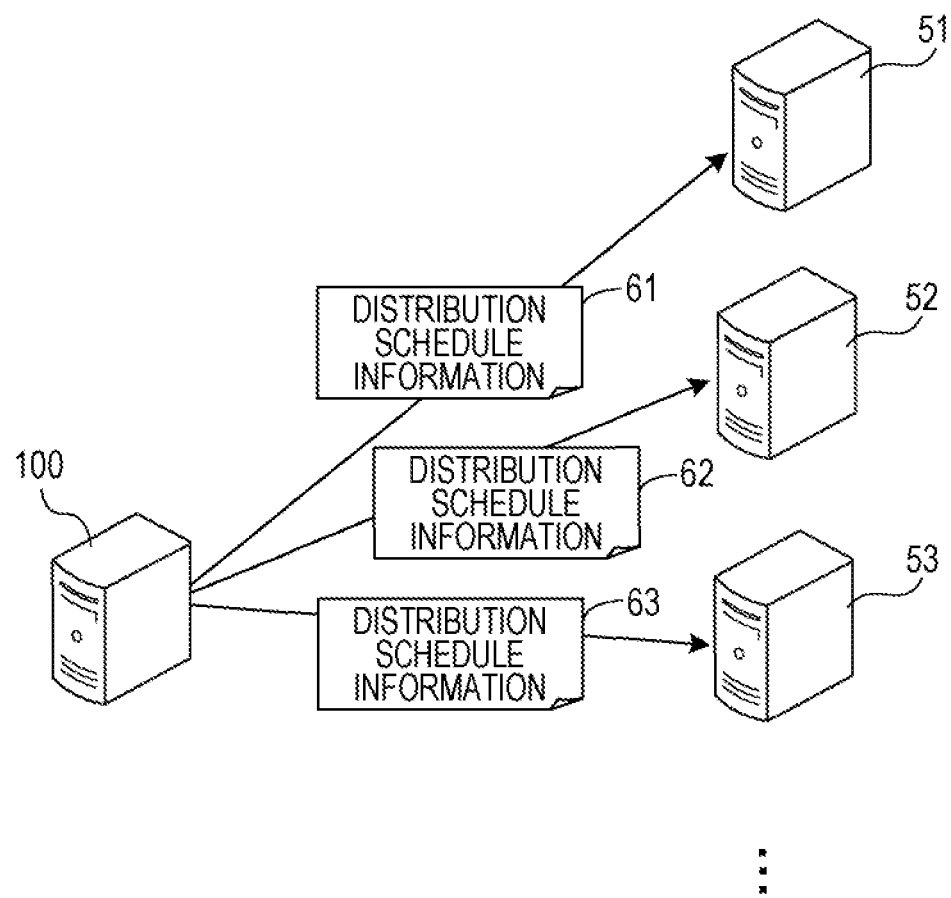
FIG. 41 illustrates a notification example of the distribution schedule.

When the creation of the distribution schedule is ended, the distribution schedule notification unit 141 notifies each of the respective ESs of the distribution schedule information indicating the created distribution schedule. FIG. 41 illustrates a notification example of the distribution schedule. Distribution schedule information 61, 62, 63, . . . are transmitted from the distribution management system 100 to the ESs 51, 52, 53, . . . . Each of the transmitted distribution schedule information 61, 62, 63, . . . includes, for example, "the distribution source, the distribution data, the expected distribution start time, and the expected distribution end time". When the time reaches its own expected distribution time, each of the ESs 51, 52, 53, . . . starts to obtain data from the distribution source based on the received distribution schedule information 61, 62, 63, . . . .

In this manner, the distribution that takes the distribution time (data distribution via the NW link having a low band width) is suppressed, and the distribution order of the distribution destination ESs is determined so as to promote the prompt data distribution between the ESs, so that it is possible to shorten the distribution time as a whole.

In addition, since a plurality of patterns of the distribution orders are not compared with one another, it is possible to reduce the calculation amount. For example, with regard to the calculation amount of the creation of the distribution schedule according to the second exemplary embodiment, in a case where the number of ESs is N, the calculation amount of the processing performed in one loop is O (N log N). A calculation method for the calculation amount is as follows. A) Calculation of the distribution paths: the calculation amount of the paths from the starting point to all of the remaining ES is up to O (N log N). B) Extraction of the range: the calculation amount is O (N) since the paths to the respective ESs calculated in A) are checked one by one. C) Identification of the representative ES: the band of the directly connected NW link is checked with regard to all the belonging ESs in each group calculated in B). The calculation amount is up to O (N) since the calculation is performed for the number of times corresponding to the number of belonging ESs in all the groups. D) Schedule calculation from the starting point to the representative ES: the remaining band the NW link on the path is checked with regard to each of the representatives ES calculated in C). The calculation amount is up to O (N) since the calculation is performed for the number of times corresponding to the number of ESs belonging to the group.

The above-mentioned processing is performed once while the entire NW is set as the target and performed for the number of times corresponding to the number of ranges where two or more ESs exist. The calculation amount becomes O ($N^2$ log N) in a worst case scenario since up to N ranges are created. If the range where the number of ESs is 2 or higher is not created (in a case where the directly connected NW link becomes the BL in all the ESs), the calculation amount of the calculation for the range becomes O (N log N). This calculation amount is substantially lower than the calculation amount O ($N^5$) in a case where the combination optimization problem for all the patterns is solved. That is, the efficient distribution schedule can be created with the low calculation load.

Third Embodiment

Next, a third exemplary embodiment will be described. The third exemplary embodiment relates to an example in which plural pieces of data are distributed.

Figure 42:
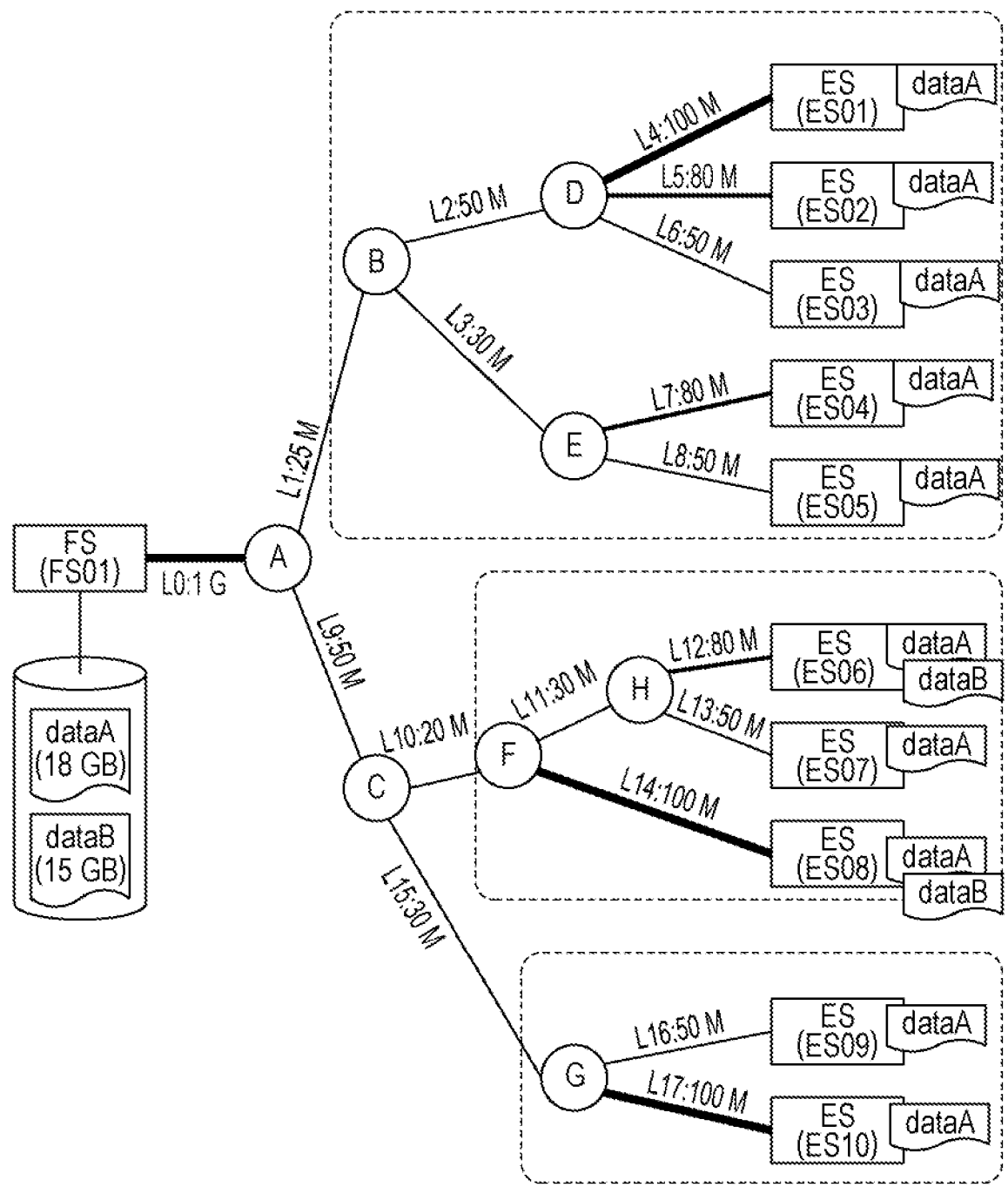
FIG. 42 illustrates an example of NW repository to which a third exemplary embodiment is applied.

FIG. 42 illustrates an example of NW repository to which the third exemplary embodiment is applied. In a case where the plural pieces of data are transmitted, the creation of the distribution schedule is prioritized in a descending order of a total request data size. The total request data size can be calculated by the following expression. Total request data size=the size of the request data×the number of ESs that request the respective pieces of data The distribution schedule in the descending order of the total request data size is created because the data having a higher data size and a higher number of distributions takes more time until the distributions are completed.

In the example of FIG. 42, the data "dataA" having 18 GB and the data "dataB" having 15 GB are distributed. The number of ESs that request the data "dataA" is 10, and the number of ESs that request the data "dataB" is 2. In this case, the total request size of the data "dataA" is 18 GB×10 ESs=180 GB, and the data "dataB" the total request size is 15 GB×2 ESs=30 GB. As a result, the distribution schedule with regard to the data "dataA" is created on a priority basis.

Figure 43:
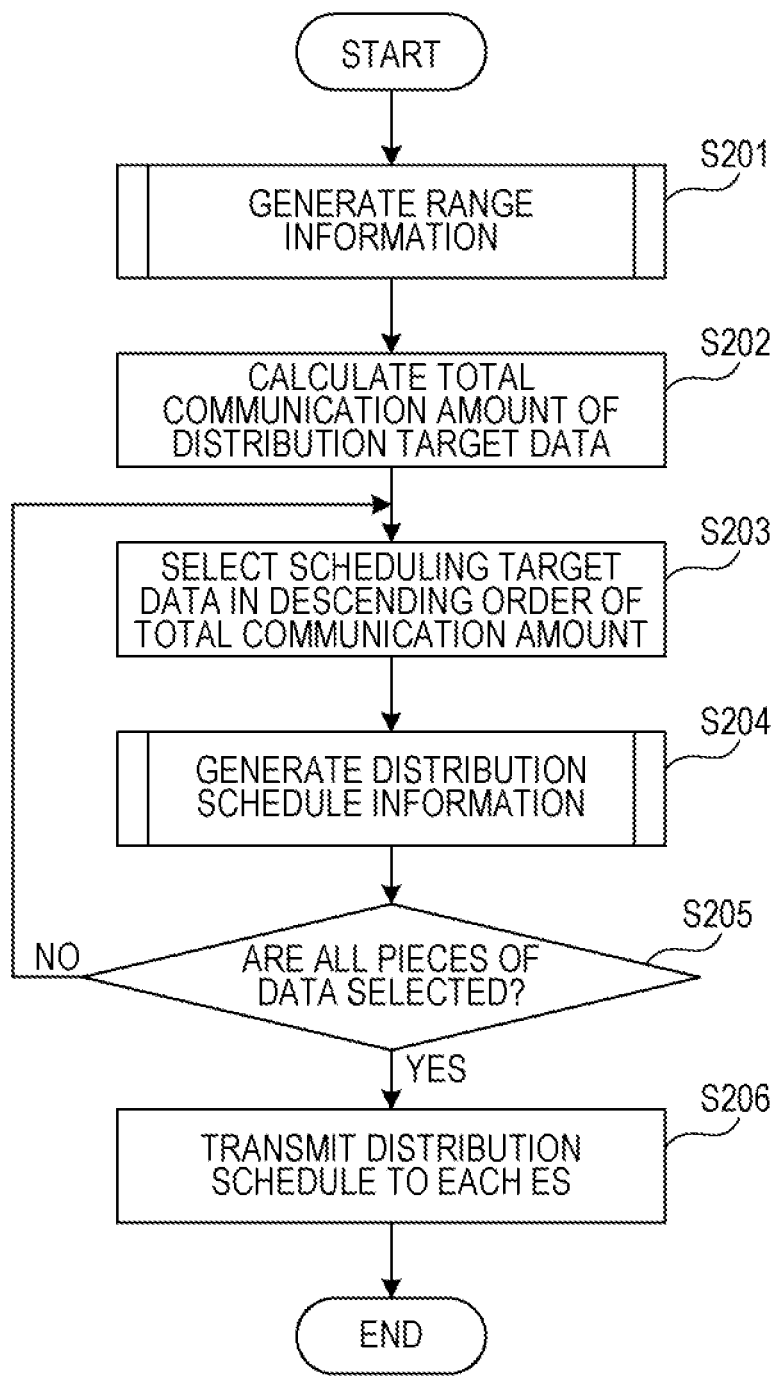
FIG. 43 is a flow chart illustrating an example of the data distribution management procedure in a case where plural pieces of data are distributed.

Next, the data distribution management procedure according to the third exemplary embodiment will be described. FIG. 43 is a flow chart illustrating an example of the data distribution management procedure in a case where plural pieces of data are distributed. Hereinafter, the processing illustrated in FIG. 43 will be described along step numbers.

[Step S201] The inter-ES distribution range creation management unit 121 and the inter-ES distribution range creation unit 122 cooperate with each other to generate the range information 123a (see FIG. 18). A detail of the range information generation processing is the same as illustrated in FIG. 22.

[Step S202] The distribution schedule creation management unit 131 calculates the total communication amount of the data with respect to each data of the distribution target.

[Step S203] The distribution schedule creation management unit 131 selects the data of a scheduling target in a descending order of the total communication amount.

[Step S204] The distribution schedule creation management unit 131 and the distribution schedule creation unit 132 cooperate with each other to generate the distribution schedule information 134a of the data selected as the distribution target (see FIG. 20). A detail of the distribution schedule generation processing is the same as illustrated in FIG. 24.

[Step S205] The distribution schedule creation management unit 131 determines whether or not all the pieces of data are selected as the scheduling targets. In a case where unselected data exists, the processing proceeds to step S203. In a case where all the pieces of data have been already selected, the processing proceeds to step S206.

[Step S106] The distribution schedule notification unit 141 notifies the respective ESs of the distribution schedules of the data to the respective ESs indicated by the distribution schedule information. The distribution schedule is created for each of the plural pieces of data in accordance with the above-mentioned procedure. In the example illustrated in FIG. 42, the distribution schedule of the data "dataA" is first created, and thereafter, the distribution schedule of the data "dataB" is created. The distribution schedule of the data "dataA" is the same as illustrated in FIG. 39. Hereinafter, a creation example of the distribution schedule of the data "dataB" will be described. In the example of FIG. 42, the ESs "ES06" and "ES08" that issue a reception request of the data "dataB" both belong to the range "Grp2". Therefore, first, the distribution schedule designed to the range "Grp2" is determined.

FIG. 44 illustrates a determination example of the distribution schedule designed to the range "Grp2" of the data "dataB". The representative ES in the range "Grp2" is the ES "ES08". In view of the above, the data distribution information "d10" indicating the data distribution from the FS "FS01" to the ES "ES08" is added to the distribution schedule information 134a as one record. The data distribution time slot is determined based on the NW link use information 133a to 133d of the NW links indicated by the path of the data distribution information. That is, with regard to all the NW links in the path (NW links "L0", "L9", "L10", and "L14"), a period (distributable period) during which the band for the supposed throughput can be provided in the duration is identified. In the example of FIG. 44, the band for 20 Mbps can be provided at the time "02:00" or thereafter. In view of the above, a period "02:00 to 03:40" is determined as the distribution period, and the allocation result of the band in the identified period is reflected on the use information of all the NW links. Subsequently, the expected start time "02:00" and the expected end time "03:40" are added to the data distribution information "d10".

Figure 45:
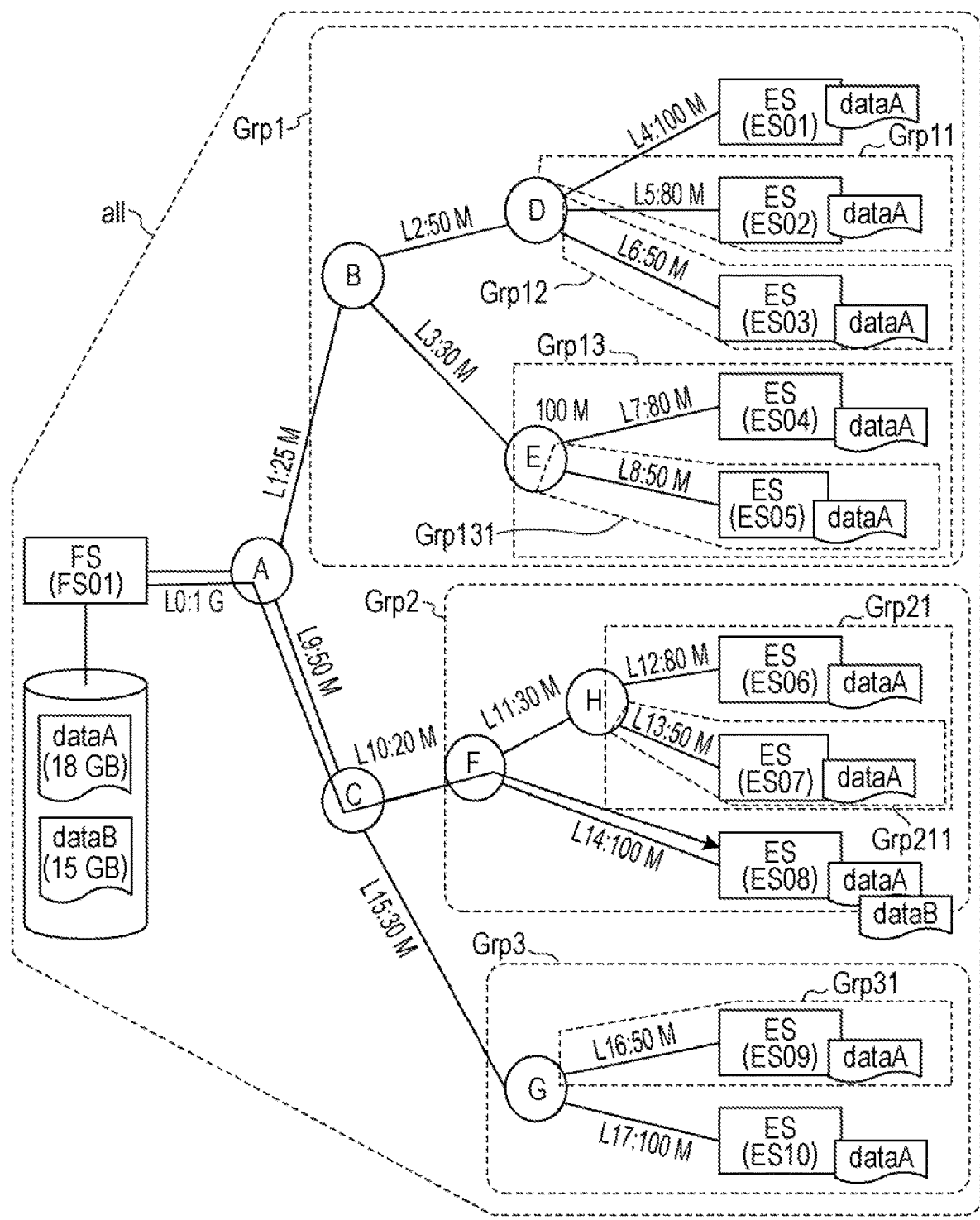
FIG. 45 illustrates the data distribution situation in accordance with the distribution schedule designed to the one range of the data.

FIG. 45 illustrates the data distribution situation in accordance with the distribution schedule designed to the range "Grp2" of the data "dataB". As illustrated in FIG. 45, the data "dataB" is distributed from the FS "FS01" to the ES "ES08" corresponding to the representative ES in the range "Grp2".

Similarly, the distribution schedule designed to the sub range (range "Grp21") for the range "Grp2" is determined. Subsequently, the distribution schedule information 134a is updated. FIG. 46 illustrates an example of the distribution schedule information after the distribution schedule creation designed to the range "Grp21". As illustrated in FIG. 46, the data distribution information "d11" from the ES "ES08" to the ES "ES06" corresponding to the representative ES in the sub range (range "Grp21") is added to the distribution schedule information 134a in addition to the data distribution information "d10" illustrated in FIG. 44. The data distribution in which the FS "FS01" is set as the distribution source is performed in accordance with the distribution schedule information 134a described above.

Figure 47:
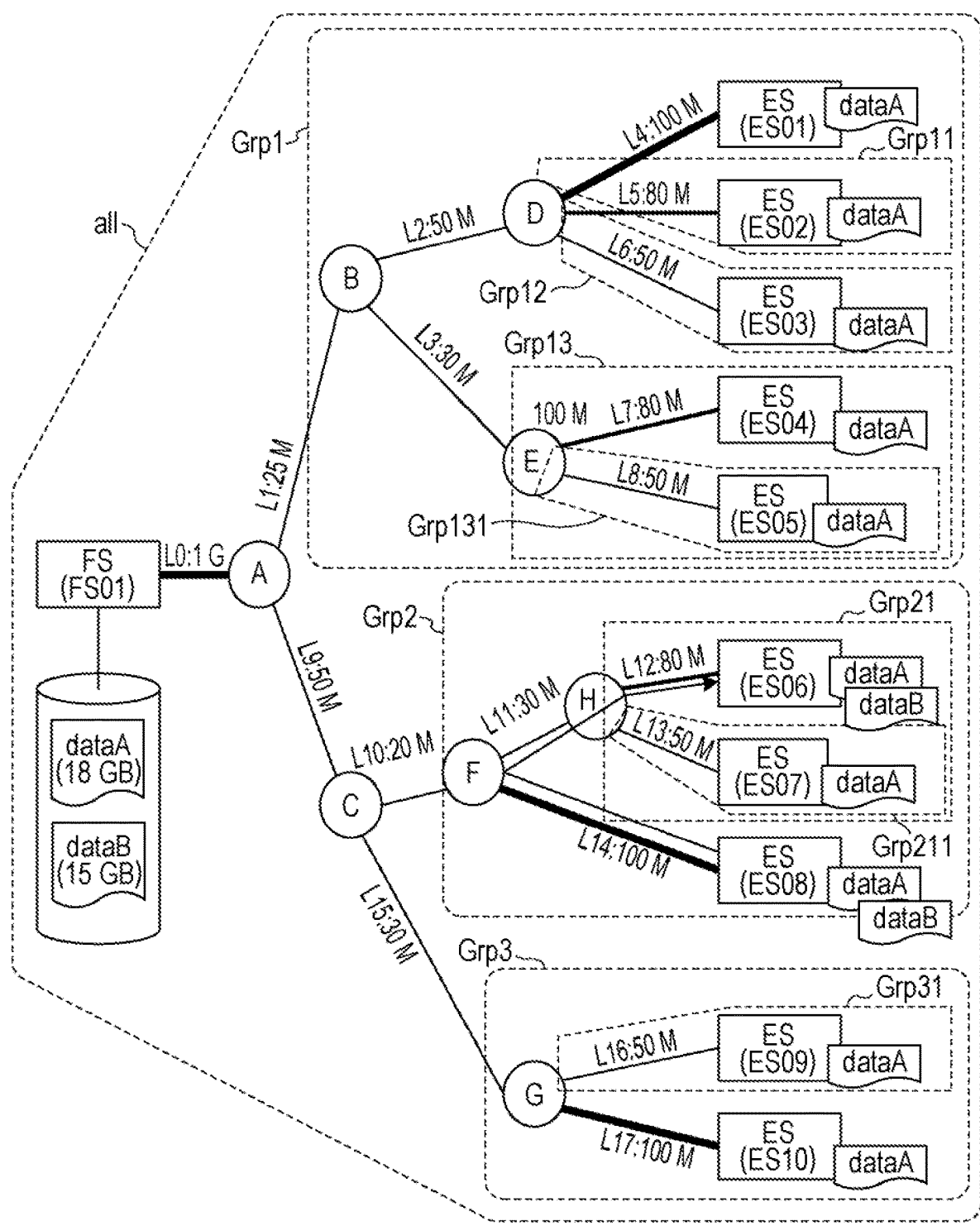
FIG. 47 illustrates the data distribution situation in accordance with the distribution schedule designed to the other range of the data.

FIG. 47 illustrates the data distribution situation in accordance with the distribution schedule designed to the range "Grp21" of the data "dataB". As illustrated in FIG. 47, the data "dataB" is distributed from the ES "ES08" to the ES "ES06" corresponding to the representative ES in the range "Grp21". As a result, since the data "dataB" is distributed to all the ESs that request the distribution of the data "dataB", and the creation processing of the distribution schedule is ended.

The distribution schedule is created in a manner that the data having the high total communication amount is preferentially transmitted as described above, and it is therefore possible to execute the data distribution that takes time until the distribution completion on a precedence basis, so that the end time of the entire data distribution can be set forward.

Fourth Exemplary Embodiment

Next, a fourth exemplary embodiment will be described. The fourth exemplary embodiment relates to improvement in the efficiency of the data distribution according to a configuration in which the transmission rate of the data can be dynamically changed.

In the example illustrated in FIG. 38 according to the second exemplary embodiment, the remaining band (20 Mbps) of the NW link "L4" from the time "01:36" is lower than the supposed throughput (80 Mbps) of the data distribution information "d05" in the distribution schedule indicated by the data distribution information "d05". According to the second exemplary embodiment, in the above-mentioned case, the data distribution based on the data distribution information "d05" stands by until the remaining band of the NW link "L4" becomes higher than or equal to 80 Mbps. However, in a case where the transmission rates (throughputs) of the respective distributions are controlled, it is possible to expect further shortening of the distribution time by performing the distribution early by using the free band even when the throughput is lower than or equal to the supposed TP.

Here, a case will be supposed where, after the distribution schedule creation in which the range of the entire NW is set as the target, the distribution schedule in which the ranges "Grp1", "Grp2", and "Grp3" are set as the targets is created from now. The distribution schedule determined at this time is as illustrated in FIG. 33. In the above-mentioned state, the creation of the distribution schedule in which the ranges "Grp1", "Grp2", and "Grp3" illustrated in FIG. 47 are set as the targets is performed. In this case, the data distribution information "d03" and the data distribution information "d04" are created similarly as in the second exemplary embodiment. Thereafter, the distribution schedule is created while it is supposed that the transfer rate of the data is dynamically changed in a stage where the data distribution information "d05" is created.

FIG. 48 illustrates an example of the distribution schedule information before the distribution schedule determination of the data distribution information "d05". As illustrated in FIG. 48, in a case where the transfer rate of the data is varied, the supposed TP and the duration are not determined until the distribution schedule is confirmed.

The distribution schedule of the data distribution information "d05" relies on the use situation of the NW link "L4" when the distribution schedule of the data distribution information "d03" and "d04" is determined. FIG. 49 illustrates an example of the NW link use information of the NW link "L4" before the distribution schedule determination of the data distribution information "d05". As illustrated in FIG. 49, the band of the NW link "L4" is used for the data distribution in accordance with the data distribution information "d00", "d03", and "d04".

The preceding data distribution with regard to the data distribution information "d05" is the data distribution information "d01". For this reason, the data distribution in accordance with the data distribution information "d05" can be performed at and after the expected end time "01:36" of the data distribution information "d01".

In view of the above, the data distribution in accordance with the data distribution information "d05" while the remaining band (20 Mbps) is set as the supposed TP can be performed in a time slot "01:36 to 02:24" (for 48 minutes). The data of 7.2 GB can be distributed (20 [Mbps]×(48×60) [sec]/8) in this period.

The data distribution in accordance with the data distribution information "d05" can be performed while the remaining band (70 Mbps) is set as the supposed TP in a time slot "02:24 to 02:56". Since 7.2 GB has been already transmitted by the time "02:24", if the remaining 10.8 GB is distributed at 70 Mbps, the remaining data can be transmitted in 21 mins.

In this manner, the distribution schedule in the first part is created in which the supposed TP is set as 20 Mbps, and the supposed TP in the second part is set as 70 Mbps. The content of the data distribution information "d05" in the distribution schedule information 134a is updated in accordance with the determined distribution schedule.

FIG. 50 illustrates an example of the distribution schedule information after the distribution schedule determination of the data distribution information "d05". As illustrated in FIG. 50, in a case where the transmission rate control is performed, when the remaining band of the NW link on the path is lower than the band (80 Mbps) of the BL on the path of the data distribution information "d05", the data transfer is started at the supposed TP at which the transfer can be performed using the remaining band. When the remaining band of the NW link on the path is increased after the transfer of the other data is ended, the data transfer in which the supposed TP is increased is performed from this time. A plurality of settings of the supposed TP, the duration, the expected start time, and the expected end time in the data distribution information "d05" exist in the distribution schedule information 134a.

When the distribution schedule of the data distribution information "d05" is determined, the NW link use information is also updated. FIG. 51 illustrates an example of the NW link use information of the NW link "L4" after the distribution schedule determination of the data distribution information "d05". As illustrated in FIG. 51, the remaining band becomes "0" in the time slot "01:36 to 02:24" with regard to the NW link "L4". That is, the resource of the NW link is used without waste.

As described above, according to the fourth exemplary embodiment, the efficient data distribution is performed without wastefully using the resource of the NW link by creating the distribution schedule while it is supposed that the transmission rate of the data is dynamically changed. The exemplary embodiments have been described above, but the configurations of the respective units according to the exemplary embodiments may be replaced by other elements having similar functions. In addition, other arbitrary components or steps may be added. Furthermore, two or more arbitrary configurations (features) among the above-mentioned exemplary embodiments may be combined with one another.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A schedule-creation apparatus comprising:
   a memory configured to store topology information for indicating connection relationships among a data-provision apparatus configured to hold data of a distribution target, a plurality of distribution-destination apparatuses corresponding to distribution destinations of distribution targets, and a plurality of relay apparatuses configured to relay communications between the data-provision apparatus and the plurality of distribution-destination apparatuses and communication speeds of a plurality of respective links that establish communication connections between two apparatuses among the data-provision apparatus, the plurality of distribution-destination apparatuses, and the plurality of relay apparatuses; and
   a processor configured to
      classify the plurality of distribution-destination apparatuses into one or more groups, in each of which a link having a lowest communication speed on a communication path with the data-provision apparatus is common among distribution-destination apparatuses in the group based on the topology information, the lowest communication speed being calculated at one of the plurality of distribution-destination apparatuses,
      identify a first distribution-destination apparatus having a highest communication speed of a directly connected link among the distribution-destination apparatuses belonging to the group, the highest communication speed being calculated at one of the distribution-destination apparatuses in the group, and
      create a distribution schedule of the data in a manner that the data is transmitted from the data-provision apparatus to the first distribution-destination apparatus in the same group, and the data is transmitted from the first distribution-destination apparatus to a second distribution-destination apparatus other than the first distribution-destination apparatus in the group.

2. A non-transitory, computer-readable recording medium having stored therein a program for causing a computer to execute a process, the process comprising:
classifying, based on topology information for indicating connection relationships among a data-provision apparatus configured to hold data of a distribution target, a plurality of distribution-destination apparatuses corresponding to distribution destinations of distribution targets, and a plurality of relay apparatuses configured to relay communications between the data-provision apparatus and the plurality of distribution-destination apparatuses and communication speeds of a plurality of respective links that establish communication connections between two apparatuses among the data-provision apparatus, the plurality of distribution-destination apparatuses, and the plurality of relay apparatuses, the plurality of distribution-destination apparatuses into one or more groups, in each of which a link having a lowest communication speed on a communication path with the data-provision apparatus is common among the distribution-destination apparatuses in the group, the lowest communication speed being calculated at one of the plurality of distribution-destination apparatuses;
identifying a first distribution-destination apparatus having a highest communication speed of a directly connected link among the distribution-destination apparatuses belonging to the group, the highest communication speed being calculated at one of the distribution-destination apparatuses in the group; and
creating a distribution schedule of the data in a manner that the data is transmitted from the data-provision apparatus to the first distribution-destination apparatus in the same group, and next, the data is transmitted from the first distribution-destination apparatus to a second distribution-destination apparatus other than the first distribution-destination apparatus in the group.

3. The non-transitory, computer-readable recording medium according to claim 2, wherein the computer is caused to execute the processing further comprising:
classifying, in a case where a plurality of the second distribution-destination apparatuses belonging to the group exist, the mutual second distribution-destination apparatuses in which a link having a lowest communication speed on a communication path with the first distribution-destination apparatus is common among the second distribution-destination apparatuses into a same sub group;
identifying a third distribution-destination apparatus having a highest communication speed of a directly connected link among the second distribution-destination apparatuses belonging to the sub group; and
creating the distribution schedule of the data in a manner that the data is transmitted from the data-provision apparatus to the first distribution-destination apparatus in the group, next, the data is transmitted from the first distribution-destination apparatus to the third distribution-destination apparatus in the sub group, and next, the data is transmitted from the third distribution-destination apparatus to a fourth distribution-destination apparatus other than the third distribution-destination apparatus in the sub group in the creating of the distribution schedule.

4. The non-transitory, computer-readable recording medium according to claim 2, wherein, in the creating of the distribution schedule, in a case where a plurality of the groups exist, the distribution schedule is created in a manner that the transmission of the data to the first distribution-destination apparatus in the group is more preferentially performed as the group in which the communication speed of the link having the lowest communication speed on the communication path between the distribution-destination apparatus and the data-provision apparatus belonging to each of the groups is lower.

5. The non-transitory, computer-readable recording medium according to claim 2, wherein, in the creating of the distribution schedule, in a case where plural pieces of the data of the distribution targets exist, the distribution schedule is created in a manner that a total communication amount indicating an accumulating total of a data amount transmitted until the data is distributed to all the distribution-destination apparatuses that request the data distribution is calculated with regard to each of the plural pieces of the data, and the transmission of the data is more preferentially performed as the data has a higher total communication amount.

6. The non-transitory, computer-readable recording medium according to claim 2,
wherein, in the creating of the distribution schedule, a communication speed when the distribution of the data is received from the data-provision apparatus or another distribution-destination apparatus corresponding to a distribution source of the data is determined for each of the distribution-destination apparatuses, and
wherein, in the determination of the communication speed, a remaining band is calculated with respect to each link on a communication path with the data-provision apparatus or the other distribution-destination apparatus corresponding to the distribution source of the data by subtracting the communication speed of the data distribution using the link from the communication speed of the link, and the communication speed in conformity to the remaining band of the link having the lowest remaining band is determined.

7. A distribution-schedule creation method of causing a computer to execute:
classifying, based on topology information indicating connection relationships among a data-provision apparatus configured to hold data of a distribution target, a plurality of distribution-destination apparatuses corresponding to distribution destinations of distribution targets, and a plurality of relay apparatuses configured to relay communications between the data-provision apparatus and the plurality of distribution-destination apparatuses and communication speeds of a plurality of respective links that establish communication connections between two apparatuses among the data-provision apparatus, the plurality of distribution-destination apparatuses, and the plurality of relay apparatuses, the plurality of distribution-destination apparatuses into one or more groups, in each of which a link having a lowest communication speed on a communication path with the data-provision apparatus is common among distribution-destination apparatuses in the group, the lowest communication speed being calculated at one of the plurality of distribution-destination apparatuses;
identifying a first distribution-destination apparatus having a highest communication speed of a directly connected link among the distribution-destination apparatuses belonging to the group, the highest communication speed being calculated at one of the distribution-destination apparatuses in the group; and
creating a distribution schedule of the data in a manner that the data is transmitted from the data-provision apparatus to the first distribution-destination apparatus in the same group, and next, the data is transmitted from the first distribution-destination apparatus to a second distribution-destination apparatus other than the first distribution-destination apparatus in the group.

* * * * *